(12) United States Patent
Allsopp et al.

(10) Patent No.: US 10,579,647 B1
(45) Date of Patent: Mar. 3, 2020

(54) METHODS AND SYSTEMS FOR ANALYZING ENTITY PERFORMANCE

(71) Applicant: PALANTIR TECHNOLOGIES INC., Palo Alto, CA (US)

(72) Inventors: Charles Allsopp, San Francisco, CA (US); James Thompson, San Francisco, CA (US); Lloyd Ho, Palo Alto, CA (US); Christopher Wynnyk, Washington, DC (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/013,707

(22) Filed: Feb. 2, 2016

Related U.S. Application Data

(63) Continuation-in-part of application No. 14/306,138, filed on Jun. 16, 2014, and a continuation-in-part of application No. 14/306,147, filed on Jun. 16, 2014, application No. 15/013,707, which is a continuation-in-part of application No. 14/306,154, filed on Jun. 16, 2014.

(60) Provisional application No. 62/387,601, filed on Dec. 24, 2015, provisional application No. 61/916,795, filed on Dec. 16, 2013, provisional application No. 61/916,796, filed on Dec. 16, 2013, provisional application No. 61/916,797, filed on Dec. 16, 2013.

(51) Int. Cl.
*G06F 16/28* (2019.01)

(52) U.S. Cl.
CPC .............................. *G06F 16/287* (2019.01)

(58) Field of Classification Search
CPC ......... G06F 17/30598; G06F 17/30601; G06F 16/287; G06F 16/285; G06F 16/35; G06F 16/29; G06F 16/26; G06Q 50/01
See application file for complete search history.

(56) References Cited

U.S. PATENT DOCUMENTS

| 4,881,179 A | 11/1989 | Vincent |
| 5,021,792 A | 6/1991 | Hwang |

(Continued)

FOREIGN PATENT DOCUMENTS

| AU | 2014203669 A1 | 1/2015 |
| AU | 2013251186 B2 | 11/2015 |

(Continued)

OTHER PUBLICATIONS

US 8,712,906 B1, 04/2014, Sprague et al. (withdrawn)

(Continued)

*Primary Examiner* — Cam Y T Truong
(74) *Attorney, Agent, or Firm* — Schwegman Lundberg & Woessner, P.A.

(57) ABSTRACT

Systems and methods are provided for analyzing entity performance. In one implementation, a method is provided that includes recognizing an identifier associated with an entity and accessing a data structure comprising information associated with a plurality of interactions. The method also comprises identifying one or more interactions of the plurality of interactions based on the recognized identifier. The method further comprises processing the information of the identified interactions to analyze a performance of the entity and providing the processed information to display the performance of the entity on a user interface.

14 Claims, 37 Drawing Sheets

(56) References Cited

U.S. PATENT DOCUMENTS

| | | |
|---|---|---|
| 5,241,625 A | 8/1993 | Epard |
| 5,555,503 A | 9/1996 | Kyrtsos et al. |
| 5,670,987 A | 9/1997 | Doi et al. |
| 5,826,021 A | 10/1998 | Masters et al. |
| 5,832,218 A | 11/1998 | Gibbs et al. |
| 5,845,300 A | 12/1998 | Comer et al. |
| 5,878,434 A | 3/1999 | Draper et al. |
| 5,897,636 A | 4/1999 | Kaeser |
| 5,966,706 A | 10/1999 | Biliris et al. |
| 5,999,911 A | 12/1999 | Berg et al. |
| 6,006,242 A | 12/1999 | Poole et al. |
| 6,057,757 A | 5/2000 | Arrowsmith et al. |
| 6,065,026 A | 5/2000 | Cornelia et al. |
| 6,101,479 A | 8/2000 | Shaw |
| 6,134,582 A | 10/2000 | Kennedy |
| 6,141,659 A | 10/2000 | Barker et al. |
| 6,189,003 B1 | 2/2001 | Leal |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,272,489 B1 | 8/2001 | Rauch et al. |
| 6,279,018 B1 | 8/2001 | Kudrolli et al. |
| 6,370,538 B1 | 4/2002 | Lamping et al. |
| 6,374,251 B1 | 4/2002 | Fayyad et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,567,936 B1 | 5/2003 | Yang et al. |
| 6,642,945 B1 | 11/2003 | Sharpe |
| 6,665,683 B1 | 12/2003 | Meltzer |
| 6,775,675 B1 | 8/2004 | Nwabueze et al. |
| 6,820,135 B1 | 11/2004 | Dingman |
| 6,850,317 B2 | 2/2005 | Mullins et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 6,980,984 B1 | 12/2005 | Huffman et al. |
| 7,058,648 B1 | 6/2006 | Lightfoot et al. |
| 7,086,028 B1 | 8/2006 | Davis et al. |
| 7,089,541 B2 | 8/2006 | Ungar |
| 7,168,039 B2 | 1/2007 | Bertram |
| 7,174,377 B2 | 2/2007 | Bernard et al. |
| 7,188,100 B2 | 3/2007 | De Bellis et al. |
| 7,194,680 B1 | 3/2007 | Roy et al. |
| 7,213,030 B1 | 5/2007 | Jenkins |
| 7,373,669 B2 | 5/2008 | Eisen |
| 7,383,053 B2 | 6/2008 | Kent et al. |
| 7,392,254 B1 | 6/2008 | Jenkins |
| 7,403,942 B1 | 7/2008 | Bayliss |
| 7,441,182 B2 | 10/2008 | Beilinson et al. |
| 7,441,219 B2 | 10/2008 | Perry et al. |
| 7,451,397 B2 | 11/2008 | Weber et al. |
| 7,461,158 B2 | 12/2008 | Rider et al. |
| 7,523,100 B1 | 4/2009 | Bionda et al. |
| 7,529,734 B2 | 5/2009 | Dirisala |
| 7,574,409 B2 | 8/2009 | Patinkin |
| 7,596,285 B2 | 9/2009 | Brown et al. |
| 7,617,232 B2 | 11/2009 | Gabbert et al. |
| 7,627,489 B2 | 12/2009 | Schaeffer et al. |
| 7,627,812 B2 | 12/2009 | Chamberlain et al. |
| 7,634,717 B2 | 12/2009 | Chamberlain et al. |
| 7,652,622 B2 | 1/2010 | Hansen et al. |
| 7,706,817 B2 | 4/2010 | Bamrah et al. |
| 7,716,140 B1 | 5/2010 | Nielsen et al. |
| 7,725,547 B2 | 5/2010 | Albertson et al. |
| 7,739,246 B2 | 6/2010 | Mooney et al. |
| 7,747,648 B1 | 6/2010 | Kraft et al. |
| 7,756,843 B1 | 7/2010 | Palmer |
| 7,757,220 B2 | 7/2010 | Griffith et al. |
| 7,765,489 B1 | 7/2010 | Shah et al. |
| 7,770,100 B2 | 8/2010 | Chamberlain et al. |
| 7,783,658 B1 | 8/2010 | Bayliss |
| 7,805,457 B1 | 9/2010 | Viola et al. |
| 7,814,102 B2 | 10/2010 | Miller et al. |
| 7,877,421 B2 | 1/2011 | Berger et al. |
| 7,880,921 B2 | 2/2011 | Dattilo et al. |
| 7,899,796 B1 | 3/2011 | Borthwick et al. |
| 7,912,842 B1 | 3/2011 | Bayliss |
| 7,917,376 B2 | 3/2011 | Bellin et al. |
| 7,941,321 B2 | 5/2011 | Greenstein et al. |
| 7,941,336 B1 | 5/2011 | Robin-Jan |
| 7,945,470 B1 | 5/2011 | Cohen et al. |
| 7,958,147 B1 | 6/2011 | Turner et al. |
| 7,962,495 B2 | 6/2011 | Jain et al. |
| 7,962,848 B2 | 6/2011 | Bertram |
| 7,966,199 B1 | 6/2011 | Frasher et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,028,894 B2 | 10/2011 | Lapstun et al. |
| 8,036,971 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,073,857 B2 | 12/2011 | Sreekanth |
| 8,117,022 B2 | 2/2012 | Linker |
| 8,126,848 B2 | 2/2012 | Wagner |
| 8,135,679 B2 | 3/2012 | Bayliss |
| 8,135,719 B2 | 3/2012 | Bayliss |
| 8,191,005 B2 | 5/2012 | Baier et al. |
| 8,214,490 B1 | 7/2012 | Vos et al. |
| 8,225,201 B2 | 7/2012 | Michael |
| 8,229,902 B2 | 7/2012 | Vishniac et al. |
| 8,266,168 B2 | 9/2012 | Bayliss |
| 8,290,838 B1 | 10/2012 | Thakur et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,364,642 B1 | 1/2013 | Garrod et al. |
| 8,386,377 B1 | 2/2013 | Xiong et al. |
| 8,392,556 B2 | 3/2013 | Goulet et al. |
| 8,402,047 B1 | 3/2013 | Mangini et al. |
| 8,417,715 B1 | 4/2013 | Bruckhaus |
| 8,429,527 B1 | 4/2013 | Arbogast |
| 8,447,674 B2 | 5/2013 | Choudhuri et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,495,077 B2 | 7/2013 | Bayliss |
| 8,498,969 B2 | 7/2013 | Bayliss |
| 8,521,135 B2 | 8/2013 | Cryderman |
| 8,527,949 B1 | 9/2013 | Pleis et al. |
| 8,554,653 B2 | 10/2013 | Falkenborg et al. |
| 8,554,719 B2 | 10/2013 | Mcgrew et al. |
| 8,560,413 B1 | 10/2013 | Quarterman |
| 8,589,273 B2 | 11/2013 | Creeden et al. |
| 8,600,872 B1 | 12/2013 | Yan |
| 8,601,326 B1 | 12/2013 | Kirn |
| 8,620,641 B2 | 12/2013 | Farnsworth et al. |
| 8,639,552 B1 | 1/2014 | Chen et al. |
| 8,646,080 B2 | 2/2014 | Williamson et al. |
| 8,682,696 B1 | 3/2014 | Shanmugam |
| 8,682,812 B1 | 3/2014 | Ranjan |
| 8,688,573 B1 | 4/2014 | Rukonic et al. |
| 8,726,379 B1 | 5/2014 | Stiansen et al. |
| 8,732,574 B2 | 5/2014 | Burr et al. |
| 8,739,059 B2 | 5/2014 | Rabenold et al. |
| 8,744,890 B1 | 6/2014 | Bernier |
| 8,762,870 B2 | 6/2014 | Robotham et al. |
| 8,788,405 B1 | 7/2014 | Sprague et al. |
| 8,788,407 B1 | 7/2014 | Singh et al. |
| 8,798,354 B1 | 8/2014 | Bunzel et al. |
| 8,799,313 B2 | 8/2014 | Satlow |
| 8,807,948 B2 | 8/2014 | Luo et al. |
| 8,812,444 B2 | 8/2014 | Garrod et al. |
| 8,812,960 B1 | 8/2014 | Sun et al. |
| 8,818,892 B1 | 8/2014 | Sprague et al. |
| 8,838,538 B1 | 9/2014 | Landau et al. |

(56) References Cited

U.S. PATENT DOCUMENTS

| | | |
|---|---|---|
| 8,849,254 B2 | 9/2014 | Bolon |
| 8,855,999 B1 | 10/2014 | Elliot |
| 8,903,717 B2 | 12/2014 | Elliot |
| 8,924,388 B2 | 12/2014 | Elliot et al. |
| 8,924,389 B2 | 12/2014 | Elliot et al. |
| 8,930,874 B2 | 1/2015 | Duff et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,984,390 B2 | 3/2015 | Aymeloglu et al. |
| 9,009,827 B1 | 4/2015 | Albertson et al. |
| 9,037,407 B2 | 5/2015 | Thompson |
| 9,043,894 B1 | 5/2015 | Dennison et al. |
| 9,058,315 B2 | 6/2015 | Burr |
| 9,100,428 B1 | 8/2015 | Visbal |
| 9,105,000 B1 | 8/2015 | White et al. |
| 9,123,086 B1 | 9/2015 | Freeland et al. |
| 9,129,219 B1 | 9/2015 | Robertson et al. |
| 9,135,658 B2 | 9/2015 | Sprague et al. |
| 9,165,100 B2 | 10/2015 | Begur et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,230,060 B2 | 1/2016 | Friedlander |
| 9,230,280 B1 | 1/2016 | Maag et al. |
| 9,256,664 B2 | 2/2016 | Chakerian et al. |
| 9,262,529 B2 | 2/2016 | Colgrove et al. |
| 9,275,069 B1 | 3/2016 | Garrod et al. |
| 9,286,373 B2 | 3/2016 | Elliot et al. |
| 9,301,103 B1 | 3/2016 | Thompson |
| 9,313,233 B2 | 4/2016 | Sprague et al. |
| 9,344,447 B2 | 5/2016 | Cohen et al. |
| 9,348,499 B2 | 5/2016 | Aymeloglu et al. |
| 9,348,851 B2 | 5/2016 | Kirn |
| 9,348,880 B2 | 5/2016 | Kramer et al. |
| 9,367,872 B1 | 6/2016 | Visbal et al. |
| 9,760,840 B1 * | 9/2017 | Tyagi ..................... G06Q 10/00 |
| 2001/0021936 A1 | 9/2001 | Bertram |
| 2002/0032677 A1 | 3/2002 | Morgenthaler et al. |
| 2002/0035590 A1 | 3/2002 | Eibach et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2002/0194058 A1 | 12/2002 | Eldering |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0033228 A1 | 2/2003 | Bosworth-Davies et al. |
| 2003/0036848 A1 * | 2/2003 | Sheha ................ G01C 21/3679 |
| | | 701/468 |
| 2003/0036927 A1 | 2/2003 | Bowen |
| 2003/0061132 A1 | 3/2003 | Mason, Sr. et al. |
| 2003/0074187 A1 | 4/2003 | Ait-Mokhtar et al. |
| 2003/0074368 A1 | 4/2003 | Schuetze et al. |
| 2003/0088438 A1 | 5/2003 | Maughan et al. |
| 2003/0093401 A1 | 5/2003 | Czajkowski et al. |
| 2003/0093755 A1 | 5/2003 | O'Carroll |
| 2003/0097330 A1 | 5/2003 | Hillmer et al. |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0152277 A1 | 8/2003 | Hall et al. |
| 2003/0154044 A1 | 8/2003 | Lundstedt et al. |
| 2003/0171942 A1 | 9/2003 | Gaito |
| 2003/0172014 A1 | 9/2003 | Quackenbush et al. |
| 2003/0177112 A1 | 9/2003 | Gardner |
| 2003/0182313 A1 | 9/2003 | Federwisch et al. |
| 2003/0212718 A1 | 11/2003 | Tester |
| 2003/0227746 A1 | 12/2003 | Sato |
| 2004/0003009 A1 | 1/2004 | Wilmot |
| 2004/0006523 A1 | 1/2004 | Coker |
| 2004/0034570 A1 | 2/2004 | Davis |
| 2004/0044648 A1 | 3/2004 | Anfindsen et al. |
| 2004/0078451 A1 | 4/2004 | Dietz et al. |
| 2004/0083466 A1 | 4/2004 | Dapp et al. |
| 2004/0088177 A1 | 5/2004 | Travis et al. |
| 2004/0111480 A1 | 6/2004 | Yue |
| 2004/0117387 A1 | 6/2004 | Civetta et al. |
| 2004/0153418 A1 | 8/2004 | Hanweck |
| 2004/0153451 A1 | 8/2004 | Phillips et al. |
| 2004/0203380 A1 | 10/2004 | Hamdi et al. |
| 2004/0205492 A1 | 10/2004 | Newsome |
| 2004/0205524 A1 | 10/2004 | Richter et al. |
| 2004/0210763 A1 | 10/2004 | Jonas |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0027705 A1 * | 2/2005 | Sadri ..................... G06F 16/29 |
| 2005/0028094 A1 | 2/2005 | Allyn |
| 2005/0039116 A1 | 2/2005 | Slack-Smith |
| 2005/0086207 A1 | 4/2005 | Heuer et al. |
| 2005/0091186 A1 | 4/2005 | Elish |
| 2005/0097441 A1 | 5/2005 | Herbach et al. |
| 2005/0102328 A1 | 5/2005 | Ring et al. |
| 2005/0108063 A1 | 5/2005 | Madill et al. |
| 2005/0125436 A1 | 6/2005 | Mudunuri et al. |
| 2005/0125715 A1 | 6/2005 | Di Franco et al. |
| 2005/0131935 A1 | 6/2005 | O'Leary et al. |
| 2005/0143096 A1 | 6/2005 | Boesch |
| 2005/0154628 A1 * | 7/2005 | Eckart .................... G06Q 30/02 |
| | | 705/35 |
| 2005/0154769 A1 * | 7/2005 | Eckart .................... G06Q 40/04 |
| 2005/0210409 A1 | 9/2005 | Jou |
| 2005/0222928 A1 | 10/2005 | Steier et al. |
| 2005/0262493 A1 | 11/2005 | Schmidt et al. |
| 2005/0262512 A1 | 11/2005 | Schmidt et al. |
| 2006/0010130 A1 | 1/2006 | Leff et al. |
| 2006/0026120 A1 | 2/2006 | Carolan et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0080139 A1 | 4/2006 | Mainzer |
| 2006/0080283 A1 | 4/2006 | Shipman |
| 2006/0080316 A1 | 4/2006 | Gilmore et al. |
| 2006/0095521 A1 | 5/2006 | Patinkin |
| 2006/0116991 A1 | 6/2006 | Calderwood |
| 2006/0129746 A1 | 6/2006 | Porter |
| 2006/0136513 A1 | 6/2006 | Ngo et al. |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0155654 A1 | 7/2006 | Plessis et al. |
| 2006/0178915 A1 | 8/2006 | Chao |
| 2006/0178954 A1 | 8/2006 | Thukral et al. |
| 2006/0206235 A1 | 9/2006 | Shakes et al. |
| 2006/0218206 A1 | 9/2006 | Bourbonnais et al. |
| 2006/0218491 A1 | 9/2006 | Grossman et al. |
| 2006/0218637 A1 | 9/2006 | Thomas et al. |
| 2006/0242040 A1 * | 10/2006 | Rader .................... G06Q 40/06 |
| | | 705/35 |
| 2006/0250764 A1 | 11/2006 | Howarth et al. |
| 2006/0253502 A1 | 11/2006 | Raman et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0011304 A1 | 1/2007 | Error |
| 2007/0018986 A1 | 1/2007 | Hauser |
| 2007/0038646 A1 | 2/2007 | Thota |
| 2007/0043686 A1 | 2/2007 | Teng et al. |
| 2007/0043744 A1 | 2/2007 | Carro |
| 2007/0061752 A1 | 3/2007 | Cory |
| 2007/0067285 A1 | 3/2007 | Blume et al. |
| 2007/0106582 A1 | 5/2007 | Baker et al. |
| 2007/0113164 A1 | 5/2007 | Hansen et al. |
| 2007/0118547 A1 | 5/2007 | Gupta et al. |
| 2007/0130541 A1 | 6/2007 | Louch et al. |
| 2007/0136095 A1 | 6/2007 | Weinstein |

(56) References Cited

U.S. PATENT DOCUMENTS

| | | |
|---|---|---|
| 2007/0150801 A1 | 6/2007 | Chidlovskii et al. |
| 2007/0156673 A1 | 7/2007 | Maga |
| 2007/0162454 A1 | 7/2007 | D' Albora et al. |
| 2007/0168871 A1 | 7/2007 | Jenkins |
| 2007/0174760 A1 | 7/2007 | Chamberlain et al. |
| 2007/0178501 A1 | 8/2007 | Rabinowitz et al. |
| 2007/0185850 A1 | 8/2007 | Walters et al. |
| 2007/0185867 A1 | 8/2007 | Maga |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0233756 A1 | 10/2007 | D'Souza et al. |
| 2007/0245339 A1 | 10/2007 | Bauman et al. |
| 2007/0250491 A1 | 10/2007 | Olszak et al. |
| 2007/0271317 A1 | 11/2007 | Carmel |
| 2007/0284433 A1 | 12/2007 | Domenica et al. |
| 2007/0294200 A1 | 12/2007 | Au |
| 2007/0295797 A1 | 12/2007 | Herman et al. |
| 2007/0299697 A1 | 12/2007 | Friedlander et al. |
| 2008/0005063 A1 | 1/2008 | Seeds et al. |
| 2008/0007618 A1 | 1/2008 | Yuasa |
| 2008/0016155 A1 | 1/2008 | Khalatian |
| 2008/0040275 A1 | 2/2008 | Paulsen et al. |
| 2008/0069081 A1 | 3/2008 | Chand et al. |
| 2008/0091693 A1 | 4/2008 | Murthy |
| 2008/0103996 A1 | 5/2008 | Forman et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0133567 A1 | 6/2008 | Ames et al. |
| 2008/0140387 A1 | 6/2008 | Linker |
| 2008/0148398 A1 | 6/2008 | Mezack et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195672 A1 | 8/2008 | Hamel et al. |
| 2008/0208735 A1 | 8/2008 | Balet et al. |
| 2008/0222295 A1 | 9/2008 | Robinson et al. |
| 2008/0227473 A1 | 9/2008 | Haney |
| 2008/0228467 A1 | 9/2008 | Womack et al. |
| 2008/0243711 A1 | 10/2008 | Aymeloglu et al. |
| 2008/0249820 A1 | 10/2008 | Pathria et al. |
| 2008/0249983 A1* | 10/2008 | Meisels ............ G06F 17/30241 |
| 2008/0252419 A1 | 10/2008 | Batchelor et al. |
| 2008/0255973 A1 | 10/2008 | El Wade et al. |
| 2008/0267386 A1 | 10/2008 | Cooper |
| 2008/0270316 A1 | 10/2008 | Guidotti et al. |
| 2008/0276167 A1 | 11/2008 | Michael |
| 2008/0281580 A1 | 11/2008 | Zabokritski |
| 2008/0288425 A1 | 11/2008 | Posse et al. |
| 2008/0288475 A1 | 11/2008 | Kim et al. |
| 2008/0301042 A1 | 12/2008 | Patzer |
| 2008/0313132 A1 | 12/2008 | Hao et al. |
| 2008/0313243 A1 | 12/2008 | Poston et al. |
| 2009/0005070 A1 | 1/2009 | Forstall et al. |
| 2009/0012865 A1* | 1/2009 | Celik ................ G06F 17/30386 705/14.48 |
| 2009/0018940 A1 | 1/2009 | Wang et al. |
| 2009/0024505 A1 | 1/2009 | Patel et al. |
| 2009/0024962 A1 | 1/2009 | Gotz |
| 2009/0031401 A1 | 1/2009 | Cudich et al. |
| 2009/0043801 A1 | 2/2009 | LeClair et al. |
| 2009/0044279 A1 | 2/2009 | Crawford et al. |
| 2009/0055487 A1 | 2/2009 | Moraes et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0089651 A1 | 4/2009 | Herberger et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0106242 A1 | 4/2009 | McGrew et al. |
| 2009/0112678 A1 | 4/2009 | Luzardo |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132573 A1* | 5/2009 | Reed, Jr. ................ G06F 16/26 |
| 2009/0138790 A1 | 5/2009 | Larcheveque et al. |
| 2009/0143052 A1 | 6/2009 | Bates et al. |
| 2009/0150868 A1 | 6/2009 | Chakra et al. |
| 2009/0156231 A1 | 6/2009 | Versteeg et al. |
| 2009/0157732 A1 | 6/2009 | Hao et al. |
| 2009/0164387 A1 | 6/2009 | Armstrong et al. |
| 2009/0164934 A1 | 6/2009 | Bhattiprolu et al. |
| 2009/0172821 A1 | 7/2009 | Daira et al. |
| 2009/0177962 A1 | 7/2009 | Gusmorino et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0199102 A1* | 8/2009 | Hookham-Miller ... G06Q 10/10 715/733 |
| 2009/0199106 A1 | 8/2009 | Jonsson et al. |
| 2009/0216562 A1 | 8/2009 | Faulkner et al. |
| 2009/0217173 A1* | 8/2009 | Manheimer ......... G06F 3/04812 715/744 |
| 2009/0228365 A1 | 9/2009 | Tomchek et al. |
| 2009/0228507 A1 | 9/2009 | Jain et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0265105 A1 | 10/2009 | Davis et al. |
| 2009/0271343 A1 | 10/2009 | Vaiciulis et al. |
| 2009/0271359 A1 | 10/2009 | Bayliss |
| 2009/0281839 A1 | 11/2009 | Lynn et al. |
| 2009/0282068 A1 | 11/2009 | Shockro et al. |
| 2009/0287407 A1* | 11/2009 | Sheha ................... G01C 21/26 701/420 |
| 2009/0287470 A1 | 11/2009 | Farnsworth et al. |
| 2009/0299830 A1 | 12/2009 | West et al. |
| 2009/0300589 A1 | 12/2009 | Watters et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0315679 A1 | 12/2009 | Bauchot et al. |
| 2009/0318775 A1 | 12/2009 | Michelson et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0004857 A1 | 1/2010 | Pereira et al. |
| 2010/0030722 A1 | 2/2010 | Goodson et al. |
| 2010/0031141 A1 | 2/2010 | Summers et al. |
| 2010/0042922 A1 | 2/2010 | Bradeteanu et al. |
| 2010/0057622 A1 | 3/2010 | Faith et al. |
| 2010/0058212 A1 | 3/2010 | Belitz et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0073315 A1 | 3/2010 | Lee et al. |
| 2010/0076813 A1 | 3/2010 | Ghosh et al. |
| 2010/0076821 A1* | 3/2010 | Hecker ................. G06Q 10/06 705/7.42 |
| 2010/0077481 A1 | 3/2010 | Polyakov et al. |
| 2010/0077483 A1 | 3/2010 | Stolfo et al. |
| 2010/0082541 A1 | 4/2010 | Kottomtharayil |
| 2010/0082671 A1 | 4/2010 | Li et al. |
| 2010/0082842 A1 | 4/2010 | Lavrov et al. |
| 2010/0098318 A1 | 4/2010 | Anderson |
| 2010/0100963 A1 | 4/2010 | Mahaffey |
| 2010/0106611 A1 | 4/2010 | Paulsen et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0121817 A1 | 5/2010 | Meyer et al. |
| 2010/0122152 A1 | 5/2010 | Chamberlain et al. |
| 2010/0122546 A1 | 5/2010 | Barrett et al. |
| 2010/0131502 A1 | 5/2010 | Fordham |
| 2010/0145909 A1 | 6/2010 | Ngo |
| 2010/0161735 A1 | 6/2010 | Sharma |
| 2010/0169237 A1 | 7/2010 | Howard et al. |
| 2010/0173619 A1 | 7/2010 | Hua et al. |
| 2010/0185691 A1 | 7/2010 | Irmak et al. |
| 2010/0185984 A1 | 7/2010 | Wright et al. |

(56) References Cited

U.S. PATENT DOCUMENTS

| | | |
|---|---|---|
| 2010/0191563 A1 | 7/2010 | Schlaifer et al. |
| 2010/0191884 A1 | 7/2010 | Holenstein et al. |
| 2010/0204983 A1 | 8/2010 | Chung et al. |
| 2010/0214117 A1 | 8/2010 | Hazzani |
| 2010/0223260 A1 | 9/2010 | Wu |
| 2010/0223543 A1 | 9/2010 | Marston |
| 2010/0235915 A1 | 9/2010 | Memon et al. |
| 2010/0238174 A1 | 9/2010 | Haub et al. |
| 2010/0262688 A1 | 10/2010 | Hussain et al. |
| 2010/0262901 A1 | 10/2010 | DiSalvo |
| 2010/0280851 A1 | 10/2010 | Merkin |
| 2010/0281458 A1 | 11/2010 | Paladino et al. |
| 2010/0306029 A1 | 12/2010 | Jolley |
| 2010/0306285 A1 | 12/2010 | Shah et al. |
| 2010/0306713 A1 | 12/2010 | Geisner et al. |
| 2010/0306722 A1 | 12/2010 | Lehoty et al. |
| 2010/0312837 A1 | 12/2010 | Bodapati et al. |
| 2010/0313239 A1 | 12/2010 | Chakra et al. |
| 2010/0330801 A1 | 12/2010 | Rouh |
| 2011/0004498 A1 | 1/2011 | Readshaw |
| 2011/0004626 A1 | 1/2011 | Naeymi-rad et al. |
| 2011/0022312 A1 | 1/2011 | McDonough et al. |
| 2011/0047540 A1 | 2/2011 | Williams et al. |
| 2011/0055140 A1 | 3/2011 | Roychowdhury |
| 2011/0061013 A1 | 3/2011 | Billicki et al. |
| 2011/0066497 A1 | 3/2011 | Gopinath et al. |
| 2011/0074788 A1 | 3/2011 | Regan et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce et al. |
| 2011/0093440 A1 | 4/2011 | Asakura et al. |
| 2011/0099133 A1 | 4/2011 | Chang et al. |
| 2011/0107196 A1 | 5/2011 | Foster |
| 2011/0131122 A1 | 6/2011 | Griffin et al. |
| 2011/0153384 A1 | 6/2011 | Horne et al. |
| 2011/0158469 A1 | 6/2011 | Mastykarz |
| 2011/0161137 A1* | 6/2011 | Ubalde ............. G06F 17/30241 705/7.34 |
| 2011/0161409 A1 | 6/2011 | Nair et al. |
| 2011/0167054 A1 | 7/2011 | Bailey et al. |
| 2011/0167493 A1 | 7/2011 | Song et al. |
| 2011/0173093 A1 | 7/2011 | Psota et al. |
| 2011/0178842 A1 | 7/2011 | Rane et al. |
| 2011/0179048 A1 | 7/2011 | Satlow |
| 2011/0202557 A1 | 8/2011 | Atsmon et al. |
| 2011/0205231 A1* | 8/2011 | Hartley .................. G06Q 40/00 345/440 |
| 2011/0208565 A1 | 8/2011 | Ross et al. |
| 2011/0208822 A1 | 8/2011 | Rathod |
| 2011/0213655 A1 | 9/2011 | Henkin |
| 2011/0218955 A1 | 9/2011 | Tang |
| 2011/0219450 A1 | 9/2011 | McDougal et al. |
| 2011/0225482 A1 | 9/2011 | Chan et al. |
| 2011/0225586 A1 | 9/2011 | Bentley et al. |
| 2011/0225650 A1 | 9/2011 | Margolies et al. |
| 2011/0231223 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz |
| 2011/0252282 A1 | 10/2011 | Meek et al. |
| 2011/0258216 A1 | 10/2011 | Supakkul |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0314546 A1 | 12/2011 | Aziz et al. |
| 2012/0004894 A1 | 1/2012 | Butler et al. |
| 2012/0004904 A1 | 1/2012 | Shin et al. |
| 2012/0010812 A1 | 1/2012 | Thompson |
| 2012/0011238 A1 | 1/2012 | Rathod |
| 2012/0011245 A1 | 1/2012 | Gillette et al. |
| 2012/0013684 A1 | 1/2012 | Robertson et al. |
| 2012/0015673 A1 | 1/2012 | Klassen et al. |
| 2012/0022945 A1 | 1/2012 | Falkenborg et al. |
| 2012/0032975 A1 | 2/2012 | Koch |
| 2012/0036434 A1 | 2/2012 | Oberstein |
| 2012/0054284 A1 | 3/2012 | Rakshit |
| 2012/0059853 A1 | 3/2012 | Jagota |
| 2012/0065987 A1 | 3/2012 | Farooq et al. |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084135 A1 | 4/2012 | Nissan et al. |
| 2012/0084184 A1 | 4/2012 | Raleigh et al. |
| 2012/0084287 A1 | 4/2012 | Lakshminarayan et al. |
| 2012/0084866 A1 | 4/2012 | Stolfo |
| 2012/0089606 A1 | 4/2012 | Eshwar et al. |
| 2012/0116828 A1 | 5/2012 | Shannon |
| 2012/0123989 A1 | 5/2012 | Yu et al. |
| 2012/0131107 A1 | 5/2012 | Yost |
| 2012/0131512 A1 | 5/2012 | Takeuchi et al. |
| 2012/0136804 A1 | 5/2012 | Lucia et al. |
| 2012/0150578 A1 | 6/2012 | Mangat et al. |
| 2012/0158626 A1 | 6/2012 | Zhu et al. |
| 2012/0159362 A1 | 6/2012 | Brown et al. |
| 2012/0166929 A1 | 6/2012 | Henderson et al. |
| 2012/0173381 A1 | 7/2012 | Smith |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovich |
| 2012/0215784 A1 | 8/2012 | King et al. |
| 2012/0215898 A1 | 8/2012 | Shah et al. |
| 2012/0216106 A1 | 8/2012 | Casey |
| 2012/0221553 A1 | 8/2012 | Wittmer et al. |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0254129 A1 | 10/2012 | Wheeler et al. |
| 2012/0266245 A1 | 10/2012 | McDougal et al. |
| 2012/0268269 A1 | 10/2012 | Doyle |
| 2012/0284670 A1 | 11/2012 | Kashik et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes |
| 2012/0323888 A1 | 12/2012 | Osann, Jr. |
| 2013/0005362 A1 | 1/2013 | Borghei |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006947 A1 | 1/2013 | Akinyemi et al. |
| 2013/0013642 A1 | 1/2013 | Klein et al. |
| 2013/0016106 A1 | 1/2013 | Yip et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0030873 A1* | 1/2013 | Davidson ............... G06Q 10/06 705/7.36 |
| 2013/0054306 A1 | 2/2013 | Bhalla |
| 2013/0055264 A1 | 2/2013 | Burr et al. |
| 2013/0124567 A1 | 2/2013 | Balinsky et al. |
| 2013/0057551 A1 | 3/2013 | Ebert et al. |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0110746 A1 | 5/2013 | Ahn |
| 2013/0113815 A1* | 5/2013 | Brugler ............. G01C 21/3682 345/589 |
| 2013/0124193 A1 | 5/2013 | Holmberg |
| 2013/0132348 A1 | 5/2013 | Garrod et al. |
| 2013/0143597 A1 | 6/2013 | Mitsuya et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |

(56) References Cited

U.S. PATENT DOCUMENTS

| | | |
|---|---|---|
| 2013/0160120 A1 | 6/2013 | Malaviya et al. |
| 2013/0165069 A1 | 6/2013 | Nitta et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0185245 A1 | 7/2013 | Anderson |
| 2013/0185307 A1 | 7/2013 | El-Yaniv et al. |
| 2013/0185320 A1 | 7/2013 | Iwasaki et al. |
| 2013/0196614 A1 | 8/2013 | Pahlevani |
| 2013/0197925 A1 | 8/2013 | Blue |
| 2013/0211985 A1 | 8/2013 | Clark et al. |
| 2013/0226318 A1 | 8/2013 | Procyk |
| 2013/0226879 A1 | 8/2013 | Talukder et al. |
| 2013/0226944 A1 | 8/2013 | Baid et al. |
| 2013/0232045 A1 | 9/2013 | Tai et al. |
| 2013/0235749 A1 | 9/2013 | Cho et al. |
| 2013/0238616 A1 | 9/2013 | Rose et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246597 A1 | 9/2013 | Iizawa et al. |
| 2013/0208565 A1 | 10/2013 | Castellanos et al. |
| 2013/0262171 A1 | 10/2013 | Solodko et al. |
| 2013/0262497 A1 | 10/2013 | Case et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0276799 A1 | 10/2013 | Davidson |
| 2013/0282696 A1 | 10/2013 | John et al. |
| 2013/0288719 A1 | 10/2013 | Alonzo |
| 2013/0290825 A1 | 10/2013 | Arndt et al. |
| 2013/0295970 A1 | 11/2013 | Sheshadri et al. |
| 2013/0297619 A1 | 11/2013 | Chandrasekaran et al. |
| 2013/0304770 A1 | 11/2013 | Boero et al. |
| 2013/0318594 A1 | 11/2013 | Hoy et al. |
| 2013/0325826 A1 | 12/2013 | Agarwal et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0006404 A1 | 1/2014 | Mcgrew et al. |
| 2014/0012796 A1 | 1/2014 | Petersen et al. |
| 2014/0032506 A1 | 1/2014 | Hoey et al. |
| 2014/0040371 A1 | 2/2014 | Gurevich et al. |
| 2014/0058763 A1 | 2/2014 | Zizzamia et al. |
| 2014/0058914 A1 | 2/2014 | Song et al. |
| 2014/0068487 A1 | 3/2014 | Steiger et al. |
| 2014/0081652 A1 | 3/2014 | Klindworth |
| 2014/0089339 A1 | 3/2014 | Siddiqui et al. |
| 2014/0095363 A1 | 4/2014 | Caldwell |
| 2014/0095509 A1 | 4/2014 | Patton |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0208281 A1 | 7/2014 | Ming |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0258246 A1 | 9/2014 | Lo Faro et al. |
| 2014/0258827 A1 | 9/2014 | Gormish et al. |
| 2014/0283067 A1 | 9/2014 | Call et al. |
| 2014/0302783 A1 | 10/2014 | Aiuto et al. |
| 2014/0310266 A1* | 10/2014 | Greenfield .......... G06F 17/3053 707/723 |
| 2014/0310282 A1 | 10/2014 | Sprague et al. |
| 2014/0331119 A1 | 11/2014 | Dixon et al. |
| 2014/0344230 A1 | 11/2014 | Krause et al. |
| 2014/0351070 A1 | 11/2014 | Christner et al. |
| 2014/0357299 A1 | 12/2014 | Xu et al. |
| 2014/0358829 A1 | 12/2014 | Hurwitz |
| 2014/0366132 A1 | 12/2014 | Stiansen et al. |
| 2014/0379812 A1 | 12/2014 | Bastide, II et al. |
| 2015/0012509 A1 | 1/2015 | Kirn |
| 2015/0026622 A1 | 1/2015 | Roaldson |
| 2015/0046481 A1 | 2/2015 | Elliot |
| 2015/0067533 A1 | 3/2015 | Volach |
| 2015/0073929 A1 | 3/2015 | Psota et al. |
| 2015/0073954 A1 | 3/2015 | Braff |
| 2015/0080012 A1 | 3/2015 | Sprague et al. |
| 2015/0089353 A1 | 3/2015 | Folkening |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0101062 A1 | 4/2015 | Silver et al. |
| 2015/0106379 A1 | 4/2015 | Elliot et al. |
| 2015/0135256 A1 | 5/2015 | Hoy et al. |
| 2015/0178825 A1 | 6/2015 | Huerta |
| 2015/0186483 A1 | 7/2015 | Tappan et al. |
| 2015/0188872 A1 | 7/2015 | White |
| 2015/0212663 A1 | 7/2015 | Papale et al. |
| 2015/0235334 A1 | 8/2015 | Wang et al. |
| 2015/0254220 A1 | 9/2015 | Burr et al. |
| 2015/0331919 A1 | 11/2015 | Freeland et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0034470 A1 | 2/2016 | Sprague et al. |
| 2016/0048937 A1 | 2/2016 | Mathura et al. |
| 2016/0055501 A1 | 2/2016 | Mukherjee et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0110458 A1 | 4/2016 | Colgrove et al. |
| 2016/0162519 A1 | 6/2016 | Stowe et al. |
| 2016/0180451 A1 | 6/2016 | Visbal et al. |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102014213036 A1 | 1/2015 |
| EP | 1191463 | 3/2002 |
| EP | 1672527 A2 | 6/2006 |
| EP | 2400448 | 12/2011 |
| EP | 2487610 | 8/2012 |
| EP | 2555153 | 2/2013 |
| EP | 2778913 A1 | 9/2014 |
| EP | 2778914 A1 | 9/2014 |
| EP | 2816513 | 12/2014 |
| EP | 2858018 | 4/2015 |
| EP | 2869211 | 5/2015 |
| EP | 2889814 | 7/2015 |
| EP | 2892197 | 7/2015 |
| EP | 2911078 | 8/2015 |
| EP | 2916276 | 9/2015 |
| EP | 2963577 | 1/2016 |
| EP | 2963595 | 1/2016 |
| EP | 2985729 A1 | 2/2016 |
| EP | 2988258 | 2/2016 |
| EP | 2993595 A1 | 3/2016 |
| EP | 3002691 A1 | 4/2016 |
| EP | 3009943 A1 | 4/2016 |
| EP | 3018879 A1 | 5/2016 |
| EP | 3032441 A2 | 6/2016 |
| EP | 3035214 A1 | 6/2016 |

(56) References Cited

FOREIGN PATENT DOCUMENTS

| | | |
|---|---|---|
| EP | 3037991 A1 | 6/2016 |
| EP | 3038046 A1 | 6/2016 |
| GB | 2366498 A | 3/2002 |
| GB | 2513247 A | 10/2014 |
| GB | 2513472 A | 10/2014 |
| GB | 2513721 A | 11/2014 |
| GB | 2517582 A | 2/2015 |
| NL | 2013134 A | 1/2015 |
| WO | WO-01025906 A1 | 4/2001 |
| WO | WO-2001088750 A1 | 11/2001 |
| WO | WO 2004/038548 | 5/2004 |
| WO | WO 2005/0116851 | 12/2005 |
| WO | WO-2007133206 A1 | 11/2007 |
| WO | WO 2008/011728 | 1/2008 |
| WO | WO 2008/113059 | 9/2008 |
| WO | WO-2009051987 A1 | 4/2009 |
| WO | WO-2010030913 A2 | 3/2010 |
| WO | WO-2010030914 A2 | 3/2010 |
| WO | WO-2010030919 A2 | 3/2010 |
| WO | WO-2012061162 A1 | 5/2012 |
| WO | WO-2012119008 A2 | 9/2012 |
| WO | WO 2013/126281 | 8/2013 |

OTHER PUBLICATIONS

"A Word About Banks and the Laundering of Drug Money," Aug. 18, 2012, http://www.golemxiv.co.uk/2012/08/a-word-about-banks-and-the-laundering-of-drug-money/.

Alfred, Rayner "Summarizing Relational Data Using Semi-Supervised Genetic Algorithm-Based Clustering Techniques", Journal of Computer Science, 2010, vol. 6, No. 7, pp. 775-784.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn et al., "Semi-supervised Clustering with User Feedback," Constrained Clustering: Advances in Algorithms, Theory, and Applications 4.1, 2003, pp. 17-32.

Countly Mobile Analytics, <http://count.ly/> Printed Jul. 18, 2013 in 9 pages.

DISTIMO—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation," Grant 98-IJ-CX-K005, May 6, 2002, 37 pages.

Gu et al., "Record Linkage: Current Practice and Future Directions," Jan. 15, 2004, pp. 32.

Hansen et al. "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services" HiPC 2006, LNCS 4297, pp. 277-288, 2006.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

IBM, "Determining Business Object Structure," IBM, 2004, 9 pages.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kontagent Mobile Analytics, <http://www.kontagent.com/> Printed Jul. 18, 2013 in 9 pages.

Localytics—Mobile App Marketing & Analytics, <http://www.localytics.com/> Printed Jul. 18, 2013 in 12 pages.

Manno et al., "Introducing Collaboration in Single-user Applications through the Centralized Control Architecture," 2010, pp. 10.

Mixpanel—Mobile Analytics, <https://mixpanel.com/> Printed Jul. 18, 2013 in 13 pages.

"Money Laundering Risks and E-Gaming: A European Overview and Assessment," 2009, http://www.cf.ac.uk/socsi/resources/Levi_Final_Money_Laundering_Risks_egaming.pdf.

Nolan et al., MCARTA: A Malicious Code Automated Run-Time Analysis Framework, Homeland Security, 2012 IEEE Conference on Technologies for, Nov. 13, 2012, pp. 13-17.

Open Web Analytics (OWA), <http://www.openwebanalytics.com/> Printed Jul. 19, 2013 in 5 pages.

Perdisci et al., "Behavioral Clustering of HTTP-Based Malware and Signature Generation Using Malicious Network Traces," USENIX, Mar. 18, 2010, pp. 1-14.

Piwik—Free Web Analytics Software. <http://piwik.org/> Printed Jul. 19, 2013 in18 pages.

"Potential Money Laundering Warning Signs," snapshot taken 2003, http://web.archive.org/web/20030816090055/http:/finsolinc.com/ANTI-MONEY%20LAUNDERING%20TRAINING%20GUIDES.pdf.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

Sigrist et al., "PROSITE, a Protein Domain Database for Functional Characterization and Annotation," Nucleic Acids Research 38.Suppl 1, 2010, pp. D161-D166.

StatCounter—Free Invisible Web Tracker, Hit Counter and Web Stats, <http://statcounter.com/> Printed Jul. 19, 2013 in 17 pages.

Symantec Corporation, "E-Security Begins with Sound Security Policies," Announcement Symantec, Jun. 14, 2001.

TestFlight—Beta Testing On The Fly, <http://testflightapp.com/> Printed Jul. 18, 2013 in 3 pages.

trak.io, <http://trak.io/> printed Jul. 18, 2013 in 3 pages.

UserMetrix, <http://usermetrix.com/android-analytics> printed Jul. 18, 2013 in 3 pages.

"Using Whois Based Geolocation and Google Maps API for Support Cybercrime Investigations," http://wseas.us/e-library/conferences/2013/Dubrovnik/TELECIRC/TELECIRC-32.pdf.

Valentini et al., "Ensembles of Learning Machines," M. Marinaro and R. Tagliaferri (Eds.): WIRN VIETRI 2002, LNCS 2486, pp. 3-20.

(56) References Cited

OTHER PUBLICATIONS

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.

Wikipedia, "Multimap," Jan. 1, 2013, https://en.wikipedia.org/w/index.php?title=Multimap&oldid=530800748.

Notice of Allowance for U.S. Appl. No. 14/473,860 dated Jan. 5, 2015.
Notice of Allowance for U.S. Appl. No. 13/181,392 dated Jan. 22, 2015.
Notice of Allowance for U.S. Appl. No. 13/838,815 dated Jan. 29, 2015.
Notice of Allowance for U.S. Appl. No. 14/479,863 dated Mar. 31, 2015.
Notice of Allowance for U.S. Appl. No. 14/616,080 dated Apr. 2, 2015.
Notice of Allowance for U.S. Appl. No. 14/486,991 dated May 1, 2015.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/264,445 dated May 14, 2015.
Notice of Allowance for U.S. Appl. No. 14/139,713 dated Jun. 12, 2015.
Notice of Allowance for U.S. Appl. No. 14/139,640 dated Jun. 17, 2015.
Notice of Allowance for U.S. Appl. No. 13/838,815 dated Jun. 19, 2015.
Notice of Allowance for U.S. Appl. No. 14/139,628 dated Jun. 24, 2015.
Notice of Allowance for U.S. Appl. No. 14/473,552 dated Jul. 24, 2015.
Notice of Allowance for U.S. Appl. No. 14/278,963 dated Sep. 2, 2015.
Notice of Allowance for U.S. Appl. No. 14/487,342 dated Sep. 23, 2015.
Notice of Allowance for U.S. Appl. No. 14/323,935 dated Oct. 1, 2015.
Notice of Allowance for U.S. Appl. No. 14/552,336 dated Nov. 3, 2015.
Notice of Allowance for U.S. Appl. No. 14/334,232 dated Nov. 10, 2015.
Notice of Allowance for U.S. Appl. No. 14/690,905 dated Nov. 23, 2015.
Notice of Allowance for U.S. Appl. No. 14/746,671 dated Jan. 21, 2016.
Notice of Allowance for U.S. Appl. No. 14/027,118 dated Feb. 4, 2016.
Official Communication for U.S. Appl. No. 14/225,160 dated Jul. 29, 2014.
Official Communication for U.S. Appl. No. 13/181,392 dated Aug. 28, 2014.
Official Communication for U.S. Appl. No. 14/225,084 dated Sep. 2, 2014.
Official Communication for U.S. Appl. No. 14/225,006 dated Sep. 10, 2014.
Official Communication for U.S. Appl. No. 14/451,221 dated Oct. 21, 2014.
Official Communication for U.S. Appl. No. 14/225,160 dated Oct. 22, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/278,963 dated Jan. 30, 2015.
Official Communication for U.S. Appl. No. 14/225,160 dated Feb. 11, 2015.
Official Communication for U.S. Appl. No. 14/088,251 dated Feb. 12, 2015.
Official Communication for U.S. Appl. No. 14/225,084 dated Feb. 20, 2015.
Official Communication for U.S. Appl. No. 14/473,552 dated Feb. 24, 2015.
Official Communication for U.S. Appl. No. 14/225,006 dated Feb. 27, 2015.
Official Communication for U.S. Appl. No. 14/486,991 dated Mar. 10, 2015.
Official Communication for U.S. Appl. No. 14/571,098 dated Mar. 11, 2015.
Official Communication for U.S. Appl. No. 14/518,757 dated Apr. 2, 2015.
Official Communication for U.S. Appl. No. 14/264,445 dated Apr. 17, 2015.
Official Communication for U.S. Appl. No. 14/487,342 dated Apr. 23, 2015.
Official Communication for U.S. Appl. No. 14/196,814 dated May 5, 2015.
Official Communication for U.S. Appl. No. 14/027,118 dated May 12, 2015.
Official Communication for U.S. Appl. No. 14/639,606 dated May 18, 2015.
Official Communication for U.S. Appl. No. 14/225,160 dated May 20, 2015.
Official Communication for U.S. Appl. No. 14/088,251 dated May 20, 2015.
Official Communication for U.S. Appl. No. 14/463,615 dated May 21, 2015.
Official Communication for U.S. Appl. No. 14/579,752 dated May 26, 2015.
Official Communication for U.S. Appl. No. 13/831,199 dated Jun. 3, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 14/088,251 dated Jun. 30, 2015.
Official Communication for U.S. Appl. No. 14/334,232 dated Jul. 10, 2015.
Official Communication for U.S. Appl. No. 14/552,336 dated Jul. 20, 2015.
Official Communication for U.S. Appl. No. 14/518,757 dated Jul. 20, 2015.
Official Communication for U.S. Appl. No. 14/639,606 dated Jul. 24, 2015.
Official Communication for U.S. Appl. No. 14/676,621 dated Jul. 30, 2015.
Official Communication for U.S. Appl. No. 13/839,026 dated Aug. 4, 2015.
Official Communication for U.S. Appl. No. 14/571,098 dated Aug. 5, 2015.
Official Communication for U.S. Appl. No. 14/225,160 dated Aug. 12, 2015.
Official Communication for U.S. Appl. No. 14/579,752 dated Aug. 19, 2015.

(56) References Cited

OTHER PUBLICATIONS

Official Communication for U.S. Appl. No. 14/571,098 dated Aug. 24, 2015.
Official Communication for U.S. Appl. No. 14/088,251 dated Aug. 26, 2015.
Official Communication for U.S. Appl. No. 14/225,006 dated Sep. 2, 2015.
Official Communication for U.S. Appl. No. 14/631,633 dated Sep. 10, 2015.
Official Communication for U.S. Appl. No. 14/463,615 dated Sep. 10, 2015.
Official Communication for U.S. Appl. No. 14/726,353 dated Sep. 10, 2015.
Official Communication for U.S. Appl. No. 14/225,084 dated Sep. 11, 2015.
Official Communication for U.S. Appl. No. 14/562,524 dated Sep. 14, 2015.
Official Communication for U.S. Appl. No. 14/027,118 dated Sep. 16, 2015.
Official Communication for U.S. Appl. No. 14/813,749 dated Sep. 28, 2015.
Official Communication for U.S. Appl. No. 14/746,671 dated Sep. 28, 2015.
Official Communication for U.S. Appl. No. 14/251,485 dated Oct. 1, 2015.
Official Communication for U.S. Appl. No. 13/831,199 dated Oct. 6, 2015.
Official Communication for U.S. Appl. No. 14/690,905 dated Oct. 7, 2015.
Official Communication for U.S. Appl. No. 14/196,814 dated Oct. 7, 2015.
Official Communication for U.S. Appl. No. 14/141,252 dated Oct. 8, 2015.
Official Communication for U.S. Appl. No. 13/827,491 dated Oct. 9, 2015.
Official Communication for U.S. Appl. No. 14/639,606 dated Oct. 16, 2015.
Official Communication for U.S. Appl. No. 14/483,527 dated Oct. 28, 2015.
Official Communication for U.S. Appl. No. 14/676,621 dated Oct. 29, 2015.
Official Communication for U.S. Appl. No. 14/571,098 dated Nov. 10, 2015.
Official Communication for U.S. Appl. No. 14/562,524 dated Nov. 10, 2015.
Official Communication for U.S. Appl. No. 14/746,671 dated Nov. 12, 2015.
Official Communication for U.S. Appl. No. 14/842,734 dated Nov. 19, 2015.
Official Communication for U.S. Appl. No. 14/518,757 dated Dec. 1, 2015.
Official Communication for U.S. Appl. No. 14/306,138 dated Dec. 3, 2015.
Official Communication for U.S. Appl. No. 14/463,615 dated Dec. 9, 2015.
Official Communication for U.S. Appl. No. 14/579,752 dated Dec. 9, 2015.
Official Communication for U.S. Appl. No. 14/800,447 dated Dec. 10, 2015.
Official Communication for U.S. Appl. No. 14/225,006 dated Dec. 21, 2015.
Official Communication for U.S. Appl. No. 14/306,147 dated Dec. 24, 2015.
Official Communication for U.S. Appl. No. 14/306,138 dated Dec. 24, 2015.
Official Communication for U.S. Appl. No. 14/225,084 dated Jan. 4, 2016.
Official Communication for U.S. Appl. No. 14/580,218 dated Jan. 7, 2016.
Official Communication for U.S. Appl. No. 14/306,154 dated Feb. 1, 2016.
Official Communication for U.S. Appl. No. 14/562,524 dated Feb. 18, 2016.
Official Communication for U.S. Appl. No. 14/581,920 dated Mar. 1, 2016.
Official Communication for U.S. Appl. No. 14/726,353 dated Mar. 1, 2016.
Official Communication for U.S. Appl. No. 14/857,071 dated Mar. 2, 2016.
Official Communication for U.S. Appl. No. 14/306,147 dated Mar. 4, 2016.
Restriction Requirement for U.S. Appl. No. 13/839,026 dated Apr. 2, 2015.
Restriction Requirement for U.S. Appl. No. 14/857,071 dated Dec. 11, 2015.
Official Communication for European Patent Application No. 14159535.5 dated May 22, 2014.
Official Communication for European Patent Application No. 14159447.3 dated Nov. 25, 2014.
Official Communication for European Patent Application No. 14159447.3 dated Jan. 8, 2015.
Official Communication for European Patent Application No. 14187996.5 dated Feb. 12, 2015.
Official Communication for European Patent Application No. 14200298.9 dated May 13, 2015.
Official Communication for European Patent Application No. 14191540.5 dated May 27, 2015.
Official Communication for European Patent Application No. 14200246.8 dated May 29, 2015.
Official Communication for European Patent Application No. 15157642.8 dated Jul. 20, 2015.
Official Communication for European Patent Application No. 15156004.2 dated Aug. 24, 2015.
Official Communication for European Patent Application No. 15181419.1 dated Sep. 29, 2015.
Official Communication for European Patent Application No. 15155845.9 dated Oct. 6, 2015.
Official Communication for European Patent Application No. 15175151.8 dated Nov. 25, 2015.
Official Communication for European Patent Application No. 15180515.7 dated Dec. 14, 2015.
Official Communication for European Patent Application No. 15184764.7 dated Dec. 14, 2015.
Official Communication for Great Britain Application No. 1404457.2 dated Aug. 14, 2014.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application 2012438 dated Sep. 21, 2015.
Official Communication for New Zealand Patent Application No. 622473 dated Mar. 27, 2014.
Official Communication for New Zealand Patent Application No. 622501 dated Apr. 1, 2014.

(56) References Cited

OTHER PUBLICATIONS

Official Communication for New Zealand Patent Application No. 622513 dated Apr. 3, 2014.
Official Communication for New Zealand Patent Application No. 622501 dated Jun. 5, 2014.
Official Communication for New Zealand Patent Application No. 622473 dated Jun. 19, 2014.
Official Communication for New Zealand Patent Application No. 628161 dated Aug. 25, 2014.
"A Tour of Pinboard", [Online] Retrieved from the internet: <https://pinboard.in/tour/>, (May 15, 2014), 1-6.
"U.S. Appl. No. 12/556,307, Final Office Action dated Feb. 13, 2012", 27 pgs.
"U.S. Appl. No. 12/556,307, Final Office Action dated Mar. 14, 2014", 27 pgs.
"U.S. Appl. No. 12/556,307, Non Final Office Action dated Jun. 9, 2015", 33 pgs.
"U.S. Appl. No. 12/556,307, Non Final Office Action dated Sep. 2, 2011", 23 pgs.
"U.S. Appl. No. 12/556,307, Non Final Office Action dated Oct. 1, 2013", 24 pgs.
"U.S. Appl. No. 12/556,307, Notice of Allowance dated Jan. 4, 2016", 8 pgs.
"U.S. Appl. No. 12/556,307, Notice of Allowance dated Mar. 21, 2016", 11 pgs.
"U.S. Appl. No. 12/556,318, Notice of Allowance dated Apr. 11, 2016", 65 pgs.
"U.S. Appl. No. 12/556,321, Final Office Action dated Feb. 25, 2016", 26 pgs.
"U.S. Appl. No. 12/556,321, Final Office Action dated Jun. 6, 2012", 27 pgs.
"U.S. Appl. No. 12/556,321, Non Final Office Action dated Jul. 7, 2015", 18 pgs.
"U.S. Appl. No. 12/556,321, Non Final Office Action dated Dec. 7, 2011", 18 pgs.
"U.S. Appl. No. 13/669,274, Advisory Action dated Aug. 26, 2015", 7 pgs.
"U.S. Appl. No. 13/669,274, Final Office Action dated May 6, 2015", 12 pgs.
"U.S. Appl. No. 13/669,274, Non Final Office Action dated May 2, 2016", 25 pgs.
"U.S. Appl. No. 13/827,491, Non Final Office Action dated Mar. 30, 2016", 25 pgs.
"U.S. Appl. No. 13/831,199, Non Final Office Action dated May 9, 2016", 12 pgs.
"U.S. Appl. No. 13/839,026, Notice of Allowance dated Mar. 11, 2016", 27 pgs.
"U.S. Appl. No. 14/014,313, Final Office Action dated Feb. 26, 2016", 16 pgs.
"U.S. Appl. No. 14/014,313, First Action Interview Pre-Interview Communication dated Jun. 18, 2015", 4 pgs.
"U.S. Appl. No. 14/088,251, Final Office Action dated Apr. 18, 2016", 32 pgs.
"U.S. Appl. No. 14/094,418, Notice of Allowance dated Jan. 25, 2016", 22 pgs.
"U.S. Appl. No. 14/102,394, Office Action dated Mar. 27, 2014", 16 pgs.
"U.S. Appl. No. 14/108,187, Applicant-Initiated Interview Summary dated Apr. 17, 2014", 8 pgs.
"U.S. Appl. No. 14/108,187, First Action Interview dated Mar. 20, 2014", 7 pgs.
"U.S. Appl. No. 14/135,289, First Action Interview Office Action Summary dated Jul. 7, 2014", 12 pgs.
"U.S. Appl. No. 14/135,289, First Action Interview Pilot Program Pre-Interview Communication dated Apr. 16, 2014", 8 pgs.
"U.S. Appl. No. 14/192,767 Corrected Notice of Allowability dated Apr. 20, 2015", 6 pgs.
"U.S. Appl. No. 14/192,767, First Action Interview Office Action Summary dated Sep. 24, 2014", 8 pgs.
"U.S. Appl. No. 14/192,767, First Action Interview Pilot Program Pre-Interview Communication dated May 6, 2014", 23 pgs.
"U.S. Appl. No. 14/196,814, Final Office Action dated Jun. 13, 2016", 23 pgs.
"U.S. Appl. No. 14/196,814, First Action Interview Office Action Summary dated Aug. 13, 2014", 8 pgs.
"U.S. Appl. No. 14/222,364, Non Final Office Action dated Dec. 9, 2015", 38 pgs.
"U.S. Appl. No. 14/265,637, First Action Interview Pre-Interview Communication dated Sep. 26, 2014", 6 pgs.
"U.S. Appl. No. 14/265,637, Notice of Allowance dated Feb. 13, 2015", 11 pgs.
"U.S. Appl. No. 14/268,964, Non Final Office Action dated Jul. 11, 2014", 10 pgs.
"U.S. Appl. No. 14/289,596, Final Office Action dated Aug. 5, 2015", 15 pgs.
"U.S. Appl. No. 14/304,741, Final Office Action dated Mar. 3, 2015", 24 pgs.
"U.S. Appl. No. 14/304,741, Notice of Allowance dated Apr. 7, 2015", 22 pgs.
"U.S. Appl. No. 14/304,741, Pre-Interview Communication dated Aug. 6, 2014", 13 pgs.
"U.S. Appl. No. 14/306,138, Non Final Office Action dated Mar. 17, 2016", 23 pgs.
"U.S. Appl. No. 14/306,147, Non Final Office Action dated Jun. 3, 2016", 43 pgs.
"U.S. Appl. No. 14/306,154, Non Final Office Action dated Mar. 17, 2016", 31 pgs.
"U.S. Appl. No. 14/332,306, First Action Interview Pre-Interview Communication dated May 20, 2016", 5 pgs.
"U.S. Appl. No. 14/463,615, Advisory Action dated Aug. 19, 2016", 3 pgs.
"U.S. Appl. No. 14/463,615, Examiner Interview Summary dated Mar. 21, 2016", 3 pgs.
"U.S. Appl. No. 14/463,615, Final Office Action dated May 12, 2016", 44 pgs.
"U.S. Appl. No. 14/473,860, First Action Interview dated Nov. 4, 2014", 23 pgs.
"U.S. Appl. No. 14/479,160, First Action Interview Pre-Interview Communication dated Apr. 20, 2016", 7 pgs.
"U.S. Appl. No. 14/526,066, Final Office Action dated May 6, 2016", 16 pgs.
"U.S. Appl. No. 14/526,066, Non Final Office Action dated Jan. 21, 2016", 24 pgs.
"U.S. Appl. No. 14/571,098, Final Office Action dated Feb. 23, 2016", 37 pgs.
"U.S. Appl. No. 14/579,752, Notice of Allowance dated Apr. 4, 2016", 8 pgs.
"U.S. Appl. No. 14/581,920, First Action Interview Pre-Interview Communication dated Jun. 13, 2016", 7 pgs.
"U.S. Appl. No. 14/581,920, Office Action Summary dated May 3, 2016", 7 pgs.
"U.S. Appl. No. 14/639,606, Non Final Office Action dated Apr. 5, 2016", 31 pgs.
"U.S. Appl. No. 14/676,621, Notice of Allowance dated Feb. 10, 2016", 5 pgs.
"U.S. Appl. No. 14/698,432, Non Final Office Action dated Jun. 3, 2016", 44 pgs.
"U.S. Appl. No. 14/715,834, Final Office Action dated Jun. 28, 2016", 13 pgs.
"U.S. Appl. No. 14/715,834, First Action Interview Pre-Interview Communication dated Feb. 19, 2016", 19 pgs.
"U.S. Appl. No. 14/715,834, First Action Interview Pre-Interview Communication dated Apr. 13, 2016", 21 pgs.
"U.S. Appl. No. 14/741,256, Restriction Requirement dated Feb. 9, 2016", 6 pgs.
"U.S. Appl. No. 14/800,447, Examiner Interview Summary dated Mar. 3, 2016", 28 pgs.
"U.S. Appl. No. 14/800,447, Final Office Action dated Jun. 6, 2016", 27 pgs.
"U.S. Appl. No. 14/800,447, Non Final Office Action dated Aug. 15, 2017", 20 pgs.

(56) References Cited

OTHER PUBLICATIONS

"U.S. Appl. No. 14/800,447, Notice of Allowance dated Jun. 4, 2018", 12 pgs.
"U.S. Appl. No. 14/811,649, Office Action dated May 18, 2016", 24 pgs.
"U.S. Appl. No. 14/841,338, Non Final Office Action dated Feb. 18, 2016", 39 pgs.
"U.S. Appl. No. 14/871,465, First Action Interview Pre-Interview Communication dated Feb. 9, 2016", 32 pgs.
"U.S. Appl. No. 14/871,465, First Action Interview Pre-Interview Communication dated Apr. 11, 2016", 7 pgs.
"U.S. Appl. No. 14/883,498, First Action Interview Pre-Interview Communication dated Dec. 24, 2015", 33 pgs.
"U.S. Appl. No. 14/883,498, Non Final Office Action dated Mar. 17, 2016", 18 pgs.
"U.S. Appl. No. 14/961,481, Notice of Allowance dated May 2, 2016", 6 pgs.
"U.S. Appl. No. 14/961,481, Pre-Interview Communication dated Mar. 2, 2016", 12 pgs.
"U.S. Appl. No. 14/975,215, First Action Interview Pre-Interview Communication dated May 19, 2016", 5 pgs.
"U.S. Appl. No. 15/047,405, Non Final Office Action dated Apr. 1, 2016", 20 pgs.
"U.S. Appl. No. 15/072,174, First Action Interview Pre-Interview Communication dated Jun. 1, 2016", 5 pgs.
"Australian Application Serial No. 2013251186, First Examiner's Report dated Mar. 12, 2015", 3 pgs.
"Australian Application Serial No. 2013251186, Notice of Acceptance dated Nov. 6, 2015", 2 pgs.
"Australian Application Serial No. 2014201506, Office Action dated Feb. 27, 2015", 3 pgs.
"Australian Application Serial No. 2014201507, Office Action dated Feb. 27, 2015", 2 pgs.
"Australian Application Serial No. 2014203669, Notice of Acceptance dated Jan. 21, 2016", 2 pgs.
"Australian Application Serial No. 2014203669, Office Action dated May 29, 2015", 2 pgs.
"Canadian Application Serial No. 2,831,660, Office Action dated Jun. 9, 2015", 4 pgs.
"Clip2Net—Share files, folders and screenshots easily", Online Tech Tips, [Online]. Retrieved from the Internet: <URL: http://www.online-tech-tips.com/free-software-downloads/share-files-folders-screenshots/>, (Apr. 2, 2008), 5 pgs.
"Delicious", [Online]. Retrieved from the Internet: <URL: http://delicious.com/>, (accessed May 15, 2014), 1 pg.
"E-MailRelay", Internet Archive Wayback Machine [Online]. Retrieved from the Internet: <URL: http://emailrelay.sourceforge.net/, (accessed Aug. 21, 2008), 2 pgs.
"Entity Resolution—A Real-World Problem of Matching Records", Techniques: Minhashing, Locality-Sensitive Hashing Measuring the Quality of the Results, [Online] retrieved from the internet: <http://grupoweb.upf.es/bd-web/slides/ullman.pdf>, (Nov. 2006), 1-16.
"European Application Serial No. 15190307.7, Extended Search Report dated Feb. 19, 2016", 8 pgs.
"European Application Serial No. 09813700.3, Extended European Search Report dated Apr. 3, 2014", 9 pgs.
"European Application Serial No. 10188239.7, Non Final Office Action dated Mar. 24, 16", 6 pgs.
"European Application Serial No. 12181585.6, Communication pursuant to Article 94(3) EPC dated Sep. 4, 2015", 9 pgs.
"European Application Serial No. 14158958.0, Communication Pursuant to Article 94(3) EPC dated Mar. 11, 2016", 5 pgs.
"European Application Serial No. 14158958.0, Communication Pursuant to Article 94(3) EPC dated Apr. 16, 2015", 9 pgs.
"European Application Serial No. 14158958.0, Extended European Search Report dated Jun. 3, 2014", 11 pgs.
"European Application Serial No. 14158977.0, Communication Pursuant to Article 94(3) EPC dated Mar. 11, 2016", 5 pgs.
"European Application Serial No. 14158977.0, Communication Pursuant to Article 94(3) EPC dated Apr. 16, 2015", 8 pgs.
"European Application Serial No. 14158977.0, Extended European Search Report dated Jun. 10, 2014", 10 pgs.
"European Application Serial No. 14187996.5, Extended European Search Report dated Feb. 12, 2015", 7 pgs.
"European Application Serial No. 14189344.6, Office Action dated Feb. 29, 2016", 9 pgs.
"European Application Serial No. 14191540.5, Extended European Search Report dated May 27, 2015", 9 pgs.
"European Application Serial No. 15188106.7, Extended European Search Report dated Feb. 3, 2016", 8 pgs.
"European Application Serial No. 15193287.8, Extended European Search Report dated Apr. 1, 2016", 6 pgs.
"European Application Serial No. 15200073.3, Extended European Search Report dated Mar. 30, 2016", 16 pgs.
"European Application Serial No. 15201727.3, Extended European Search Report dated May 23, 2016", 11 pgs.
"European Application Serial No. 15202090.5, Extended European Search Report dated May 13, 2016", 8 pgs.
"GrabUp—What a Timesaver!", [Online]. Retrieved from the Internet: <URL http://atlchris.com/191/grabup/>, (Aug. 11, 2008), 10 pgs.
"Great Britain Application Serial No. 1411984.6, Office Action dated Jan. 8, 2016", 8 pgs.
"Great Britain Application Serial No. 1411984.6, Office Action dated Dec. 22, 2014", 6 pgs.
"Kwout", [Online]. Retrieved from the Internet: <URL: http://web.archive.org/web/20080905132448/http://www.kwout.com/>, (Sep. 5, 2008), 2 pgs.
"Managing Business Performance and Detecting Outliers in Financial Services", Quartet FS-White Paper, [Online]. Retrieved from the Internet: <URL: https://quartetfs.com/images/pdf/white-papers/Quartet_FS_White_Paper_-_ActivePivot_Sentinel.pdf>, (Accessed: Oct. 10, 2016), 15 pgs.
"Microsoft CRM duplicate detection", Pythagoras—1 pg, [Online]. Retrieved from the Internet: <URL: https://www.youtube.com/watch?v=j-7Qis0D0Kc>, (Uploaded: Sep. 13, 2011), Time: 5:09.
"Microsoft Windows Version 2002 Print Out 2", Microsoft Windows, (2002), 6 pgs.
"Netherlands Application Serial No. 2011729, Search Report dated Aug. 13, 2015", 8 pgs.
"Netherlands Application Serial No. 2012433, Netherlands Search Report dated Mar. 11, 2016", W/ English Translation, 10 pgs.
"Netherlands Application Serial No. 2013134, Netherlands Search Report dated Apr. 20, 2015", 6 pgs.
"New Zealand Application Serial No. 622389, Office Action dated Mar. 20, 2014", 2 pgs.
"New Zealand Application Serial No. 622404, Office Action dated Mar. 20, 2014", 2 pgs.
"New Zealand Application Serial No. 622439, Office Action dated Mar. 24, 2014", 2 pgs.
"New Zealand Application Serial No. 622439, Office Action dated Jun. 6, 2014", 2 pgs.
"O'Reilly.com", [Online]. Retrieved from the Internet: <URL: http://oreilly.com/digitalmedia/2006/01/01/mac-os-x-screenshot-secrets.html, (Jan. 1, 2006), 10 pgs.
"Registering an Application to a URI Scheme", Microsoft, [Online]. Retrieved from the Internet: <URL: http://msdn.microsoft.com/en-us/library/aa767914.aspx>, (accessed Apr. 4, 2009), 4 pgs.
"Resource Center", Quartert FS-White Papers, [Online] Retrieved from the Internet: <https://web.archive.org/web/20141016044306/http://quartetfs.com/resource-center/white-papers> retrieved May 3, 2016, (Oct. 16, 2014), 6 pgs.
"Share Screenshots via Internet in Seconds", JetScreenshot.com, [Online]. Retrieved from the Internet: <URL: http://web.archive.org/web/20130807164204/http://www.jetscreenshot.com/>, (Aug. 7, 2013), 1 pg.
"SnagIt 8.1.0 Print Out", SnagIt Software release date Jun. 15, 2006, (Jun. 15, 2006), 6 pgs.
"SnagIt 8.1.0 Print Out 2", Snagit-Software release date Jun. 15, 2006, (Jun. 15, 2006), 1-3.
"SnagIt Online Help Guide", TechSmith Corp., Version 8.1, http://download.techsmith.com/snagit/docs/onlinehelp/enu/snagit_help.pdf>, (accessed Feb. 7, 2007), 284 pgs.

(56) References Cited

OTHER PUBLICATIONS

"Trick: How to Capture a Screenshot as PDF, Annotate, Then Share It", Nitro, [Online]. Retrieved from the Internet: <URL: http://blog.nitropdf.com/2008/03/04/trick-how-to-capture-a-screenshot-as-pdf-annotate-it-then-share/>, (Mar. 4, 2008), 2 pgs.

"Using the Clipboard", Microsoft, [Online]. Retrieved from the Internet: <URL: http://msdn.microsoft.com/en-us/library/ms649016.aspx>, (accessed Jun. 8, 2009), 20 pgs.

Abbey, Kristen, "Review of Google Docs", 2007: Currents in Electronic Literacy, http://currents.dwrl.utexas.edu/spring07/abbey.html, (May 1, 2007), 2 pgs.

Adams, Michael, et al., "Worklets: A Service-Oriented Implementation of Dynamic Flexibility in Workflows", OTM 2006, LNCS 4275, (2006), 291-308.

Bhosale, Safal V, "Holy Grail of Outlier Detection Technique: A Macro Level Take on the State of the Art", International Journal of Computer Science and Information Technologies, vol. 5(4), (2014), 5872-5874.

Bluttman, et al., "Excel Formulas and Functions for Dummies", Wiley Publishing, Inc.,, (2005), 280, 284-286.

Brandel, Mary, "Data Loss Prevention Dos and Don'ts", CSO—Data loss prevention tools provide powerful security capabilities—if used correctly, (Oct. 10, 2007), 5 pgs.

Conner, Nancy, "Google Apps: The Missing Manual", (May 1, 2008), 15 pgs.

Conner, Nancy, "Remove a published document or blog post", Google Apps: The Missing Manual: The Missing Manual section—Sharing and Collaborating on Documents, XP-002721325, (2008), 15 pgs.

Ferreira, Lucas De Carvalho, et al., "A Scheme for Analyzing Electronic Payment Systems", (1997), 10 pgs.

Galliford, Miles, "SnagIt Versus Free Screen Capture Software: Critical Tools for Website Owners", [Online]. Retrieved from the Internet: <URL: http://www.subhub.com/articles/free-screen-capture-software>, (Mar. 27, 2008), 10 pgs.

Gill, Leicester, et al., "Computerised linking of medical records: methodological guidelines", Journal of Epidemiology and Community Health 1993; 47, (Feb. 1993), 316-319.

Golmohammadi, et al., "Data Mining Applications for Fraud Detection in Securities Market", Intelligence and Security Informatics Conference (EISIC) 2012 European, IEEE, (Aug. 22, 2012), 107-114.

Gu, et al., "BotMiner: Clustering Analysis of Network Traffice for Protocol-and-Structure-Independent Botnet Detection", USENIX Security Symposium, (2008), 17 pgs.

Hodge, et al., "A Survey of Outlier Detection Methodologies", Artificial Intelligence Review, vol. 22, No. 2, (Oct. 1, 2004), 42 pgs.

Johnson, Maggie, "Introduction to YACC and Bison", (Jul. 8, 2005), 11 pgs.

Johnson, Steve, "Access 2013 on demand", Que Publishing, (May 9, 2013), 22 pgs.

Li, Shing-Han, et al., "Identifying the signs of fraudulent accounts using data mining techniques", Computers in Human Behavior, vol. 28, (2012), 1002-1013.

Lim, Ee-Peng, et al., "Resolving Attribute Incompatibility in Database Integration: An Evidential Reasoning Approach", Proceedings. 10th International Conference Data Engineering. Department of Computer Science, University of Minnesota, [Online] retrieved from the internet: <http://reference.kfupm.edu.sa/content/r/e/resolving_attribute_incompatibility_in_d_531691.pdf>, (Feb. 1994), 154-163.

Litwin, Witold, et al., "Multidatabase Interoperability", Institute National de Recherche en Informatique et an Automatique, [Online] retrieved from the internet: <http://www.lamsade.dauphine.fr/~litwin/mdb-interoperability.pdf>, (Dec. 1986), 9 pgs.

McClave, James T., et al., "Statistics for Business and Economics", Chap.2 Methods for Describing Sets of Data; p. 86-96, (2001), 13 pgs.

Nadeau, David, et al., "A survey of named entity recognition and classification", Lingvisticae Investigationes, 30(1), (Jan. 15, 2004), 20 pgs.

Ngai, E.W.T., et al., "The application of data mining techniques in financial fraud detection: A classification framework and an academic review of literature", Decision Support Systems 50 (2011), (2011), 559-569.

Nin, Jordi, et al., "On the Use of Semantic Blocking Techniques for Data Cleansing and Integration", 11th International Database Engineering and Applications Symposium (IDEAS 2007), (2007), 9 pgs.

Qiang, Bao-Hua, et al., "A Mutual-Information-Based Approach to Entity Reconciliation in Heterogeneous Databases", 2008 International Conference on Computer Science and Software Engineering, (2008), 666-669.

Schroder, Stan, "15 Ways to Create Website Screenshots", [Online]. Retrieved from the Internet: <URL: http://mashable.com/2007/08/24/web-screenshots/>, (Aug. 24, 2007), 2 pgs.

Sekine, Satoshi, et al., "Definition, dictionaries and tagger for Extended Named Entity Hierarchy", LREC, (2004), 1977-1980.

Warren, Christina, "TUAW Faceoff: Screenshot apps on the firing line", [Online]. Retrieved from the Internet: <URL: http://www.tuaw.com/2008/05/05/tuaw-faceoff-screenshot-apps-on-the-firing-line/>, (May 5, 2008), 11 pgs.

Winkler, William E, et al., "Bureau of the Census Statistical Research Division Record Linkage Software and Methods for Merging Administrative Lists", Statistical Research Report Series, No. RR2001/03, (Jul. 23, 2001), 11 pgs.

Zhao, et al., "Entity Matching Across Heterogeneous Data Sources: An Approach Based on Constrained Cascade Generalization", Data & Knowledge Engineering, vol. 66, No. 3, (Sep. 2008), 368-381.

U.S. Appl. No. 14/306,138, filed Jun. 16, 2014, Methods and Systems for Analyzing Entity Performance.

U.S. Appl. No. 14/306,147, U.S. Pat. No. 10,025,834, filed Jun. 16, 2014, Methods and Systems for Analyzing Entity Performance.

U.S. Appl. No. 14/306,154, filed Jun. 16, 2014, Methods and Systems for Analyzing Entity Performance.

* cited by examiner

| Number | Consuming Entity ID (e.g., name or code) | Consuming Entity Location | | | | Provisioning Entity ID (e.g., name or code) | Provisioning Entity Location | | | | Type of Provisioning Entity (e.g., name or code) | Interaction Amount (e.g., in Dollars) | Time of Interaction | |
|---|---|---|---|---|---|---|---|---|---|---|---|---|---|---|
| | | State | City | Zip Code | Street Address | | State | City | Zip Code | Street Address | | | Date | Time |
| 1 | User 1 | California | Palo Alto | 94304 | 123 Main St | PE001 | California | Palo Alto | 94304 | 234 University Ave | Gas Station | 74.56 | 2013/11/23 | 19:32 |
| 2 | CE002 | California | Sunnyvale | 94085 | 123 Murphy St | Merchant 2 | Unknown | Unknown | Unknown | Unknown | Supermarket | 23.56 | 2013/10/15 | 11:23 |
| 3 | User 1 | California | Palo Alto | 94304 | 123 Main St | Merchant 2 | Unknown | Unknown | Unknown | Unknown | TPE 123 | 32.11 | 2013/11/21 | 19:00 |
| 4 | User 3 | California | San Francisco | 94102 | 1000 Lombard St | Merchant 3 | California | San Francisco | 94102 | 123 Market St | Coffee Shop | 8.97 | 2013/10/20 | 17:05 |
| 5 | User 3 | Unknown | Unknown | Unknown | Unknown | Merchant 3 | California | San Francisco | 94102 | 123 Market St | Coffee Shop | 5.34 | 2013/11/03 | 8:03 |
| 50,000,000,000 | User N | California | Beverly Hills | 90210 | 123 Wilshire Blvd | Merchant N | California | Beverly Hills | 90210 | 789 Wilshire Blvd | TPE789 | 89.23 | 2013/10/23 | 14:00 |

FIG. 4

METHODS AND SYSTEMS FOR ANALYZING ENTITY PERFORMANCE

CROSS-REFERENCE TO RELATED APPLICATION(S)

This application is a continuation-in-part of U.S. patent application Ser. No. 14/306,138, filed on Jun. 16, 2014, which claims priority to U.S. Provisional Application No. 61/916,795, filed on Dec. 16, 2013; is a continuation-in-part of U.S. patent application Ser. No. 14/306,147, filed on Jun. 16, 2014, which claims priority to U.S. Provisional Application No. 61/916,796, filed on Dec. 16, 2013; and is a continuation-in-part of U.S. patent application Ser. No. 14/306,154, filed on Jun. 16, 2014, which claims priority to U.S. Provisional Application No. 61/916,797, filed on Dec. 16, 2013. Each of the above applications are incorporated herein by reference in their entireties.

BACKGROUND

The amount of information being processed and stored is rapidly increasing as technology advances present an ever-increasing ability to generate and store data. This data is commonly stored in computer-based systems in structured data stores. For example, one common type of data store is a so-called "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Numerous organizations, including industry, retail, and government entities, recognize that important information and decisions can be drawn if massive data sets can be analyzed to identify patterns of behavior. Collecting and classifying large sets of data in an appropriate manner allows these entities to more quickly and efficiently identify these patterns, thereby allowing them to make more informed decisions.

BRIEF DESCRIPTION OF THE DRAWINGS

Reference will now be made to the accompanying drawings which illustrate exemplary embodiments of the present disclosure and in which:

FIG. 4 is a block diagram of an exemplary data structure accessed in the process of analyzing entity performance, consistent with the embodiments of the present disclosure.

DETAILED DESCRIPTION OF EXEMPLARY EMBODIMENTS

This application expressly incorporates herein by reference the entirety of U.S. Non-Provisional patent application Ser. No. 14/045,720, titled "Systems and Methods for Analyzing Performance of an Entity", filed on Oct. 3, 2013.

Reference will now be made in detail to the embodiments, the examples of which are illustrated in the accompanying drawings. Whenever possible, the same reference numbers will be used throughout the drawings to refer to the same or like parts. The terms interactions and transactions are intended to covey the same meaning and can be used interchangeably throughout this disclosure.

Figure 1:
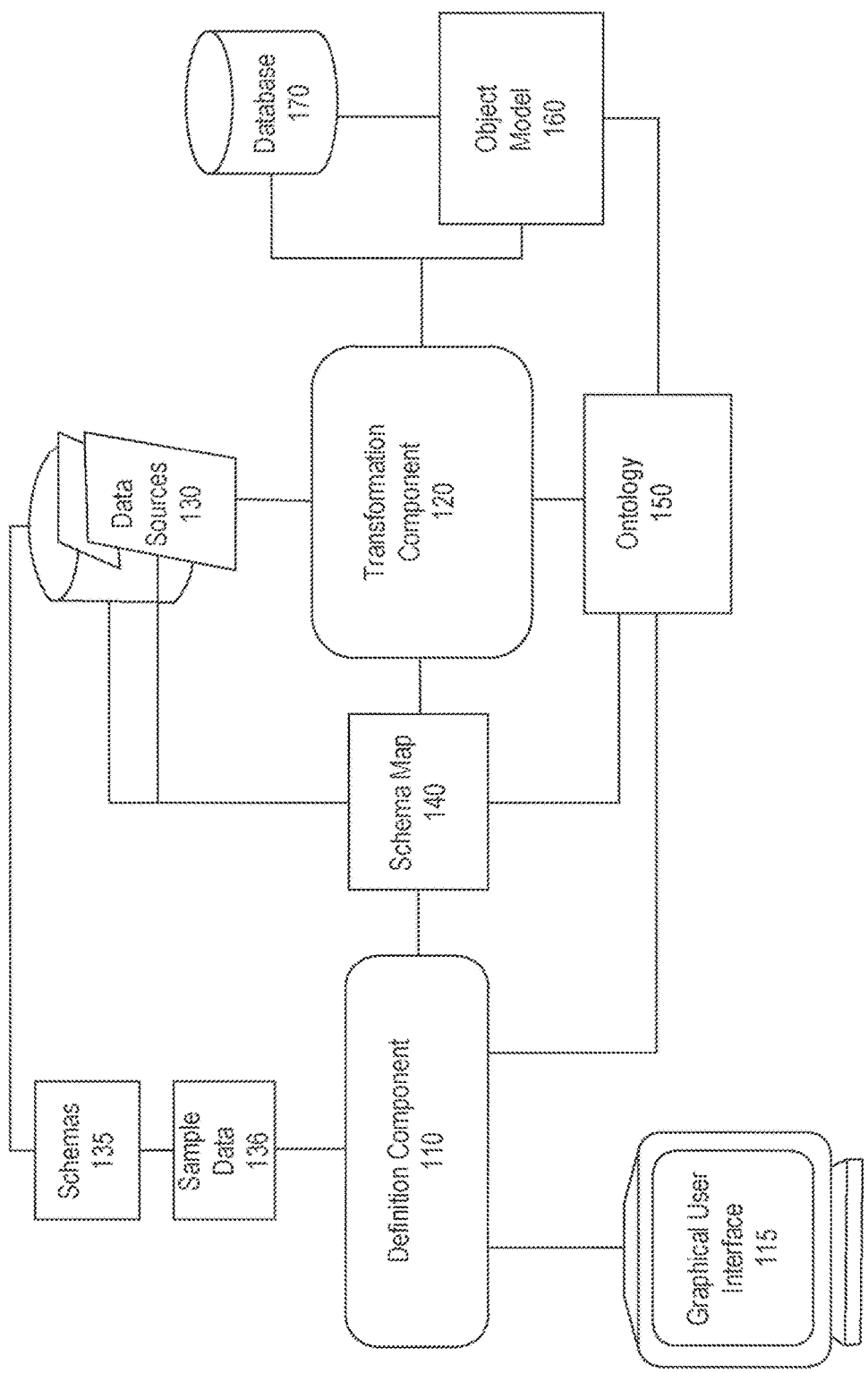
FIG. 1 illustrates, in block diagram form, an exemplary data fusion system for providing interactive data analysis, consistent with the embodiments of the present disclosure.
Figure 2:
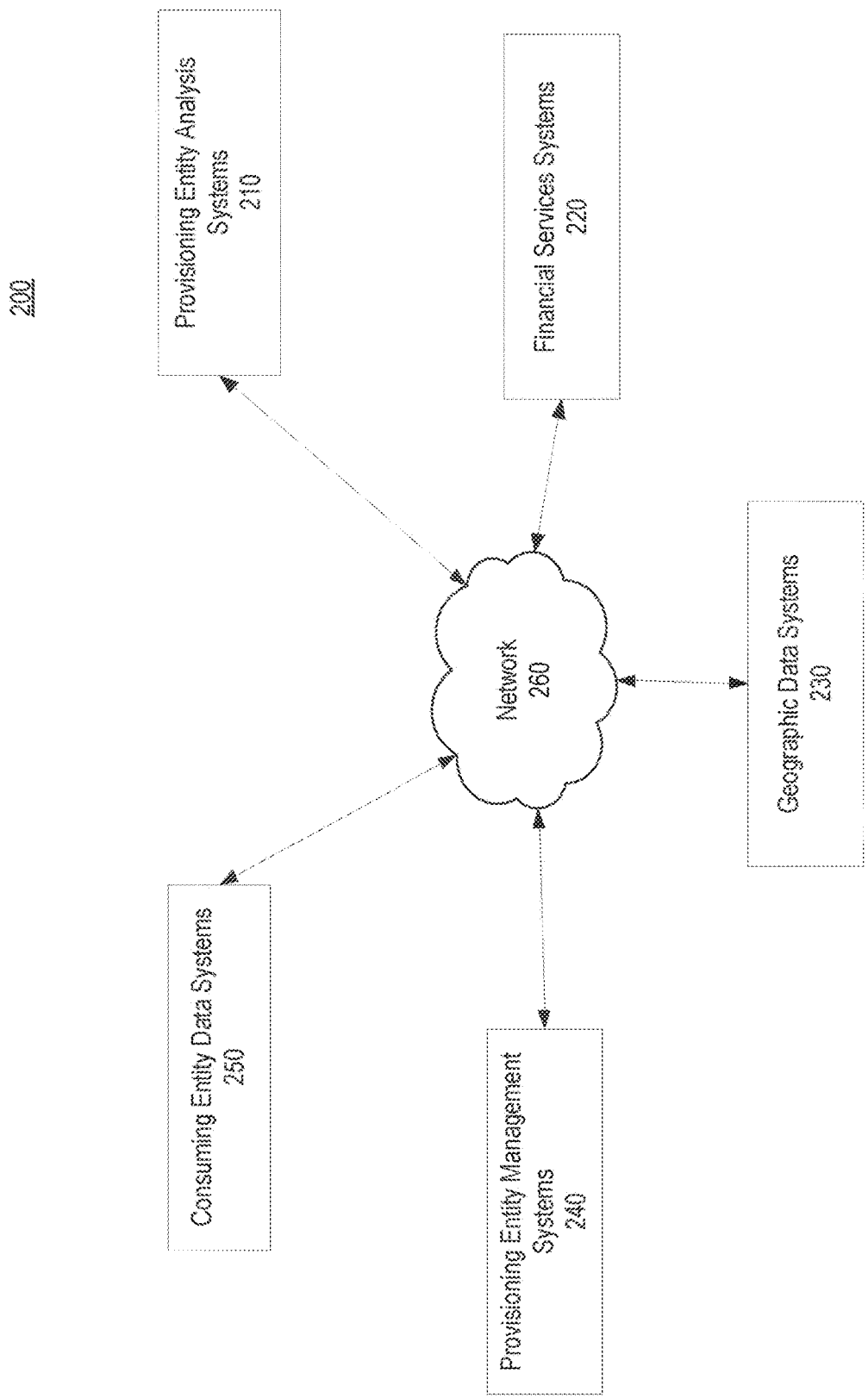
FIG. 2 is a block diagram of an exemplary system for analyzing performance of an entity, consistent with the embodiments of the present disclosure.

FIG. 1 illustrates, in block diagram form, an exemplary data fusion system 100 for providing interactive data analysis, consistent with embodiments of the present disclosure. Among other things, data fusion system 100 facilitates transformation of one or more data sources, such as data sources 130 (e.g., financial services systems 220, geographic data systems 230, provisioning entity management systems 240 and/or consuming entity data systems 250, as shown in FIG. 2) into an object model 160 whose semantics are defined by an ontology 150. The transformation can be performed for a variety of reasons. For example, a database administrator can import data from data sources 130 into a database 170 for persistently storing object model 160. As another example, a data presentation component (not depicted) can transform input data from data sources 130 "on the fly" into object model 160. The object model 160 can then be utilized, in conjunction with ontology 150, for analysis through graphs and/or other data visualization techniques.

Data fusion system 100 comprises a definition component 110 and a translation component 120, both implemented by one or more processors of one or more computing devices or systems executing hardware and/or software-based logic for providing various functionality and features of the present disclosure, as described herein. As will be appreciated from the present disclosure, data fusion system 100 can comprise fewer or additional components that provide the various functionalities and features described herein. Moreover, the number and arrangement of the components of data fusion system 100 responsible for providing the various functionalities and features described herein can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued on Jun. 14, 2011, the entire contents of which are expressly incorporated herein by reference for all purposes. Consistent with certain embodiments disclosed in the '495 patent, a dynamic ontology may be used to create a database. To create a database ontology, one or more object types may be defined, where each object type includes one or more properties. The attributes of object types or property types of the ontology can be edited or modified at any time. And, for each property type, at least one parser definition may be created. The attributes of a parser definition can be edited or modified at any time.

In some embodiments, each property type is declared to be representative of one or more object types. A property type is representative of an object type when the property type is intuitively associated with the object type. Alternatively, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an Address property having a City component and a State component. An example of raw input data is "Los Angeles, Calif." An example parser definition specifies an association of imported input data to object property components as follows: {CITY}, {STATE}→Address:State, Address:City. In some embodiments, the association {CITY}, {STATE} is defined in a parser definition using regular expression symbology. The association {CITY}, {STATE} indicates that a city string followed by a state string, and separated by a comma, comprises valid input data for a property of type Address. In contrast, input data of "Los Angeles Calif." would not be valid for the specified parser definition, but a user could create a second parser definition that does match input data of "Los Angeles Calif." The definition Address:City, Address:State specifies that matching input data values map to components named "City" and "State" of the Address property. As a result, parsing the input data using the parser definition results in assigning the value "Los Angeles" to the Address:City component of the Address property, and the value "CA" to the Address:State component of the Address property.

According to some embodiments, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130; for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Based on the identified information, definition component 110 can generate a graphical user interface 115. Graphical user interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 115 features a visual workspace that visually depicts representations of the elements of ontology 150 for which mappings are defined in schema map 140.

In some embodiments, transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or alternatively include temporary data structures generated from underlying data sources via data extraction components, such as a result set returned from a database server executing an database query.

Schema map 140, ontology 150, and schemas 135 can be stored in any suitable structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. Alternatively, the elements of object model 160 are stored within database 170 in a different underlying format, such as in a series of object, property, and relationship tables in a relational database.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

Throughout this disclosure, reference will be made to an entity such as, for example, a provisioning entity and a consuming entity. It will be understood that a provisioning entity can include, for example, a merchant, a retail provisioning entity or the like, and a consuming entity can include, for example, a consumer user buying products or services from a provisioning entity. It will be understood that a consuming entity can represent either individual persons or can represent a group of persons (e.g., a group of persons living under one roof as part of a family). In some embodiments, a consuming entity can include a loyal customer (e.g., a user that has spent a particular amount of money or time at one or more provisioning entities, a user that has visited a provisioning entity on a number of occasions that is above a threshold number, or a user designated as a loyal customer by other means). In some embodiments, a consuming entity can be a credit card number of an individual or a credit card number for an entire family sharing one credit card. It will also be understood that a provisioning entity can represent either the entity itself or individual persons involved with the entity.

In embodiments described herein, data fusion system 100 can provide a provisioning entity, such as a retail provisioning entity, to analyze information to identify behaviors to allow that provisioning entity to make more informed decisions. This information may be referred to as performance information. Such information can allow retail entities, such as a retail provisioning entity, to determine where to place their retail locations. Provisioning entities having more than one location (e.g., a merchant with a chain store or a franchise model) typically evaluate the performance of their locations and may adjust their business models or work flows when the locations under-perform. Typically, provisioning entities evaluate the performance of their locations based on period-to-period metrics. For example, a provisioning entity can evaluate a location's performance by comparing the current month's sales to the previous month's sales. In addition, provisioning entitles can evaluate each of its locations' performance using comparative analysis. For example, a provisioning entity might compare the sales at an area location with the sales at a second location. As provisioning entities generally measure the performance of its locations based on their own interaction data (e.g., the entity's sales across some or all of its locations), current methods of measuring performance do not consider sales made by competitors or demographic features of the areas of the provisioning entity's locations.

Since current performance evaluation methods do not consider the sales of competitors or the demographic features of the region of the provisioning entity location, measured performance may not represent the true performance of a provisioning entity. For instance, although a provisioning entity location in a low consumer spend capacity area might have less sales than a provisioning entity location in a high consumer spend capacity area, it may be performing better than what could be expected for that area in light of, for example, the low number of consumers residing in the area or the low income of the area. A performance of a provisioning entity at an area location can be adversely impacted by the close proximity of a second location of the provisioning entity, but the provisioning entity at the area location can be performing better than expected given the competition from the provisioning entity's second location. Conversely, while a provisioning entity location in a dense, high-income area might have the highest sales of all provisioning entity locations, it can still be under-performing because, for instance, consumer spend capacity is high and the provisioning entity location could generate more sales.

Consistent with embodiments of the present disclosure, the performance of provisioning entities can be analyzed based on how the provisioning entity is expected to perform given the location of the provisioning entity. For a given provisioning entity location, the disclosed embodiments may be implemented to consider, for example, consumer demographic features of the provisioning entity location's area and the proximity of competitors to the provisioning entity location (including the proximity of the provisioning entity's other close-by locations). In some embodiments, the provisioning entity can be a merchant. For purposes of illustration, exemplary embodiments for analyzing entity performance are described herein with reference to "merchants." The exemplary embodiments and techniques described herein, however, may be applied to other types of entities (e.g., service providers, governmental agencies, etc.) within the spirit and scope of this disclosure.

FIG. 2 is a block diagram of an exemplary system 200 for performing one or more operations for analyzing performance of a provisioning entity and/or a consuming entity, consistent with disclosed embodiments. In some embodiments, the provisioning entity is a merchant and system 200 can include provisioning entity analysis system 210, one or more financial services systems 220, one or more geographic data systems 230, one or more provisioning entity management systems 240, and one or more consuming entity data systems 250. The components and arrangement of the components included in system 200 can vary depending on the embodiment. For example, the functionality described below with respect to financial services systems 220 can be embodied in consuming entity data systems 250, or vice-versa. Thus, system 200 can include fewer or additional components that perform or assist in the performance of one or more processes to analyze provisioning entity's, consistent with the disclosed embodiments.

One or more components of system 200 can be computing systems configured to analyze provisioning entity performance. As further described herein, components of system 200 can include one or more computing devices (e.g., computer(s), server(s), etc.), memory storing data and/or software instructions (e.g., database(s), memory devices, etc.), and other known computing components. In some embodiments, the one or more computing devices are configured to execute software or a set of programmable instructions stored on one or more memory devices to perform one or more operations, consistent with the disclosed embodiments. Components of system 200 can be configured to communicate with one or more other components of system 200, including provisioning entity analysis system 210, one or more financial services systems 220, one or more geographic data systems 230, one or more provisioning entity management systems 240, and one or more consumer data systems 250. In certain aspects, users can operate one or more components of system 200. The one or more users can be employees of, or associated with, the entity corresponding to the respective component(s) (e.g., someone authorized to use the underlying computing systems or otherwise act on behalf of the entity).

Figure 3:
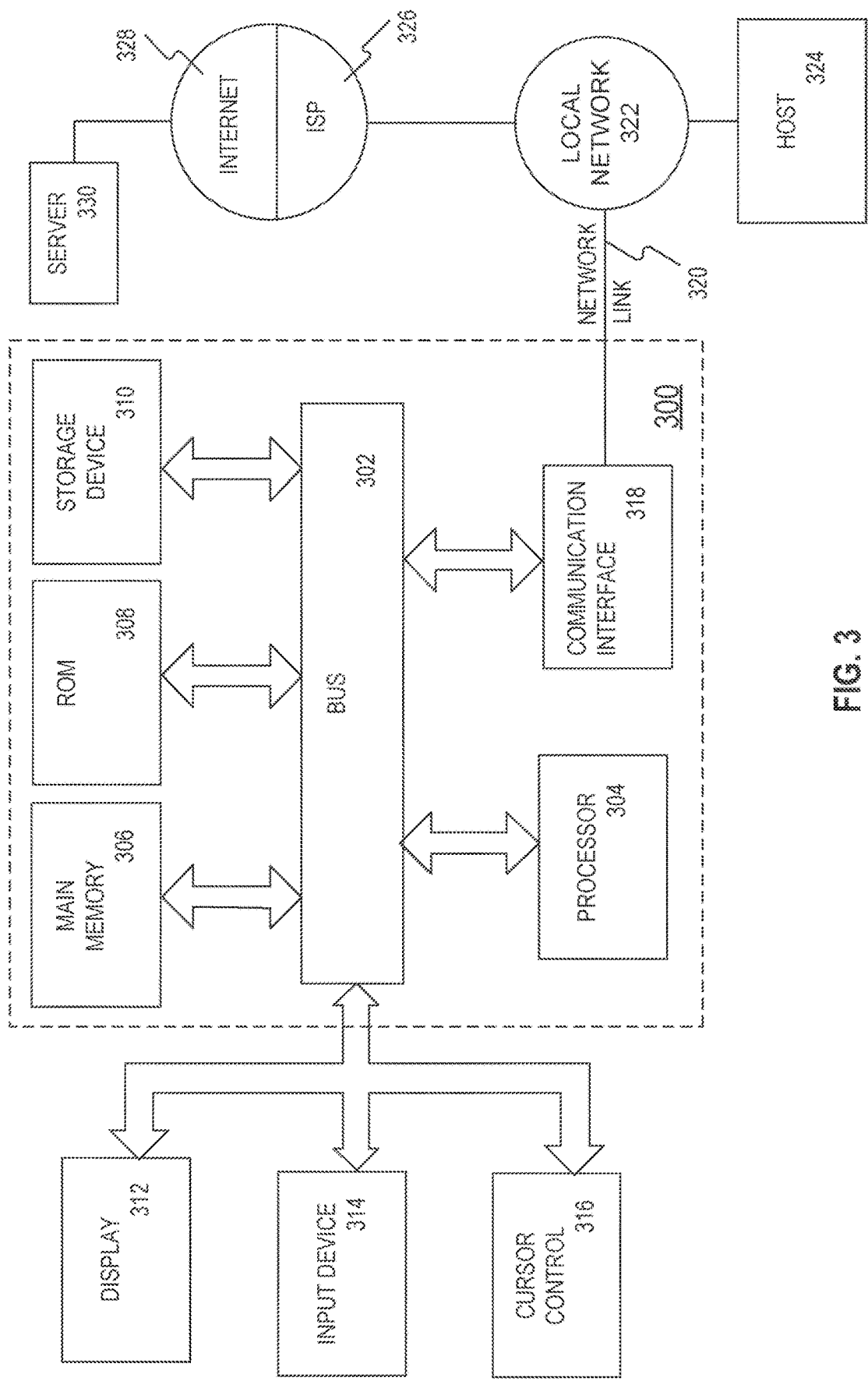
FIG. 3 is a block diagram of an exemplary computer system, consistent with the embodiments of the present disclosure.

Provisioning entity analysis system 210 can be a computing system configured to analyze provisioning entity performance. For example, provisioning entity analysis system 210 can be a computer system configured to execute software or a set of programmable instructions that collect or receive financial interaction data, consumer data, and provisioning entity data and process it to determine the actual transaction amount of each transaction associated with the provisioning entity. Provisioning entity analysis system 210 can be configured, in some embodiments, to utilize, include, or be a data fusion system 100 (see, e.g., FIG. 1) to transform data from various data sources (such as, financial services systems 220, geographic data systems 230, provisioning entity management systems 240, and consuming entity data systems 250) for processing. In some embodiments, provisioning entity analysis system 210 can be implemented using a computer system 300, as shown in FIG. 3 and described below.

Provisioning entity analysis system 210 can include one or more computing devices (e.g., server(s)), memory storing data and/or software instructions (e.g., database(s), memory devices, etc.) and other known computing components. According to some embodiments, provisioning entity analysis system 210 can include one or more networked computers that execute processing in parallel or use a distributed computing architecture. Provisioning entity analysis system 210 can be configured to communicate with one or more components of system 200, and it can be configured to provide analysis of provisioning entities via an interface(s) accessible by users over a network (e.g., the Internet). For example, provisioning entity analysis system 210 can include a web server that hosts a web page accessible through network 260 by provisioning entity management systems 240. In some embodiments, provisioning entity analysis system 210 can include an application server configured to provide data to one or more client applications executing on computing systems connected to provisioning entity analysis system 210 via network 260.

In some embodiments, provisioning entity analysis system 210 can be configured to determine the actual sales for a provisioning entity or specific provisioning entity location by processing and analyzing data collected from one or more components of system 200. For example, provisioning entity analysis system 210 can determine that the Big Box Merchant store located at 123 Main St, in Burbank, Calif. is actually generating $60,000 of sales per month. Provisioning entity analysis system 210 can provide an analysis of a provisioning entity or provisioning entity location's performance based on a target for sales and the actual sales for the provisioning entity or provisioning entity location. For example, for the Big Box Merchant store located at 123 Main St., Burbank, Calif., the provisioning entity analysis system 210 can provide an analysis that the store is performing above expectations. Exemplary processes that can be used by provisioning entity analysis system 210 are described below with respect to FIGS. 6, 10A, 11, 13, 14, and 15.

Provisioning entity analysis system 210 can, in some embodiments, generate a user interface communicating data related to one or more provisioning entities or provisioning entity locations. For example, in some embodiments, provisioning entity analysis system 210 includes a web server that generates HTML code, or scripts capable of generating HTML code, that can be displayed in a web browser executing on computing device. Provisioning entity analysis system 210 can also execute an application server that provides user interface objects to a client application executing on a computing device, or it can provide data that is capable of being displayed in a user interface in a client application executing on a computing device. In some embodiments, provisioning entity analysis system 210 can generate user interfaces that can be displayed within another user interface. For example, provisioning entity analysis system 210 can generate a user interface for display within a parent user interface that is part of a word processing application, a presentation development application, a web browser, or an illustration application, among others. In some embodiments, generating a user interface can include generating the code that when executed displays information (e.g., HTML) on the user interface. Alternatively, generating interface can include providing commands and/or data to a set of instructions that when executed render a user interface capable of being shown on a display connected to a computing device. In some embodiments, the user interface can include a map, indications of the provisioning entity locations on a map, and indications of the sales or interactions associated with the provisioning entity locations. Examples of some (although not all) user interfaces that can be generated by provisioning entity analysis system 210 are described below with respect to FIGS. 7-9, 10B and 12.

Referring again to FIG. 2, financial services system 220 can be a computing system associated with a financial service provider, such as a bank, credit card issuer, credit bureau, credit agency, or other entity that generates, provides, manages, and/or maintains financial service accounts for one or more users. Financial services system 220 can generate, maintain, store, provide, and/or process financial data associated with one or more financial service accounts. Financial data can include, for example, financial service account data, such as financial service account identification data, account balance, available credit, existing fees, reward points, user profile information, and financial service account interaction data, such as interaction dates, interaction amounts, interaction types, and location of interaction. In some embodiments, each interaction of financial data can include several categories of information associated with the interaction. For example, each interaction can include categories such as number category; consuming entity identification category; consuming entity location category; provisioning entity identification category; provisioning entity location category; type of provisioning entity category; interaction amount category; and time of interaction category, as described in FIG. 4. It will be appreciated that financial data can comprise either additional or fewer categories than the exemplary categories listed above. Financial services system 220 can include infrastructure and components that are configured to generate and/or provide financial service accounts such as credit card accounts, checking accounts, savings account, debit card accounts, loyalty or reward programs, lines of credit, and the like.

Geographic data systems 230 can include one or more computing devices configured to provide geographic data to other computing systems in system 200 such as provisioning entity analysis system 210. For example, geographic data systems 230 can provide geodetic coordinates when provided with a street address of vice-versa. In some embodiments, geographic data systems 230 exposes an application programming interface (API) including one or more methods or functions that can be called remotely over a network, such as network 260. According to some embodiments, geographic data systems 230 can provide information concerning routes between two geographic points. For example, provisioning entity analysis system 210 can provide two addresses and geographic data systems 230 can provide, in response, the aerial distance between the two addresses, the distance between the two addresses using roads, and/or a suggested route between the two addresses and the route's distance.

According to some embodiments, geographic data systems 230 can also provide map data to provisioning entity analysis system 210 and/or other components of system 200. The map data can include, for example, satellite or overhead images of a geographic region or a graphic representing a geographic region. The map data can also include points of interest, such as landmarks, malls, shopping centers, schools, or popular restaurants or retailers, for example.

Provisioning entity management systems 240 can be one or more computing devices configured to perform one or more operations consistent with disclosed embodiments. For example, provisioning entity management systems 240 can be a desktop computer, a laptop, a server, a mobile device (e.g., tablet, smart phone, etc.), or any other type of computing device configured to request provisioning entity analysis from provisioning entity analysis system 210. According to some embodiments, provisioning entity management systems 240 can comprise a network-enabled computing device operably connected to one or more other presentation devices, which can themselves constitute a computing system. For example, provisioning entity management systems 240 can be connected to a mobile device, telephone, laptop, tablet, or other computing device.

Provisioning entity management systems 240 can include one or more processors configured to execute software instructions stored in memory. Provisioning entity management systems 240 can include software or a set of programmable instructions that when executed by a processor performs known Internet-related communication and content presentation processes. For example, provisioning entity management systems 240 can execute software or a set of instructions that generates and displays interfaces and/or content on a presentation device included in, or connected to, provisioning entity management systems 240. In some embodiments, provisioning entity management systems 240 can be a mobile device that executes mobile device applications and/or mobile device communication software that allows provisioning entity management systems 240 to communicate with components of system 200 over network 260. The disclosed embodiments are not limited to any particular configuration of provisioning entity management systems 240.

Provisioning entity management systems 240 can be one or more computing systems associated with a provisioning entity that provides products (e.g., goods and/or services), such as a restaurant (e.g., Outback Steakhouse®, Burger King®, etc.), retailer (e.g., Amazon.com®, Target®, etc.), grocery store, mall, shopping center, service provider (e.g., utility company, insurance company, financial service provider, automobile repair services, movie theater, etc.), non-profit organization (ACLU™, AARP®, etc.) or any other type of entity that provides goods, services, and/or information that consuming entities (i.e., end-users or other business entities) can purchase, consume, use, etc. For ease of discussion, the exemplary embodiments presented herein relate to purchase interactions involving goods from retail provisioning entity systems. Provisioning entity management systems 240, however, is not limited to systems associated with retail provisioning entities that conduct business in any particular industry or field.

Provisioning entity management systems 240 can be associated with computer systems installed and used at a brick and mortar provisioning entity locations where a consumer can physically visit and purchase goods and services. Such locations can include computing devices that perform financial service interactions with consumers (e.g., Point of Sale (POS) terminal(s), kiosks, etc.). Provisioning entity management systems 240 can also include back-and/or front-end computing components that store data and execute software or a set of instructions to perform operations consistent with disclosed embodiments, such as computers that are operated by employees of the provisioning entity (e.g., back office systems, etc.). Provisioning entity management systems 240 can also be associated with a provisioning entity that provides goods and/or service via known online or e-commerce types of solutions. For example, such a provisioning entity can sell products via a website using known online or e-commerce systems and solutions to market, sell, and process online interactions. Provisioning entity management systems 240 can include one or more servers that are configured to execute stored software or a set of instructions to perform operations associated with a provisioning entity, including one or more processes associated with processing purchase interactions, generating interaction data, generating product data (e.g., SKU data) relating to purchase interactions, for example.

Consuming entity data systems 250 can include one or more computing devices configured to provide demographic data regarding consumers. For example, consuming entity data systems 250 can provide information regarding the name, address, gender, income level, age, email address, or other information about consumers. Consuming entity data systems 250 can include public computing systems such as computing systems affiliated with the U.S. Bureau of the Census, the U.S. Bureau of Labor Statistics, or FedStats, or it can include private computing systems such as computing systems affiliated with financial institutions, credit bureaus, social media sites, marketing services, or some other organization that collects and provides demographic data.

Network 260 can be any type of network or combination of networks configured to provide electronic communications between components of system 200. For example, network 260 can be any type of network (including infrastructure) that provides communications, exchanges information, and/or facilitates the exchange of information, such as the Internet, a Local Area Network, or other suitable connection(s) that enables the sending and receiving of information between the components of system 200. Network 260 may also comprise any combination of wired and wireless networks. In other embodiments, one or more components of system 200 can communicate directly through a dedicated communication link(s), such as links between provisioning entity analysis system 210, financial services system 220, geographic data systems 230, provisioning entity management systems 240, and consuming entity data systems 250.

As noted above, provisioning entity analysis system 210 can include a data fusion system (e.g., data fusion system 100) for organizing data received from one or more of the components of system 200.

FIG. 3 is a block diagram of an exemplary computer system 300, consistent with embodiments of the present disclosure. The components of system 200 such as provisioning entity analysis system 210, financial service systems 220, geographic data systems 230, provisioning entity management systems 240, and consuming entity data systems 250 may include the architecture based on or similar to that of computer system 300.

As illustrated in FIG. 3, computer system 300 includes a bus 302 or other communication mechanism for communicating information, and one or more hardware processors 304 (denoted as processor 304 for purposes of simplicity) coupled with bus 302 for processing information. Hardware processor 304 can be, for example, one or more general-purpose microprocessors or it can be a reduced instruction set of one or more microprocessors.

Computer system 300 also includes a main memory 306, such as a random access memory (RAM) or other dynamic storage device, coupled to bus 302 for storing information and instructions to be executed by processor 304. Main memory 306 also can be used for storing temporary variables or other intermediate information during execution of instructions to be executed by processor 304. Such instructions, after being stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc. is provided and coupled to bus 302 for storing information and instructions.

Computer system 300 can be coupled via bus 302 to a display 312, such as a cathode ray tube (CRT), liquid crystal display, or touch screen, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 300 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 300 can implement the techniques described herein using customized hard-wired logic, one or more ASICs or FPGAs, firmware and/or program logic which in combination with the computer system causes or programs computer system 300 to be a special-purpose machine. According to some embodiments, the operations, functionalities, and techniques and other features described herein are performed by computer system 300 in response to processor 304 executing one or more sequences of one or more instructions contained in main memory 306. Such instructions can be read into main memory 306 from another storage medium, such as storage device 310. Execution of the sequences of instructions contained in main memory 306 causes processor 304 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 310. Volatile media can include dynamic memory, such as main memory 306. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 302. Transmission media can also take the form of acoustic or light waves, such as those generated during radio-wave and infra-red data communications.

Various forms of media can be involved in carrying one or more sequences of one or more instructions to processor 304 for execution. For example, the instructions can initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 can also include a communication interface 318 coupled to bus 302. Communication interface 318 can provide a two-way data communication coupling to a network link 320 that can be connected to a local network 322. For example, communication interface 318 can be an integrated services digital network (ISDN) card, cable modem, satellite modem, or a modem to provide a data communication connection to a corresponding type of telephone line. As another example, communication interface 318 can be a local area network (LAN) card to provide a data communication connection to a compatible LAN. Wireless links can also be implemented. In any such implementation, communication interface 318 can send and receives electrical, electromagnetic or optical signals that carry digital data streams representing various types of information.

Network link 320 can typically provide data communication through one or more networks to other data devices. For example, network link 320 can provide a connection through local network 322 to a host computer 324 or to data equipment operated by an Internet Service Provider (ISP) 326. ISP 326 in turn can provide data communication services through the world wide packet data communication network now commonly referred to as the "Internet" 328. Local network 322 and Internet 328 can both use electrical, electromagnetic or optical signals that carry digital data streams. The signals through the various networks and the signals on network link 320 and through communication interface 318, which carry the digital data to and from computer system 300, can be example forms of transmission media.

Computer system 300 can send messages and receive data, including program code, through the network(s), network link 320 and communication interface 318. In the Internet example, a server 330 can transmit a requested code for an application program through Internet 328, ISP 326, local network 322 and communication interface 318. The received code can be executed by processor 304 as it is received, and/or stored in storage device 310, or other non-volatile storage for later execution. In some embodiments, server 330 can provide information for being displayed on a display.

FIG. 4 is a block diagram of an exemplary data structure 400, consistent with embodiments of the present disclosure. Data structure 400 can store data records associated with interactions involving multiple entities. Data structure 400 can be, for example, a database (e.g., database 170) that can store elements of an object model (e.g., object model 160). In some embodiments, data structure 400 can be a Relational Database Management System (RDBMS) that stores interaction data as sections of rows of data in relational tables. An RDBMS can be designed to efficiently return data for an entire row, or record, in as few operations as possible. An RDBMS can store data by serializing each row of data of data structure 400. For example, in an RDBMS, data associated with interaction 1 of FIG. 4 can be stored serially such that data associated with all categories of interaction 1 can be accessed in one operation.

Alternatively, data structure 400 can be a column-oriented database management system that stores data as sections of columns of data rather than rows of data. This column-oriented DBMS can have advantages, for example, for data warehouses, customer relationship management systems, and library card catalogs, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of data structure 400. For example, in a column-oriented DBMS, data associated with a category (e.g., consuming entity identification category 420) can be stored serially such that data associated with that category for all interactions of data structure 400 can be accessed in one operation.

As shown in FIG. 4, data structure 400 can comprise data associated with a very large number of interactions associated with multiple entities. For example, data structure 400 can include 50 billion interactions. In some embodiments, interactions associated with multiple entities can be referred to as transactions between multiple entities. Where appropriate, the terms interactions and transactions are intended to convey the same meaning and can be used interchangeably throughout this disclosure. While each interaction of data structure 400 is depicted as a separate row in FIG. 4, it will be understood that each such interaction can be represented by a column or any other known technique in the art. Each interaction data can include several categories of information. For example, the several categories can include, number category 410; consuming entity identification category 420; consuming entity location category 430; provisioning entity identification category 440; provisioning entity location category 450; type of provisioning entity category 460; interaction amount category 470; and time of interaction category 480. It will be understood that FIG. 4 is merely exemplary and that data structure 400 can include even more categories of information associated with an interaction.

Number category 410 can uniquely identify each interaction of data structure 400. For example, data structure 400 depicts 50 billion interactions as illustrated by number category 410 of the last row of data structure 400 as 50,000,000,000. In FIG. 4, each row depicting a interaction can be identified by an element number. For example, interaction number 1 can be identified by element 401; interaction number 2 can be identified by element 402; and so on such that interaction 50,000,000,000 can be identified by 499B. It will be understood that this disclosure is not limited to any number of interactions and further that this disclosure can extend to a data structure with more or fewer than 50 billion interactions. It is also appreciated that number category 410 need not exist in data structure 400.

Consuming entity identification category 420 can identify a consuming entity. In some embodiments, consuming entity identification category 420 can represent a name (e.g., User 1 for interaction 401; User N for interaction 499B) of the consuming entity. Alternatively, consuming entity identification category 420 can represent a code uniquely identifying the consuming entity (e.g., CE002 for interaction 402). For example, the identifiers under the consuming entity identification category 420 can be a credit card number that can identify a person or a family, a social security number that can identify a person, a phone number or a MAC address associated with a cell phone of a user or family, or any other identifier.

Consuming entity location category 430 can represent a location information of the consuming entity. In some embodiments, consuming entity location category 430 can represent the location information by providing at least one of: a state of residence (e.g., state sub-category 432; California for element 401; unknown for interaction 405) of the consuming entity; a city of residence (e.g., city sub-category 434; Palo Alto for interaction 401; unknown for interaction 405) of the consuming entity; a zip code of residence (e.g., zip code sub-category 436; 94304 for interaction 401; unknown for interaction 405) of the consuming entity; and a street address of residence (e.g., street address sub-category 438; 123 Main St. for interaction 401; unknown for interaction 405) of the consuming entity.

Provisioning entity identification category 440 can identify a provisioning entity (e.g., a merchant or a coffee shop). In some embodiments, provisioning entity identification category 440 can represent a name of the provisioning entity (e.g., Merchant 2 for interaction 402). Alternatively, provisioning entity identification category 440 can represent a code uniquely identifying the provisioning entity (e.g., PE001 for interaction 401). Provisioning entity location category 450 can represent a location information of the provisioning entity. In some embodiments, provisioning entity location category 450 can represent the location information by providing at least one of: a state where the provisioning entity is located (e.g., state sub-category 452; California for interaction 401; unknown for interaction 402); a city where the provisioning entity is located (e.g., city sub-category 454; Palo Alto for interaction 401; unknown for interaction 402); a zip code where the provisioning entity is located (e.g., zip code sub-category 456; 94304 for interaction 401; unknown for interaction 402); and a street address where the provisioning entity is located (e.g., street address sub-category 458; 234 University Ave. for interaction 401; unknown for interaction 402).

Type of provisioning entity category 460 can identify a type of the provisioning entity involved in each interaction. In some embodiments, type of provisioning entity category 460 of the provisioning entity can be identified by a category name customarily used in the industry (e.g., Gas Station for interaction 401) or by an identification code that can identify a type of the provisioning entity (e.g., TPE123 for interaction 403). Alternatively, type of the provisioning entity category 460 can include a merchant category code ("MCC") used by credit card companies to identify any business that accepts one of their credit cards as a form of payment. For example, MCC can be a four-digit number assigned to a business by credit card companies (e.g., American Express™, MasterCard™, VISA™) when the business first starts accepting one of their credit cards as a form of payment.

In some embodiments, type of provisioning entity category 460 can further include a sub-category (not shown in FIG. 4), for example, type of provisioning entity sub-category 461 that can further identify a particular sub-category of provisioning entity. For example, an interaction can comprise a type of provisioning entity category 460 as a hotel and type of provisioning entity sub-category 461 as either a bed and breakfast hotel or a transit hotel. It will be understood that the above-described examples for type of provisioning entity category 460 and type of provisioning entity sub-category 461 are non-limiting and that data structure 400 can include other kinds of such categories and sub-categories associated with an interaction.

Interaction amount category 470 can represent a transaction amount (e.g., $74.56 for interaction 401) involved in each interaction. Time of interaction category 480 can represent a time at which the interaction was executed. In some embodiments, time of interaction category 480 can be represented by a date (e.g., date sub-category 482; Nov. 23, 2013, for interaction 401) and time of the day (e.g., time sub-category 484; 10:32 AM local time for interaction 401). Time sub-category 484 can be represented in either military time or some other format. Alternatively, time sub-category 484 can be represented with a local time zone of either provisioning entity location category 450 or consuming entity location category 430.

In some embodiments, each interaction data can include categories of information including (not shown in FIG. 4), for example, consuming entity loyalty membership category, consuming entity credit card type category, consuming entity age category, consuming entity gender category, consuming entity income category, consuming entity with children category, product information category, and service information category.

Consuming entity loyalty membership category can represent whether the consuming entity is part of a loyalty membership program associated with a provisioning entity. For example, consuming entity loyalty membership category can represent that the consuming entity is a member of one of Costco™ membership programs including Goldstar Member™, Executive Member™, and Business Member™. Consuming entity credit card type category can represent the type of credit card used by the consuming entity for a particular interaction. For example, consuming entity credit card type category can represent that the credit card used by the consuming entity for that particular interaction can be one either American Express™, MasterCard™, VISA™, or Discover™ credit cards. In some embodiments, consuming entity credit card type category can represent a kind of MasterCard™ (e.g., Gold MasterCard™ or Platinum MasterCard™) used for a particular interaction.

In some embodiments, consuming entity demographic information can be stored in each interaction. For example, consuming entity demographic information can include at least one of: consuming entity age category, consuming entity gender category, consuming entity income category, and consuming entity with children category. In some embodiments, consuming entity age category can represent age information associated with the consuming entity; consuming entity gender category can represent gender information (e.g., Male or Female) associated with the consuming entity; consuming entity income category can represent income information (e.g., greater than $100,000 per year) associated with the consuming entity; and consuming entity with children category can represent whether the consuming entity has any children under 18 or not. For example, if the consuming entity has children under 18, a positive indication can be stored and if the consuming entity does not has children under 18, a negative indication can be stored. In some embodiments, consuming entity with children category can store information representing a number of children associated with the consuming entity.

Product information category can represent information associated with a product that is involved in an interaction. For example, product information category can represent that the product involved in the interaction is a particular type of product based on a stock keeping unit ("SKU") of the product. In some embodiments, the product's SKU can be unique to a particular provisioning entity involved in that particular interaction. Alternatively, product information category can represent the product involved in the interaction with a at least one of a Universal Product Code, International Article Number, Global Trade Item Number, and Australian Product Number. Service information category can represent information associated with a service that is involved in an interaction. For example, service information category can represent that the service involved in the interaction is a particular type of service based on an SKU of the service. It will be appreciated that an SKU can uniquely represent either a product or a service. Some examples of services can be warranties, delivery fees, installation fees, and licenses.

Figure 5:
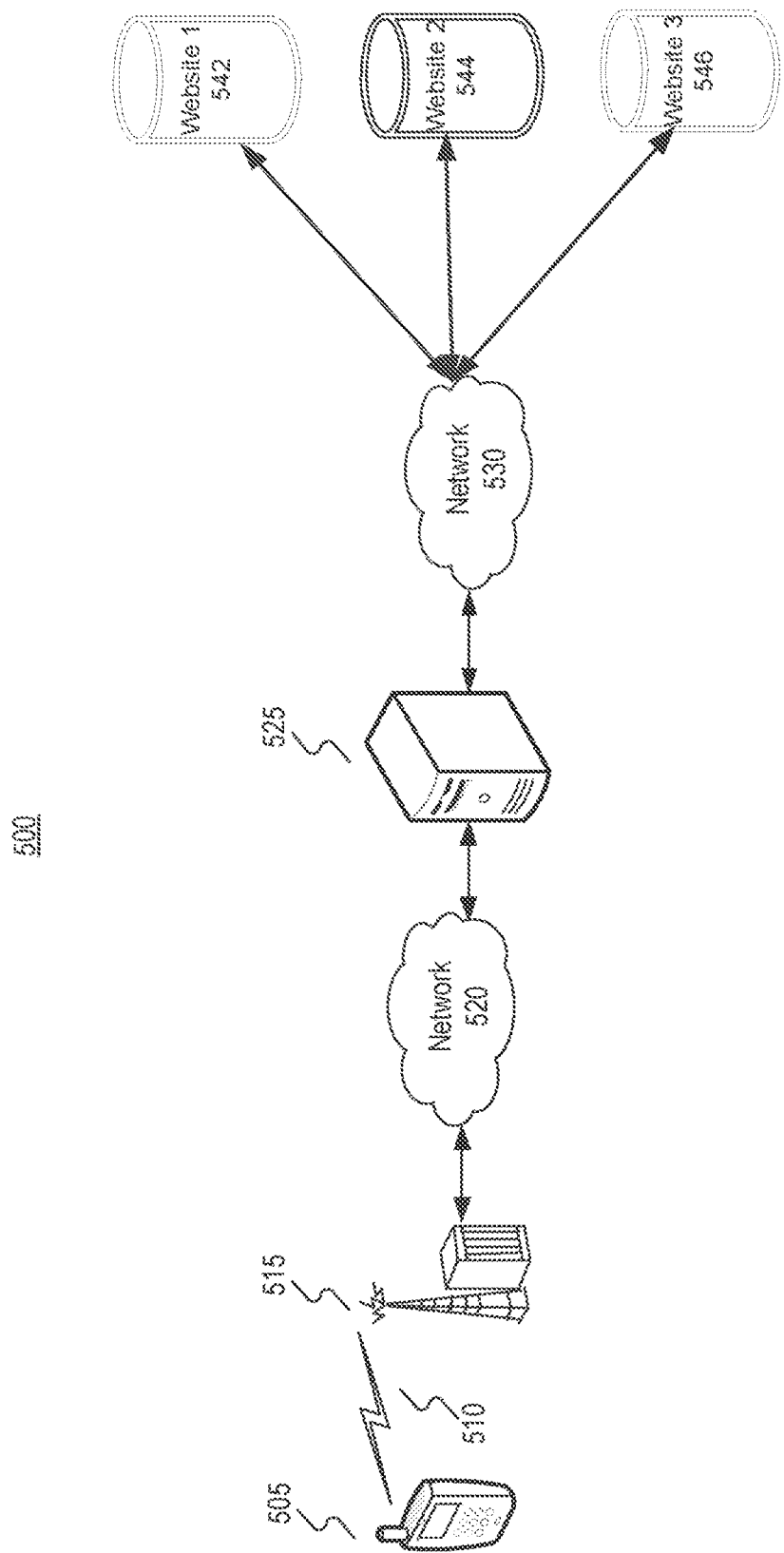
FIG. 5 is a block diagram of an exemplary scenario depicting a system for analyzing entity performance, consistent with the embodiments of the present disclosure.

FIG. 5 is a block diagram of an exemplary scenario depicting a system for analyzing entity performance, consistent with embodiments of the present disclosure. System 500 depicts a scenario where a consuming entity (e.g., user of cell phone 505) can attempt to access a service at one or more provisioning entities (e.g., Website 1 542, Website 2 544, and/or Website 3 546). To access one of the provisioning entities, the consuming entity can initiate an access request from cell phone 505. The access request can include a consuming entity identification such as, for example, a cell phone number or a MAC address associated with cell phone 5015. The access request can then reach a cellular base station 515 through a communication link 510. It will be understood that communication link 510 can either be a wireless link (as shown in the exemplary embodiment of FIG. 5) or a wired link (not shown). Next, the access request can reach server 525 through network 520. Network 520 can be, for example, the Internet. In some embodiments, network 520 can be one of either a local area network, a wide area network, or an entity's intranet. Server 525 can be a server located at a service provider (e.g., Verizon Wireless™) Server 525 can be, in some embodiments, an authentication, authorization, and accounting server (AAA server). In some embodiments, server 525 can be a proxy server that can facilitate a communication between cell phone 505 and a server device at the provisioning entities (e.g., Website 1 542).

Access request can reach one of the provisioning entities after an authorization, authentication, and accounting process is complete. Access request can traverse to one of the provisioning entities through network 530. Network 530 can be similar to network 520, as described above. After the authorized and authenticated access request reaches one of the provisioning entities, the consuming entity is allowed to access the provisioning entities. In this exemplary embodiment, user of cell phone 505 can access either Website 1 542, Website 2 544, or Website 3 546, depending on details of the access request. For example, provisioning entities can be one of the websites Google™, Facebook™, and Twitter™.

After a consuming entity (e.g., user of cell phone 505 or cell phone 505) accesses one of the provisioning entities, server 525 can store information regarding the user and/or cell phone accessing these provisioning entities. Each access by a user of a website can be stored as an interaction in a data structure in Server 525. Server 525 can store such information in a data structure (e.g., data structure 400) comprising several categories of information including, but not limited to, an interaction number; consuming entity identification; consuming entity location; provisioning entity identification; provisioning entity location; type of provisioning entity; duration of interaction; and time of interaction. The data structure can be analyzed to analyze a performance of provisioning entities, for example, to estimate a number of unique consuming entities (e.g., users) per month, average amount of time a consuming entity spends on their website, time of the day where consuming entity traffic is highest or lowest, etc. It will be understood that any number of useful insights can be drawn by analyzing the data structure comprising interactions associated with consuming entities and provisioning entities. While FIG. 5, depicts a use case scenario of a cell phone user (exemplary consuming entity) accessing a website (exemplary provisioning entity), it will be understood that a process of analyzing interaction between a consuming entity and a provisioning entity can be extended to any number of scenarios, including, financial transactions between consumers and banks; credit card transactions between a consumer and a provisioning entity like a grocery store, movie theatre, gas station, mall, etc.

Figure 6:
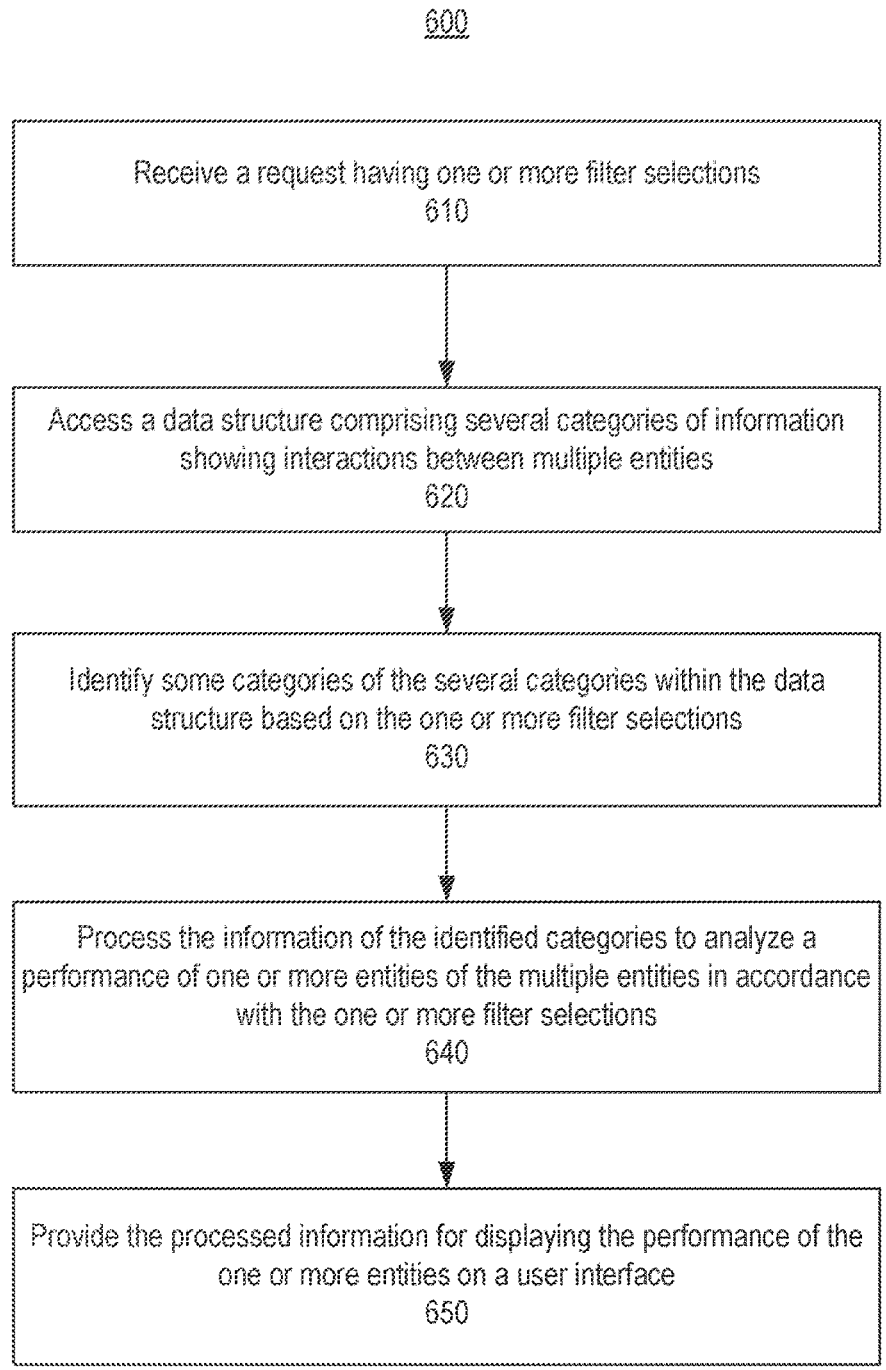
FIG. 6 is a flowchart representing an exemplary process for analyzing entity performance, consistent with the embodiments of the present disclosure.

FIG. 6 depicts a flowchart representing an exemplary process for analyzing entity performance, consistent with embodiments of the present disclosure. While the flowchart discloses the following steps in a particular order, it will be appreciated that at least some of the steps can be moved, modified, or deleted where appropriate, consistent with the teachings of the present disclosure. The analyzing of the entity performance can be performed in full or in part by a provisioning entity analysis system (e.g., provisioning entity analysis system 210). It is appreciated that some of these steps can be performed in full or in part by other systems (e.g., such as those systems identified above in FIG. 2).

Figure 7:
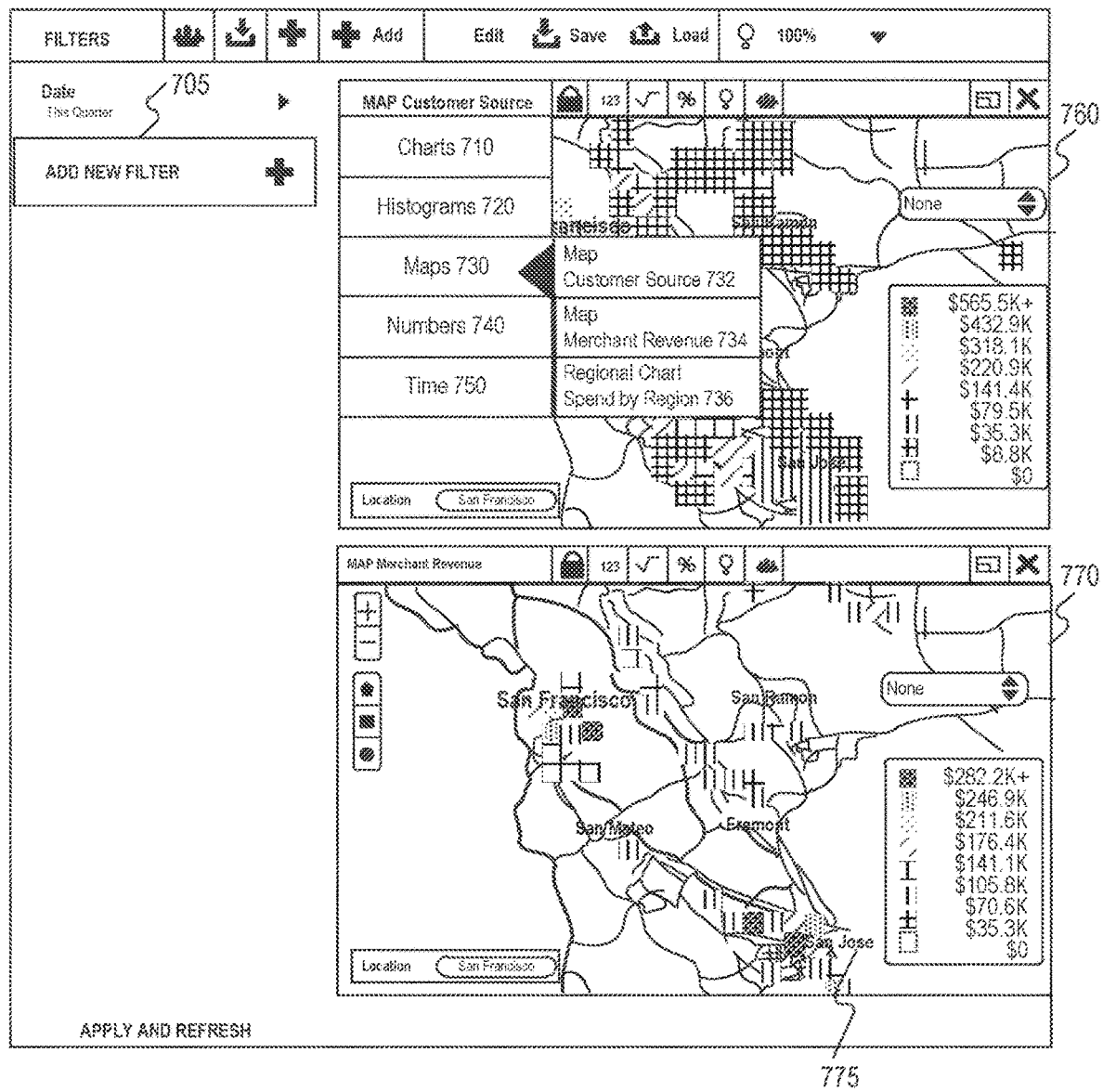
FIG. 7 is a screenshot of an exemplary user interface representing an entity performance, consistent with the embodiments of the present disclosure.
Figure 8:
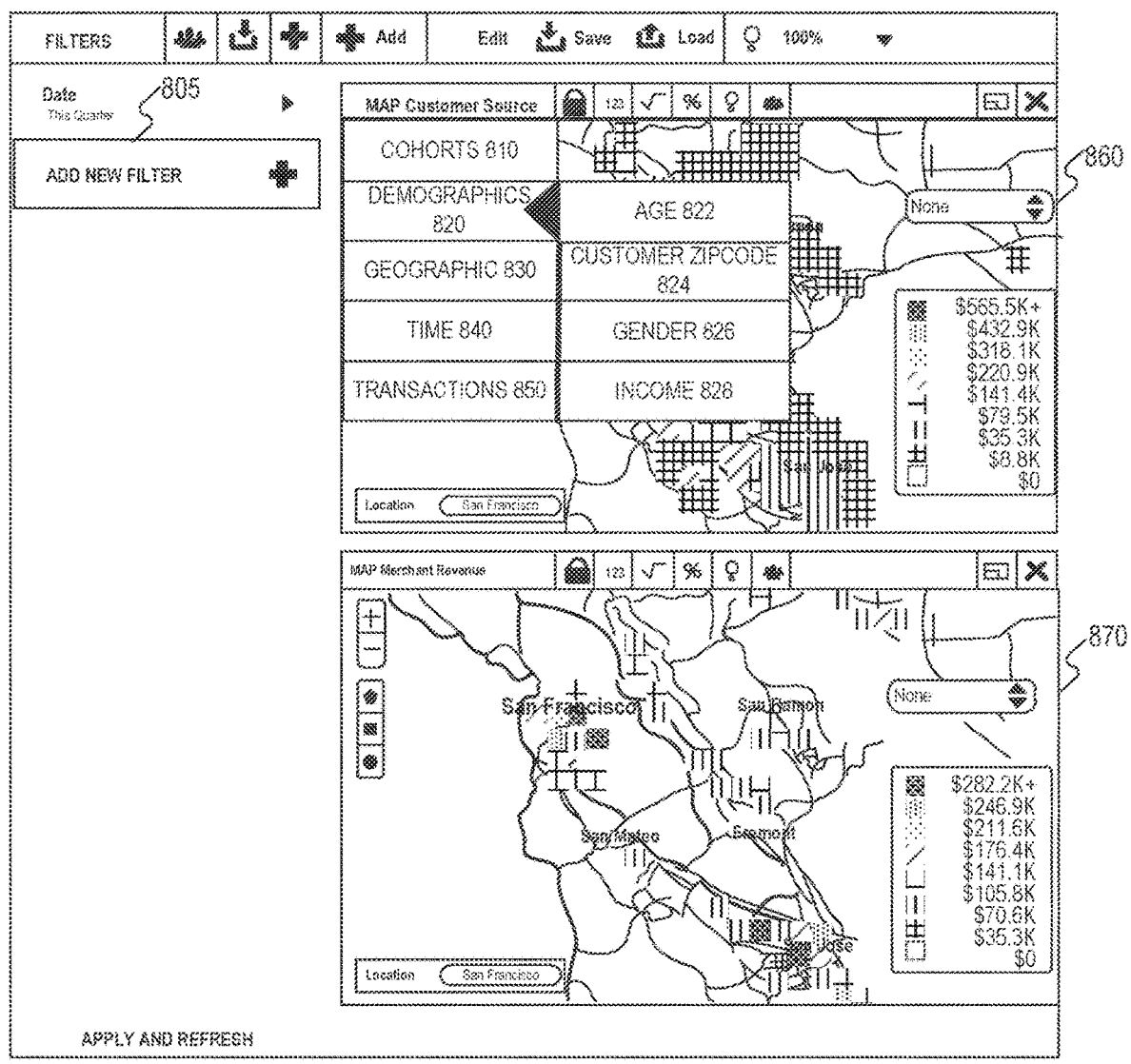
FIG. 8 is a screenshot of an exemplary user interface representing an entity performance, consistent with the embodiments of the present disclosure.

In step 610, a request having one or more filter selections can be received at a provisioning entity analysis system implementing a process for analyzing a performance of one or more entities of multiple entities. In some embodiments, the request can be received from a provisioning entity (e.g., a merchant like Lowes™) which can be interested in analyzing its performance with regards the one or more filter selections. In some embodiments, one or more filter selections of the received request can comprise a selection to represent data associated with at least one of: cohorts; demographics; geographic; time; and transactions. Alternatively, the one or more filter selections can comprise a selection to represent data associated with at least one of: charts; histograms; maps; numbers; and time. In some embodiments, the one or more filter selections can comprise a selection to represent data associated with at least one of: a location information associated with the occurrence of an interaction; a location information associated with the consuming entity; a location information associated with the provisioning entity; demographic information representing at least one of: age, gender, income, and location associated with the consuming entity; an amount associated with an interaction; and a time associated with an interaction. An exemplary screenshot of a user interface with exemplary filter selections is shown in FIGS. 7 and 8, described below.

In some embodiments, the process for analyzing a performance of one or more entities of multiple entities can be implemented without having to receive one or more filter selections. Such a process can be implemented, for example, by having the provisioning entity analysis system (e.g., provisioning entity analysis system 210) comprise one or more predetermined filter selections. These exemplary one or more predetermined filter selections can include the same selections as the one or more filters (e.g., add new filter 705 shown in FIG. 7) that can be selected by a user as described above. For example, the one or more predetermined filter selections can comprise at least one of: cohorts; demographics; geographic; time; and transactions. In another exemplary embodiment, the one or more predetermined filter selections can comprise at least one of: charts; histograms; maps; numbers; and time.

Next, in step 620, a data structure (e.g., data structure 400) comprising several categories of information showing interactions associated with multiple entities can be accessed. The data structure can represent information associated with a very large number of interactions. In some embodiments, the data structure can represent information for tens of billions of interactions (e.g., data structure 400 depicting 50 billion interactions). The data structure can be similar to the exemplary data structure 400 described in FIG. 4 above. In exemplary embodiments comprising one or more predetermined filter selections, accessing step 620 can be implemented in the same fashion as that of the exemplary embodiments where one or more filter selections can be received from a user.

Next, in step 630, some categories of the several categories within the data structure can be identified based on the one or more filter selections of the received request. The identified categories, for example, can be one or more of the several categories of the data structure (e.g., data structure 400). In some embodiments, there can be a mapping between the one or more filter selections and the several categories. For example, a filter selection for customer zip code can be mapped to consuming entity location category 430 and further to zip code sub-category 436. Another exemplary mapping can exist between a filter selection for gender and a category or a sub-category associated with a gender of consuming entity (not shown in FIG. 4). It will be appreciated that the exemplary mapping techniques described above are merely exemplary and other mapping techniques can be defined within the scope of this disclosure. In some embodiments, one or more filter selections can include "demographics and customer zip code" selections, as depicted in FIG. 8. When the provisioning entity (e.g., a home improvement store such as Lowes™) is interested in analyzing its performance at a particular location with respect to consuming entities (e.g., a consumer buying home improvement products at Lowes™) that buy products at the location, the provisioning entity can select one or more filters such as demographics 820 and further zip code 824 (associated with a zip code representing location of consuming entity).

Based on the one or more filter selections, the provisioning entity analysis system (e.g., provisioning entity analysis system 210) can identify some categories of the data structure that are relevant for analyzing the performance of the one or more entities (e.g., provisioning entity) regarding customer demographics including a location (e.g., zip code) of the consuming entities. In this example, the provisioning entity analysis system can identify categories associated with a number of interaction (e.g., number category 410), an identity of consuming entities (e.g., consuming entity identification category 420), and a location of consuming entities (e.g., consuming entity location category 430 including at least zip code sub-category 436). In some embodiments, consuming entity location category 430 can be identified along with one or more categories of state sub-category 432, city sub-category 434, zip code sub-category 436, and street address sub-category 438. In exemplary embodiments comprising one or more predetermined filter selections, identifying step 630 can be implemented in the same fashion as that of the exemplary embodiments where one or more filter selections can be received from a user.

Next, in step 640, information associated with the identified categories can be processed to analyze a performance of one or more entities of the multiple entities in accordance with the one or more filter selections. In some embodiments, a first entity of the one or more entities can be a provisioning entity (e.g., a home improvement store such as Lowes™). One or more entities of the multiple entities can comprise one or more groups of entities of the multiple entities. For example, a group of entities can be defined such that the group of entities can have similar characteristics such as all grocery stores within a given zip code or all Safeway™ locations within a city (e.g., San Jose, Calif.). In some embodiments, a group of entities can include all entities associated with the same MCC (e.g., 5542 for Automated Fuel Dispensers at a Gas Station) within a given zip code. Processing the identified categories can comprise creating a new data structure that is different from the data structure of step 620, and comprising only the identified categories of step 630 or one or more subsets of those categories. Alternatively, processing the identified categories can be performed on the existing data structure of step 620 (e.g., data structure 400).

By way of example, when the one or more filter selections is "demographics and customer zip code," the system can process information that is associated with identified categories based on the filter selections such as a number of interaction (e.g., number category 410), an identity of consuming entities (e.g., consuming entity identification category 420), a location of consuming entities (e.g., consuming entity location category 430 including at least zip code sub-category 436), and categories associated with consuming entity demographics including consuming entity age category, consuming entity gender category, and consuming entity income category. In some embodiments, data associated with identified categories can be stored in either a row-oriented database or a column-oriented database, as described above with respect to data structure 400. Processing information can involve performing statistical analysis on data stored in the identified categories. Performing statistical analysis, for example, can include various computations of data associated with identified categories. For example, if an identified category is interaction amount category 470, processing information can include performing an aggregate of the interaction amount to compute a total amount for all interactions associated with the provisioning entity. It will be understood that processing information can include other examples of performing statistical analysis, including but not limited to, computing an average, mean, maximum, minimum, or standard deviation for a series of data.

In some embodiments, processing the information of the identified categories can result in a multitude of useful insights regarding the behavior of consuming entities. Some of such insights, for example, can relate to the kinds of products bought by consuming entities, a location where consuming entities buy the products, a time as to when consuming entities buy the products, the frequency with which consuming entities buy the products, a location of residence of consuming entities, demographics information of consuming entities including their age and income level. It will be understood that the above-listed insights are merely exemplary and a number of other insights can be drawn within the scope and spirit of this disclosure.

In some embodiments, processing the information of the identified categories can result in a multitude of useful insights regarding the performance of provisioning entities. Some of such insights, for example, can relate to the kinds of products being sold by provisioning entities, a location where provisioning entities sell the products, a time as to when provisioning entities sell the products, a performance comparison between different locations of the same provisioning entity. It will be understood that the above-listed insights are merely exemplary and a number of other insights can be drawn within the scope and spirit of this disclosure. In exemplary embodiments comprising one or more predetermined filter selections, processing step 640 can be implemented in the same fashion as that of the exemplary embodiments where one or more filter selections can be received from a user.

In some embodiments, step 640 can process information of a data structure that is updated in real-time. That is, processing of information can occur on the data structure that comprises up-to-date interaction data at the time of an execution of step 640. Alternatively, step 640 can process information of a data structure that is not updated in real-time. That is, processing of information can occur on the data structure that does not comprise up-to-date interaction data at the time of an execution of step 640. For example, processing of information can occur on a data structure that is updated only periodically (e.g., on a daily or weekly basis) and not in real-time.

Next, in step 650, the processed information can be provided for displaying the performance of the one or more entities (e.g., provisioning entity) on a user interface. In some embodiments, the user interface can comprise a representation of a geographic region. The user interface can also comprise a representation of locations of the one or more entities overlaid on the geographic region; and further a representation of sub-geographic regions overlaid on a geographic region. Alternatively, the user interface can include a representation of the performance of the one or more entities over geographic or sub-geographic regions associated with a location of the one or more entities. For example, geographic or sub-geographic regions can be associated with a location of either a consuming entity or a provisioning entity.

Figure 9:
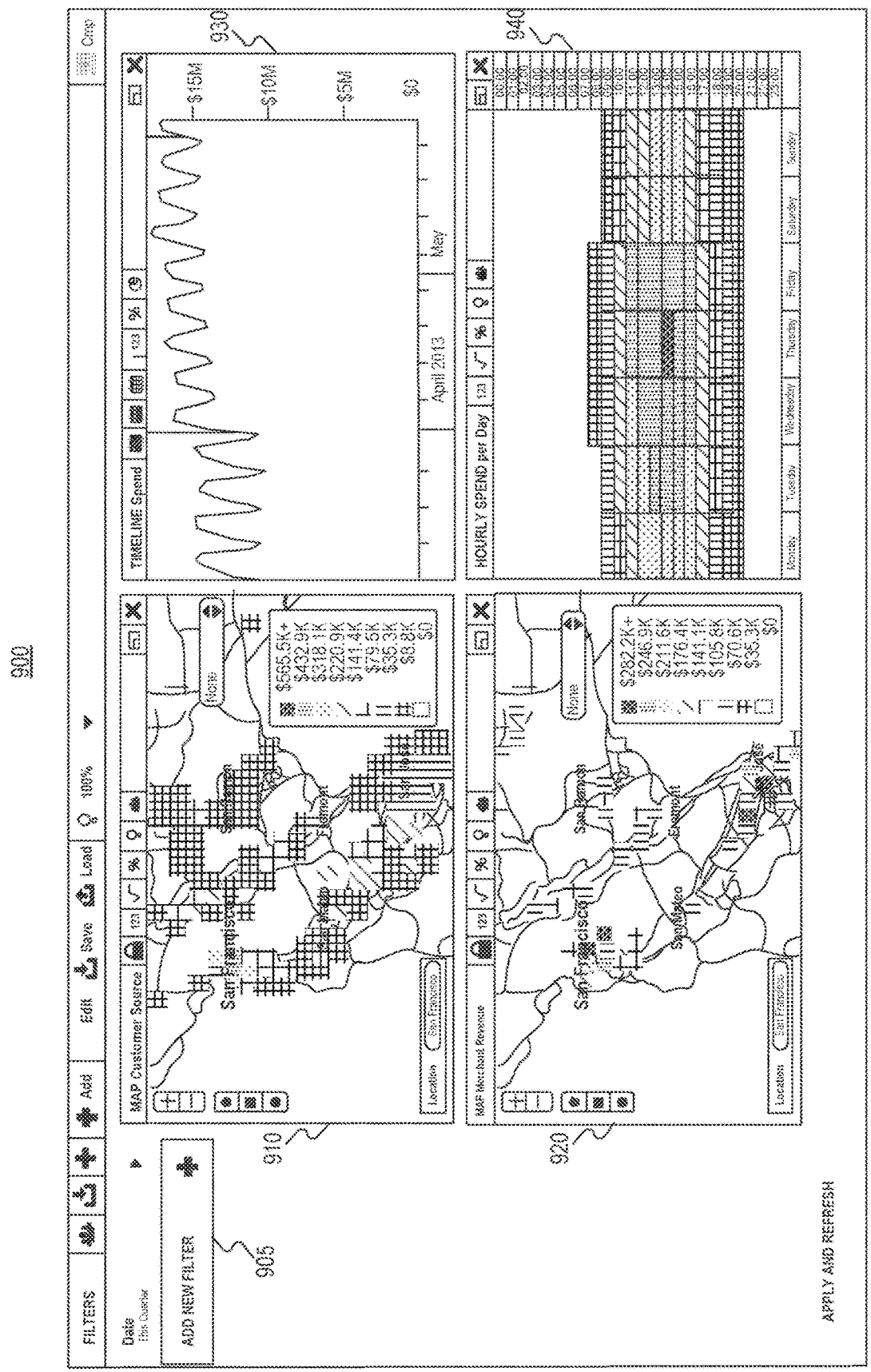
FIG. 9 is a screenshot of an exemplary user interface representing an entity performance, consistent with the embodiments of the present disclosure.

In exemplary embodiments comprising one or more predetermined filter selections, providing step 650 can be implemented in the same fashion as that of the exemplary embodiments where one or more filter selections can be received from a user. Exemplary user interfaces are depicted in FIGS. 7-9 that illustrate a performance of a provisioning entity based on one or more filter selections. As shown in FIGS. 7-9, user interface can either be a graph-based, map-based, or any other related interface.

FIGS. 7-9 illustrate several exemplary user interfaces that can be generated by provisioning entity analysis system, consistent with embodiments of the present disclosure. The exemplary user interfaces of FIGS. 7-9 are meant to help illustrate and describe certain features of disclosed embodiments, and are not meant to limit the scope of the user interfaces that can be generated or provided by the provisioning entity analysis system.

FIG. 7 shows an exemplary user interface 700 generated by a provisioning entity analysis system (e.g., provisioning entity analysis system 210), according to some embodiments. User interface 700 includes an option to add one or more new filters (e.g., add new filter 705). In some embodiments, a provisioning entity (or a user of a provisioning entity) can select the option to select the one or more new filters. Alternatively, a consuming entity can select the option to select the one or more filters. In some embodiments, the option to add one or more filters can include adding filters associated with charts 710, histograms 720, maps 730, numbers 740, and time 750. Each of the above-recited filters can further comprise sub-filters. For example, filter maps 730 can further comprise sub-filters associated with Map-Consuming Entity Source 732, Map-Provisioning Entity Revenue 734, and Regional Chart-Spend by Region 736. It will be understood that one or more filters (and sub-filters) can include any other filters associated with interactions associated with multiple entities stored in a data structure (e.g., data structure 400).

User interface 700 can include map 760, which shows consuming entity source and geohash regions (while shown as shaded rectangles, they can also include any unshaded rectangles). A geohash region, or geohash bucket, is a region associated with a latitude/longitude, hierarchal geocode system that subdivides regions of the Earth into grid shaped buckets. The level of granularity of geohash regions can vary depending on the length of the geohash code corresponding to that region. For example, a geohash code that is one bit in length can correspond to a geohash region of roughly 20 million square kilometers, and a geohash code that is six bits in length can correspond to a geohash region of roughly 1.2 square kilometers. In some embodiments, a geohash region of five bits (roughly 18 square kilometers) is preferred, although the size of the geohash region can depend on the character of the overall region which is being geohashed. For example, a six bit geohash can be more suitable for a densely populated urban area, while a four bit geohash can be more suitable for a sparsely populated rural area. In some embodiments, location information of an entity can be represented by a geohash region. For example, a geohash region of five bits representing San Jose, Calif., can comprise the latitude/longitude coordinates, N 37.3394° W 121.8950°, and can be depicted as shaded region 775 as illustrated on map 770. Alternatively, location information can be represented using a zip code. For example, a portion of San Jose, Calif., can be represented by using a zip code, 95113. It will be appreciated that location information can be represented in other ways such as street address, city, state, Global Positioning Satellite coordinates, etc.

In some embodiments, after a user enters information into the add new filter (e.g., add new filter 705), the provisioning entity analysis system receives a message to regenerate or modify the user interface. For example, if a user entered Maps 730 and then Map-Consuming Entity Source 732 into the add new filter box, the provisioning entity analysis system could receive a message indicating that a user interface should display a map with a location of each consuming entity for the given region of the map (e.g., San Francisco Bay Area), and it can generate a user interface with map 760 showing a location information for each consuming entity. For example, map 760 can display consuming entity location as shaded and unshaded rectangles in geo-hash regions. In some embodiments, a region of the map can be selected by a user by using an input device such as mouse, key board, or touch pad.

In some embodiments, after a user selects Maps 730 and then Map-Provisioning Entity Revenue 734 into the add new filter box, the provisioning entity analysis system could receive a message indicating that a user interface should display a map with revenue information of provisioning entity for the given region of the map (e.g., San Francisco Bay Area), and it can generate a user interface with map 770 showing revenue information of provisioning entity over the given region of map. For example, map 770 displays provisioning entity revenue as shaded and unshaded rectangles in geo-hash regions. It will be understood that user interface 700 can further comprise representations associated with other filter (and sub-filter) selections, including but not limited to, charts 710, histograms 720, numbers 740, and time 750.

FIG. 8 shows an exemplary user interface 800 generated by a provisioning entity analysis system (e.g., provisioning entity analysis system 210), according to some embodiments. User interface 800 includes an option to add one or more new filters (e.g., add new filter 805. In some embodiments, the option to add one or more filters can include adding filters to display an entity's performance comprising either cohort analysis (e.g., cohorts 810), demographic analysis (e.g., demographics 820), geographic analysis (e.g., geographics 830), time-based analysis (e.g., time 840), and interaction analysis (e.g., interactions 850). Each of the above-recited filters can further comprise sub-filters. For example, filter demographics 820 can further comprise sub-filters associated with age of consuming entity (e.g., age 822), location of consuming entity (e.g., consuming entity zipcode 824), gender of consuming entity (e.g., gender 826), and income of consuming entity (e.g., income 828).

User interface 800 can include map 860, which can show, for example, a representation of income of consuming entities in terms of geohash regions (while shown as shaded rectangles, they can also include any unshaded rectangles). In some embodiments, after a user enters information into the add new filter (e.g., add new filter 805), the provisioning entity analysis system receives a message to regenerate or modify the user interface. For example, if a user entered demographics 820 and then income 828 into the add new filter box, the provisioning entity analysis system would receive a message indicating that a user interface should display a map with income information of consuming entity for the given region of the map (e.g., San Francisco Bay Area), and it can generate a user interface with map 860 showing a representation of income information of consuming entity using geohash regions. For example, map 860 displays consuming entity income as shaded and unshaded rectangles in geo-hash regions. In some embodiments, if a user selects geographics 830 and then revenue 828 (to display a provisioning entity's revenue over the selected region) into the add new filter box, the provisioning entity analysis system would receive a request indicating that a user interface should display a map with revenue information of provisioning entity revenue for the given region of the map (e.g., San Francisco Bay Area), and it can generate a user interface with map 870 showing a representation of revenue information of provisioning entity revenue using geohash regions. For example, map 870 displays provisioning entity revenue as shaded and unshaded rectangles in geo-hash regions.

FIG. 9 shows an exemplary user interface 900 generated by a provisioning entity analysis system (e.g., provisioning entity analysis system 210), according to some embodiments. In addition to map-based representation (e.g., map 910 and map 920), user interface 900 can also depict an entity performance as either a graph-based representation (e.g., graph 930) or a heat-map representation (e.g., heat-map 940). In some embodiments, a user can select one or more filters (e.g., add new filter 905) to display a timeline of an aggregate spending by consuming entities. In such exemplary scenarios, provisioning entity analysis system (e.g., provisioning entity analysis system 210) can generate a user interface (e.g., graph 930) that can represent an aggregate of consuming entity spending on a daily basis at a given provisioning entity. Alternatively, the aggregate consuming entity spending on a daily basis can be displayed as a graph-based representation where the independent axis (e.g., x-axis) can represent a day and the other axis can represent aggregate consuming entity spending on a daily basis, as depicted in graph 930.

In some embodiments, a user can select one or more filters (e.g., add new filter 905) to display an hourly spending by consuming entities. In such exemplary scenarios, provisioning entity analysis system (e.g., provisioning entity analysis system 210) can generate a user interface (e.g., heat map 940) that can represent consuming entity spending on an hourly basis at a given provisioning entity. Alternatively, the consuming entity spending on an hourly basis can be displayed as a heat-map representation where different shades of gray-scale can be used to show different amount of spending on an hourly basis. In some embodiments, a color coded heat-map can be used where different colors can be used to show different amount of spending on an hourly basis. While FIG. 9 depicts a few representations of entity performance, it will be understood that those representations are merely exemplary and other representations are possible within the spirit and scope of this disclosure.

Figure 10A:
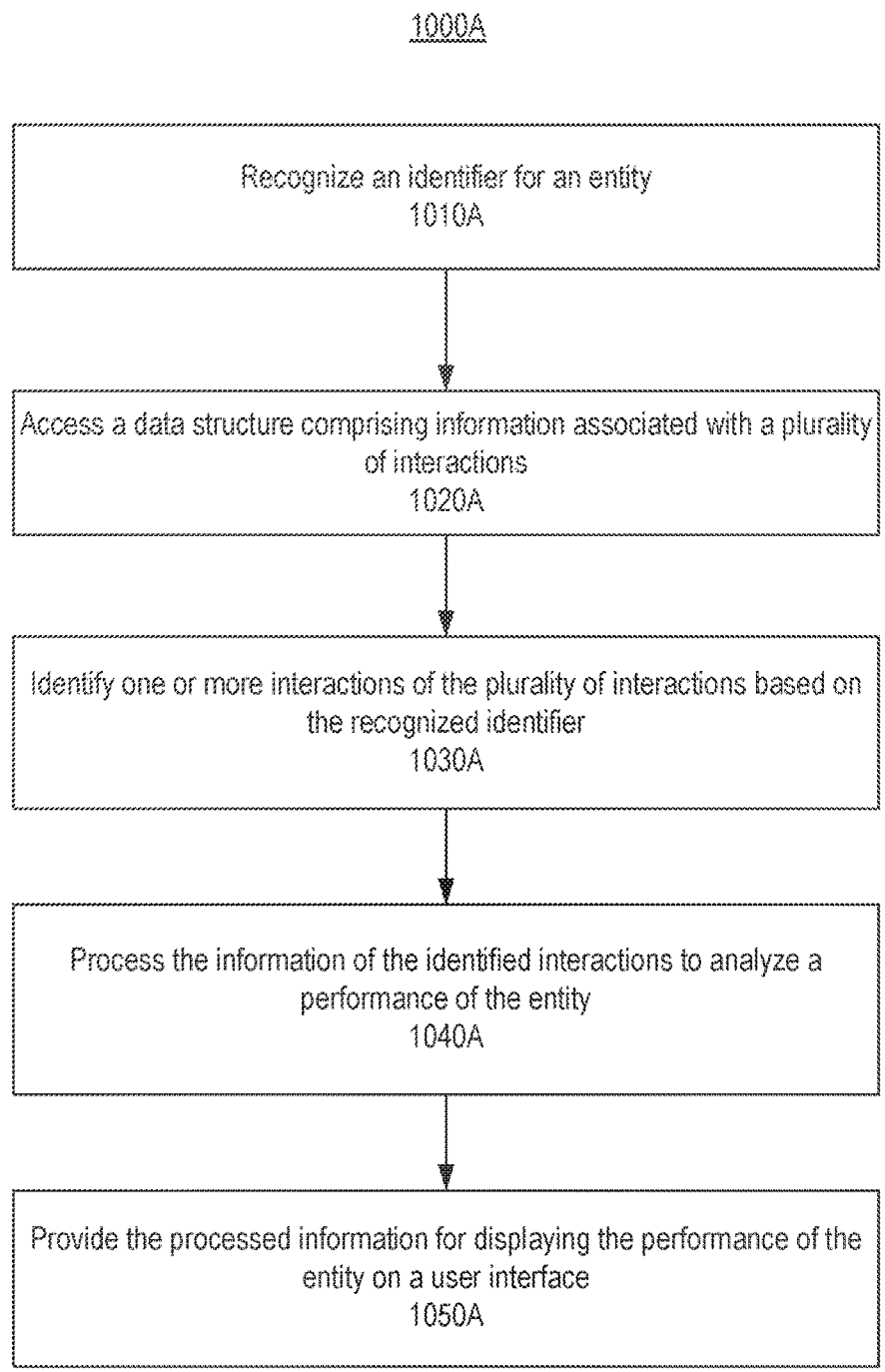
FIG. 10A is a flowchart representing an exemplary process for analyzing entity performance, consistent with the embodiments of the present disclosure.

FIG. 10A depicts a flowchart representing an exemplary process for analyzing entity performance, consistent with embodiments of the present disclosure. While the flowchart discloses the following steps in a particular order, it will be appreciated that at least some of the steps can be moved, modified, or deleted where appropriate, consistent with the teachings of the present disclosure. The analyzing of the entity performance can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1010A, an identifier associated with an entity can be recognized. In some embodiments, the entity can be a provisioning entity. Alternatively, the entity can be a consuming entity. In some embodiments, the identifier can be information associated with a provisioning entity identification category. Alternatively, the identifier can be information associated with a consuming entity identification category. It will be appreciated that other methods for recognizing an identifier associated with an entity are possible.

Next, in step 1020A, a data structure (e.g., data structure 400) comprising several categories of information and one or more interactions associated with a plurality of entities can be accessed. The data structure can represent information associated with a very large number of interactions. In some embodiments, the data structure can represent information for tens of billions of interactions (e.g., data structure 400 depicting 50 billion interactions). The data structure can be similar to the exemplary data structure 400 described in FIG. 4 above.

Next, in step 1030A, one or more interactions of the plurality of interactions can be identified based on the recognized identifier. In some embodiments, the identified interactions can be one or more interactions of the data structure that are associated with the recognized identifier of the entity. For example, the identified interactions can be one or more interactions associated with a provisioning entity identification information (e.g., provisioning entity identification category 440) or a consuming entity identification information category (e.g., consuming entity identification category 420). For an exemplary provisioning entity identification information of "Merchant 1," step 1030 can identify one or more interactions that are associated with a provisioning entity that can be identified with a name or code "Merchant 1."

In some embodiments, the accessed data structure can comprise several categories of information showing interactions associated with multiple entities. In such embodiments, the provisioning entity analysis system (e.g., provisioning entity analysis system 210) can identify some categories of the data structure that are relevant for analyzing the performance of the entity (e.g., provisioning entity) associated with the recognized identifier.

Next, in step 1040A, information associated with the identified interactions can be processed to analyze a performance of the entity. In some embodiments, processing the identified interactions can comprise creating a new data structure that is different from the data structure of step 1020A, and can comprise only the identified interactions of step 1030A or one or more subsets of those categories. Alternatively, processing the identified interactions is performed on the existing data structure of step 1020A (e.g., data structure 400).

In some embodiments, processing the information of the identified interactions can result in a multitude of useful insights regarding the behavior of consuming entities. Some of such insights, for example, can relate to the kinds of products bought by consuming entities, a location where consuming entities buy the products, a time as to when consuming entities buy the products, the frequency with which consuming entities buy the products, a location of residence of consuming entities, demographics information of consuming entities including their age and income level. It will be understood that the above-listed insights are merely exemplary and a number of other insights can be drawn within the scope and spirit of this disclosure.

Alternatively, processing the information of the identified interactions can result in a multitude of useful insights regarding the performance of provisioning entities. Some of such insights, for example, can relate to the kinds of products being sold by provisioning entities, a location where provisioning entities sell the products, a time as to when provisioning entities sell the products, a performance comparison between different locations of the same provisioning entity, and performance comparison between competing provisioning entities. It will be understood that the above-listed insights are merely exemplary and a number of other insights can be drawn within the scope and spirit of this disclosure.

In some embodiments, step 1040A can process information of a data structure that is updated in real-time. That is, processing of information can occur on the data structure that comprises up-to-date interaction data at the time of an execution of step 1040A. Alternatively, step 1040A can process information of a data structure that is not updated in real-time. That is, processing of information can occur on the data structure that does not comprise up-to-date interaction data at the time of an execution of step 1040A. For example, processing of information can occur on a data structure that is updated only periodically (e.g., on a daily or weekly basis) and not in real-time.

In some embodiments, the processed information can comprise analysis information of a first entity or a first group of entities of the plurality of entities and a second entity or a second group of entities of a plurality of entities. For example, a first entity of the one or more entities can be a provisioning entity (e.g., a home improvement store such as Lowes™) and a second entity of the one or more entities can be a provisioning entity (e.g., a home improvement store such as Home Depot™). In some embodiments, the second entity can be a competitor of the first entity. In some embodiments, the first or second group of entities of the plurality of entities can be defined such that the first or second group of entities can comprise similar characteristics. For example, the first or second group of entities can be all grocery stores within a given zip code or all Safeway™ locations within a city (e.g., San Jose, Calif.). Alternatively, the first or second group of entities can include all entities associated with the same MCC (e.g., 5542 for Automated Fuel Dispensers at a Gas Station) within a given zip code.

In some embodiments, for each entity of a plurality of entities, a group of entities (e.g., a first group of entities of the plurality of entities) associated with the entity can be identified or estimated such that the entity can analyze its own performance against the group of entities in aggregate. The group of entities can include a group of provisioning entities. For example, the group of provisioning entities associated with a first provisioning entity can be identified based on at least one of: a similarity between attributes of consuming entities that are associated with the first provisioning entity and consuming entities that are associated with other provisioning entities; a location information associated with the first provisioning entity and associated with other provisioning entities; information representing a market share associated with the first provisioning entity and a market share associated with the other provisioning entities; and information representing a wallet share associated with the first provisioning entity and a wallet share associated with the other provisioning entities. In some embodiments, the group of entities can be referred to as, for example, a cohort of entities, a set of entities, or an associated set of entities. It will be appreciated that the group of entities can be referred to by using other names.

A similarity between attributes of consuming entities that are associated with the first provisioning entity and consuming entities that are associated with other provisioning entities can be used to determine a group of provisioning entities associated with the first provisioning entity. For example, customer entity demographic information (e.g., age, gender, income, and/or location) can be analyzed between customer entities of the first provisioning entity and customer entities of the other provisioning entities to identify a group of provisioning entities that have similar customer entity demographic information. Location information associated with the first provisioning entity and with other provisioning entities can be analyzed to identify a group of provisioning entities associated with the first provisioning entity. For example, other provisioning entities that are located within a specified distance to a location of the first provisioning entity can be identified as part of the group of provisioning entities. Alternatively, other distance criteria such as, for example, same zip code, can be used to identify the group of provisioning entities. For example, a restaurant situated in an airport can be interested in analyzing its own performance relative to other restaurants situated within the same airport.

Information representing a market share associated with the first provisioning entity and a market share associated with the other provisioning entities can be used to identify a group of provisioning entities associated with the first provisioning entity. For example, a high-end bicycle store can be interested in comparing its performance against other high-end bicycle stores. In other words, a group of high-end bicycle stores can be identified based on a market share analysis of high-end bicycle stores. Information representing a wallet share associated with the first provisioning entity and a wallet share associated with the other provisioning entities can be used to identify a group of provisioning entities associated with the first provisioning entity. For example, a novelty late-night theatre can be interested in comparing its performance against other provisioning entities that also operate late-night (e.g., bars or clubs) and hence can likely compete with those entities for a consuming entity's time and money. An exemplary definition of wallet share can be a percentage of consuming entity spending over a period of time such as on a daily basis or a weekly basis etc.

In some embodiments, the group of provisioning entities can be identified by using a multi-timescale correlation comparison. One method of implementing the multi-timescale correlation comparison can be by analyzing interactions between a consuming entity and a first provisioning entity ("first provisioning entity interactions") with that of interactions between the consuming entity and a second provisioning entity ("second provisioning entity interactions"). For example, if the first provisioning entity interactions are correlated with the second provisioning entity interactions on a daily timescale but anti-correlated (or inversely correlated) on an hourly timescale, then the first provisioning entity and the second provisioning entity can be defined as complementary entities rather than competitive entities. In such scenarios, the second provisioning entity need not be part of a group of provisioning entities the first provisioning entity is interested in comparing against. Alternatively, if the first provisioning entity interactions are anti-correlated with the second provisioning entity interactions on a daily timescale but correlated on an hourly timescale, then the first provisioning entity and the second provisioning entity can be defined as competitive entities. In such scenarios, the second provisioning entity can be included in a group of provisioning entities the first provisioning entity is interested in comparing against.

In some embodiments, a competitor to the first entity can be identified or estimated based on at least one of: an MCC information associated with the first entity; a distance between a location of the first entity and a location of the competitor; and demographic information representing at least one of age, income, and gender associated with a consuming entity involved in interactions associated with the first entity.

In some embodiments, an identity of the first entity can be known and an identity of the second entity can be unknown. For example, the recognized identifier can be associated with the first entity and accordingly, an identify of the first entity can be known. In such embodiments, an identity of the second entity can be estimated based on information representing at least two attributes of the first entity. In some embodiments, the at least two attributes of the first entity can include an attribute representing a type of entity for the first identity and an attribute representing a location of the first entity. For example, knowing a type of the first entity (e.g., gas station) and location of the first entity (e.g., zip code), the data structure (e.g., data structure 400) can be analyzed to identify entities that are of the same type as that of the first entity and are in a proximity to the location of the first entity. If the estimation returns more than one possible choice for an identity of the second entity, the system can select one of the possible choices by selecting the entity that is closest in proximity to the first entity. Alternatively, other criteria can be used to select from the more than one possible choices. In some embodiments, attributes other than that of location and type of the first entity can be used to estimate the identity of the second entity.

Figure 10B:
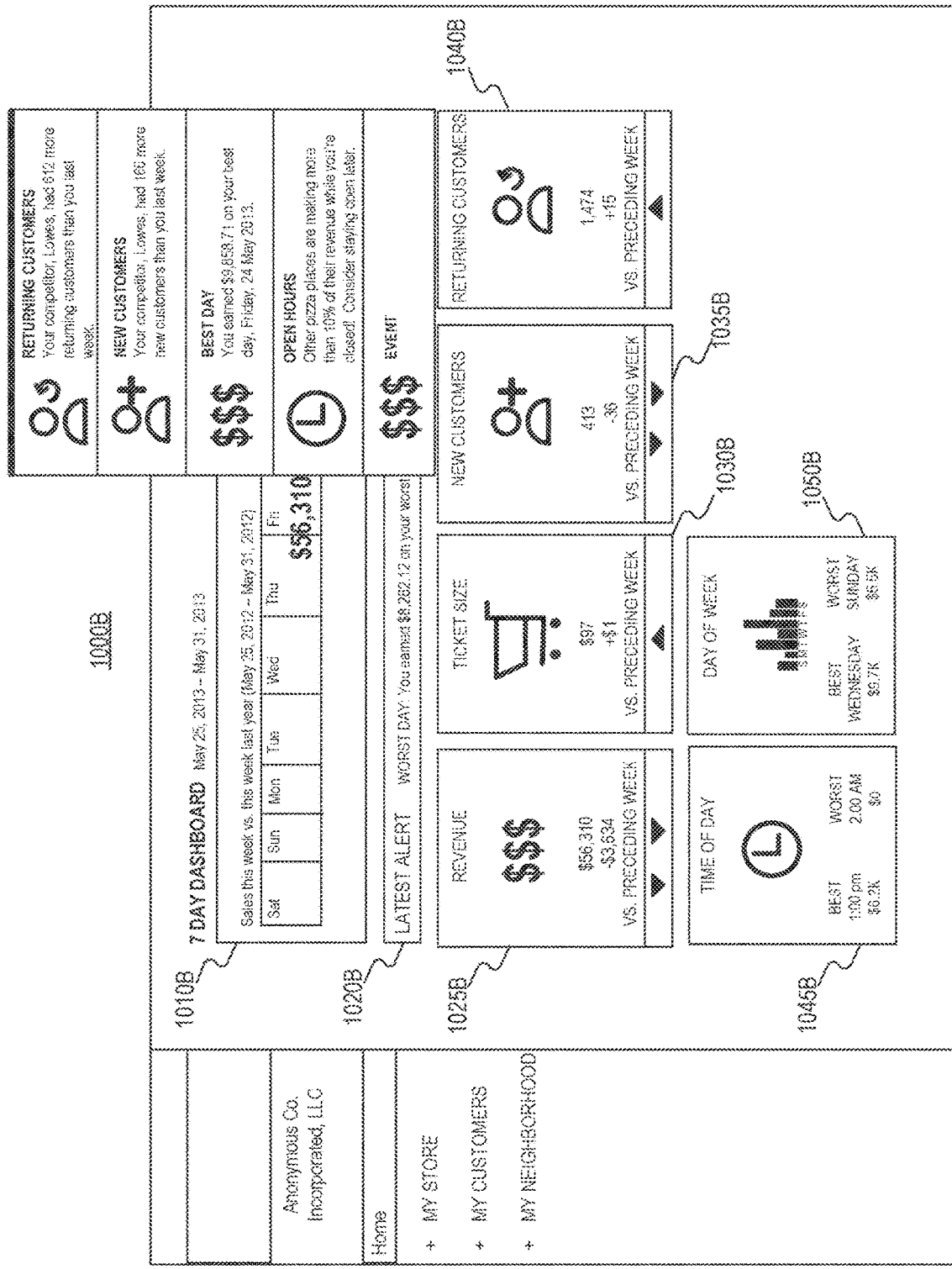
FIG. 10B is a screenshot of an exemplary user interface representing an entity performance, consistent with the embodiments of the present disclosure.

Next, in step 1050A, the processed information can be provided for displaying the performance of the entity (e.g., provisioning entity) on a user interface. In some embodiments, the user interface can comprise a representation of a geographic region. The user interface can also comprise a representation of locations of the one or more entities overlaid on the geographic region; and further a representation of sub-geographic regions overlaid on a geographic region. An exemplary user interface is depicted in FIG. 10B. As shown in FIG. 10B, the user interface can include a dashboard showing a graphical representation of the performance of an entity based on recognizing an identifier for the entity.

More particularly, FIG. 10B shows an exemplary user interface 1000B that a provisioning entity analysis system (e.g., provisioning entity analysis system 210) can generate, according to some embodiments. User interface 1000B can include a dashboard (e.g., dashboard 10108) that can depict a performance of an entity over a metric. For example, dashboard 10108 represents information of sales of the entity (e.g., a provisioning entity) over a 7-day period for the current week (May 25, 2013-May 31, 2013) compared to the same week of the previous year (May 25, 2012-May 31, 2012). In some embodiments, dashboard 10108 can represent information comparing the entity's actual revenue with the entity's expected revenue. For example, the provisioning entity can input an expected revenue for a period of time (e.g., weekly, quarterly, or yearly). After receiving information regarding the expected revenue, the provisioning entity analysis system can analyze interaction data to analyze the entity's performance relative to the expected revenue. An outcome of such comparative analysis can be represented with an exemplary bar graph or a pie chart on user interface 10008. Alternatively, the entity's expected revenue information can be inferred without having to receive an external input representing the expected revenue. For example, the provisioning analysis system can analyze interaction data of the data structure to estimate a number for the entity's expected revenue.

In some embodiments, dashboard 10108 can be represented as a bar graph using two different fills, one fill representing sales of the current week and another representing sales from last year. It will be understood that other representations of dashboard 1010A are possible. Alternatively, the dashboard can be preconfigured to analyze interaction data for a period of time such as, for example, 7-days, one month, one quarter, one year, etc.

In some embodiments, user interface 1000B can also include a box for representing an alert (e.g., latest alert 1020B) that can indicate certain performance metrics of the entity. For example, latest alert 10208 includes information to indicate that the entity's worst day within the preconfigured period of time is May 31, 2013. A different entity performance metric can be included in latest alert 10208.

Alternatively, user interface 10008 can include user interface elements representing information associated with entity performance metrics such as revenue (e.g, revenue 1025B), amount of interaction (e.g., ticket size 1030B), new consuming entities (new consuming entities 1035B), returning consuming entities (e.g., returning consuming entities 1040B), time of interaction in a day (e.g., time of day 1045B), and interactions during a day of the week (e.g., day of week 1050B). For example, each of the above-described user interface elements can be depicted as rectangular box with an icon and some information representing the performance metric of the entity. It will be understood that in some embodiments, user interface elements can be depicted using different approaches such as, for example, charts, maps, histograms, numbers etc.

Figure 11:
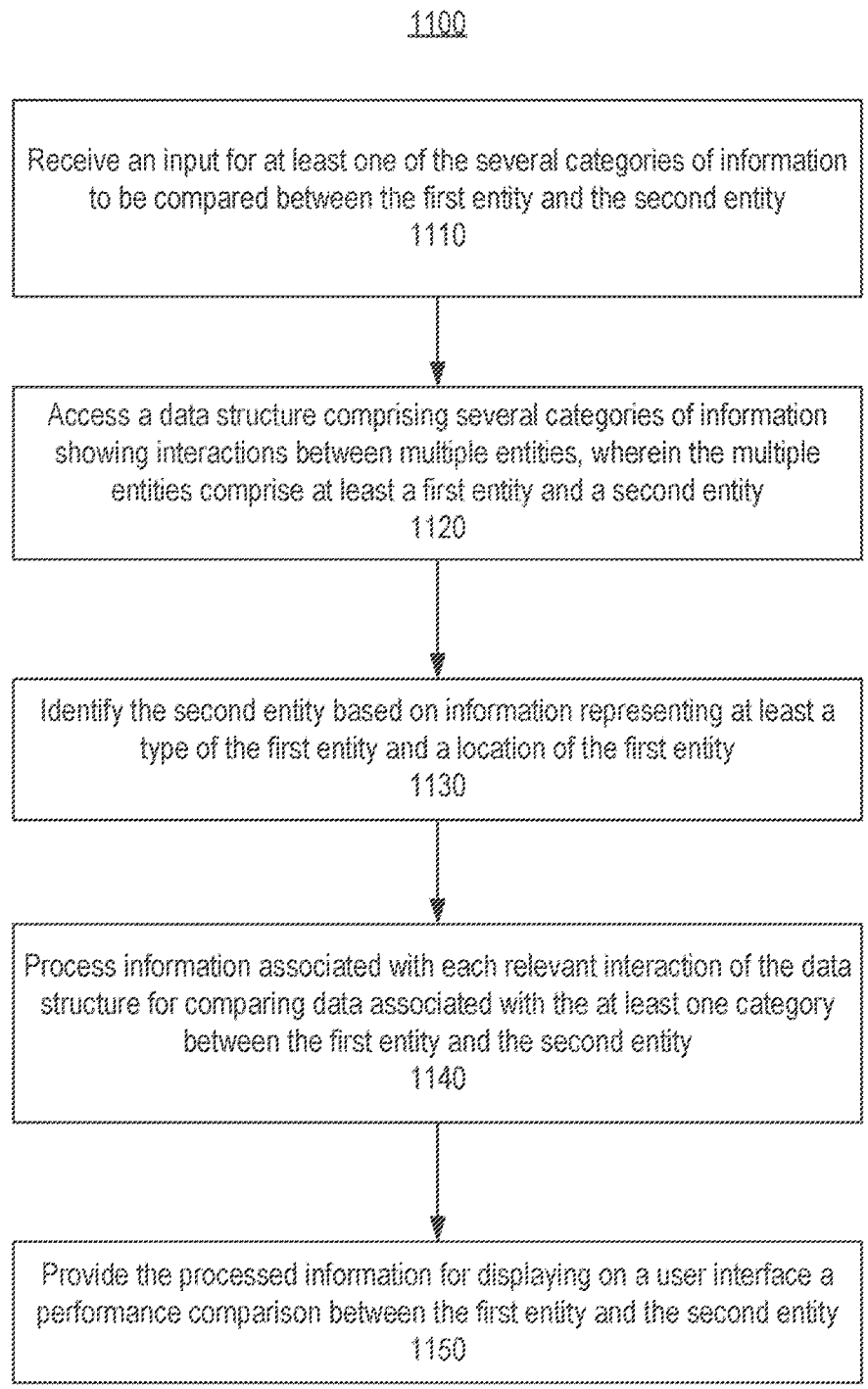
FIG. 11 is a flowchart representing an exemplary process for comparing entity performance, consistent with the embodiments of the present disclosure.

FIG. 11 depicts a flowchart representing an exemplary process for comparing entity performance, consistent with embodiments of the present disclosure. While the flowchart discloses the following steps in a particular order, it will be appreciated that at least some of the steps can be moved, modified, or deleted where appropriate, consistent with the teachings of the present disclosure. The comparing of the entity performance can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1110, an input for at least one category of information to be compared between a first entity and a second entity can be received at a provisioning entity analysis system implementing a process for comparing a performance between the first entity and a second entity. In some embodiments, the input can be received from a provisioning entity (e.g., a merchant like Lowes™), which can be interested in analyzing their performance relative to a competitor (e.g., HomeDepot™). Alternatively, a competitor to the first entity can be identified or estimated based on at least one of: an MCC information associated with the first entity; a distance between a location of the first entity and a location of the competitor; and demographic information representing at least one of age, income, and gender associated with a consuming entity involved in interactions associated with the first entity.

In some embodiments, the input can be received from a first entity, where an identity of the first entity can be known. In some embodiments, an identity of the second entity can be provided. For example, the user of the first entity can provide an identity of the second entity. Alternatively, an identity of the second entity is not provided. In exemplary embodiments where an identity of the second entity is not provided, an identity of the second entity can be estimated as described below.

In some embodiments, the received input can comprise a selection to represent data associated with at least one of: demographics; geographic; time; and transactions. Alternatively, the received input can comprise a selection to represent data associated with at least one of: charts; histograms; maps; numbers; and time. In some embodiments, the received input can be similar to one or more filter selections (e.g., add new filter 705) described in FIG. 6. An exemplary screenshot of a user interface comparing a performance of the first entity with that of the second entity can be shown in FIG. 12, described below.

Next, in step 1120, a data structure (e.g., data structure 400) comprising several categories of information showing interactions associated with multiple entities can be accessed. The data structure can represent information associated with a very large number of interactions (e.g., data structure 400 of FIG. 4. depicting 50 billion interactions). In some embodiments, the multiple entities can include at least the first entity (e.g., a first provisioning entity such as Lowes™) and the second entity (e.g., a second provisioning entity such as HomeDepot™).

Next, in step 1130, an identity of the second entity can be estimated based on information representing at least two attributes of the first entity. In some embodiments, the at least two attributes of the first entity can include an attribute representing a type of entity for the first identity and an attribute representing a location of the first entity. For example, knowing a type of the first entity (e.g., gas station) and location of the first entity (e.g., zip code), the data structure (e.g., data structure 400) can be analyzed to identify entities that are of the same type as that of the first entity and are in a proximity to the location of the first entity. If the estimation returns more than one possible choice for an identity of the second entity, the system can select one of the possible choices by selecting the entity that is closest in proximity to the first entity. Alternatively, other criteria including, attributes other than that of location and type of the first entity can be used to estimate the identity of the second entity.

Next, in step 1140, relevant interaction information associated with the at least one category of the data structure can be processed to compare a performance of the first entity with that of the second entity. In some embodiments, the processing step 1140 can be very similar to processing step 640 described above. For example, step 1140 can involve two processing operations (e.g., processing operation of step 640), one for processing the information associated with the at least one category of the first entity and another one for processing the information associated with the at least one category of the second entity. After performing such operations, step 1140 can then compare the processed information from processing the first entity with that of the second entity.

Next, in step 1150, the processed information can be provided for displaying a comparison between a performance of the first entity with that of the second entity. Exemplary user interface is depicted in FIG. 12 that illustrates a performance comparison between the first and second entities.

Figure 12:
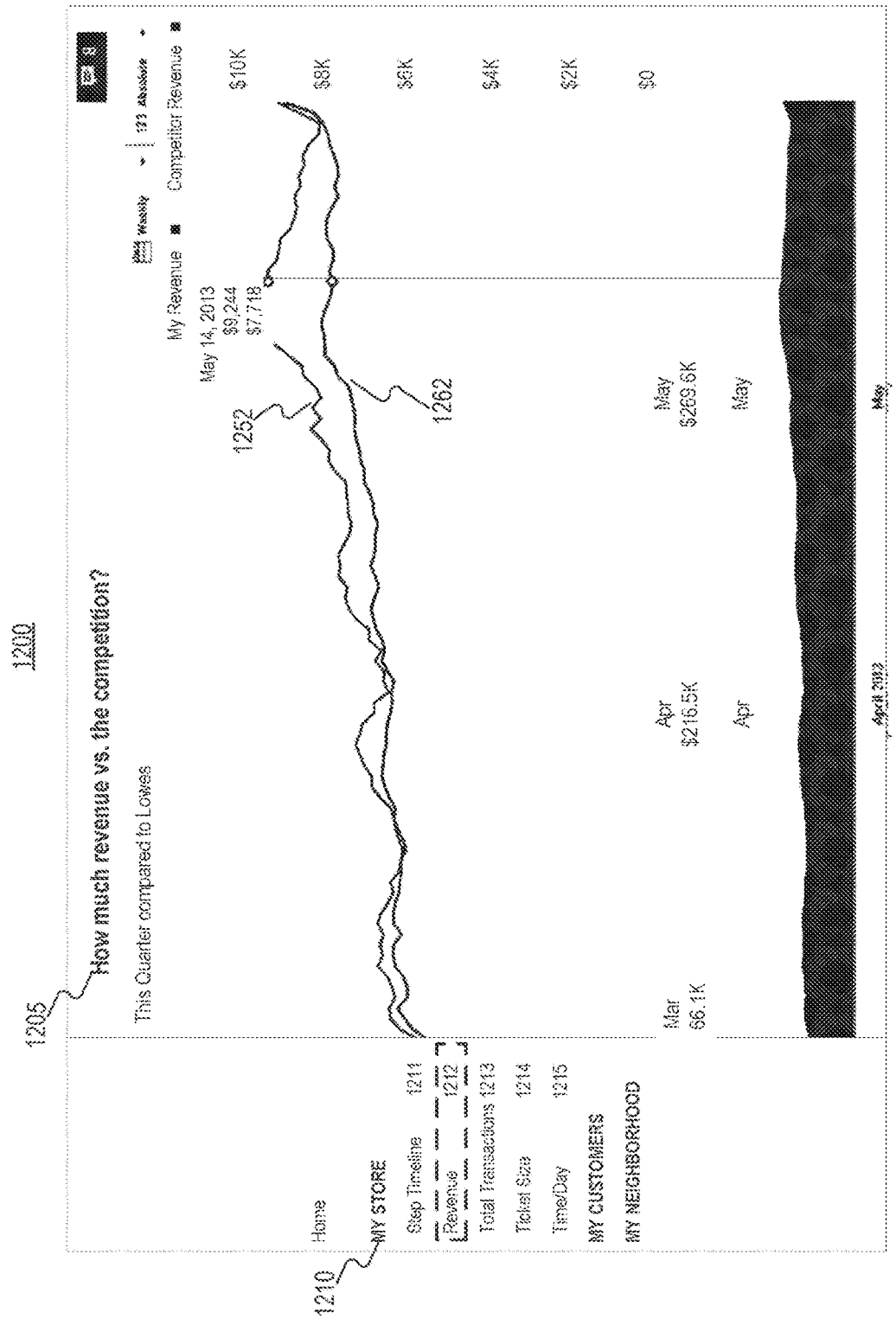
FIG. 12 is a screenshot of an exemplary user interface representing a comparison of entity performance, consistent with embodiments of the present disclosure

FIG. 12 shows a user interface 1200 generated by a provisioning entity analysis system (e.g., provisioning entity analysis system 210), according to some embodiments. In some embodiments, user interface 1200 includes an option to add one or more inputs for categories to be compared between entities. For example, user interface 1200 can include categories representing timeline 1211, revenue 1212, total transactions 1213, ticket size 1214, and time/day 1215. It will be understood that other categories can be included in user interface 1200.

User interface 1200 can depict two graphs (e.g., graph 1252 and graph 1262) to represent a performance comparison between the first entity and the second entity. For example, graph 1252 can represent a performance of the first entity for the selected category revenue 1212. In the exemplary embodiment depicted in user interface 1200, the first entity intends to compare its own revenue performance with that of one of its competitor over a given period of time (e.g., over the current quarter). Graph 1252 can represent revenue of the first entity over the current quarter whereas graph 1262 can represent revenue of the second entity (competitor to the first entity) over the same current quarter. It will be understood that in some embodiments, entity performance can be represented using different approaches such as, for example, charts, maps, histograms, numbers etc. In some embodiments, where an identity of the second entity is not known, an identity of the second entity can be estimated using the exemplary process described in FIG. 11.

Figure 13:
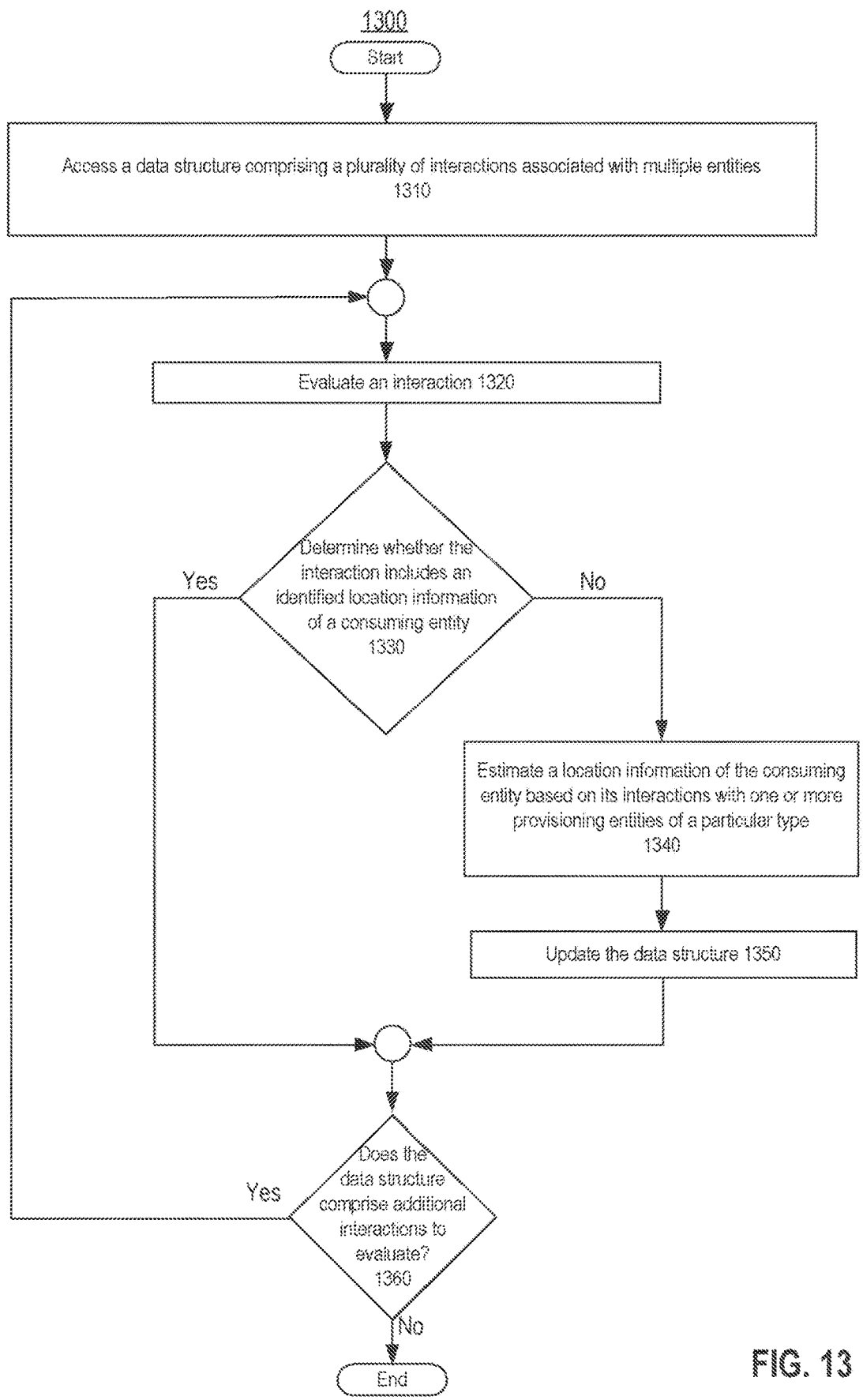
FIG. 13 is a flowchart representing an exemplary process for estimating a consuming entity's location, consistent with the embodiments of the present disclosure.

FIG. 13 depicts a flowchart representing an exemplary process 1300 for estimating a location of a consuming entity, consistent with embodiments of the present disclosure. While the flowchart discloses the following steps in a particular order, it will be appreciated that at least some of the steps can be moved, modified, or deleted where appropriate, consistent with the teachings of the present disclosure. Process 1300 can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1310, a data structure (e.g., data structure 400) comprising a plurality of interactions associated with multiple entities can be accessed. In some embodiments, the accessed data structure can comprise a plurality of categories of information showing interactions associated with multiple entities. The data structure can be similar to the exemplary data structure 400 described with reference to FIG. 4 above. The plurality of interactions of the data structure can include information associated with a consuming entity and a provisioning entity (e.g., a first provisioning entity). Each such interaction of the data structure can include at least one attribute of the consuming entity and at least one attribute of the provisioning entity. In some embodiments, the at least one attribute of the consuming entity can include a location information of the consuming entity. For some consuming entities, the location information may not be known or identified.

Moreover, in some embodiments, the at least one attribute of the provisioning entity can include an identification information of the provisioning entity. Alternatively, the at least one attribute of the provisioning entity can include an attribute other than an identification information of the provisioning entity, such as a type of the provisioning entity.

Next, in step 1320, an interaction of the data structure can be evaluated. Next, in step 1330, a determination can be made for the interaction of the data structure as to whether the interaction includes an identified location information of the consuming entity. In some embodiments, the determination can include analyzing whether the categories of information associated with a location information of the consuming entity (e.g., consuming entity location category 430) are populated or not. If it turns out that the categories of information associated with a location information of the consuming entity are populated, then the determination can return a positive indication to signify that the at least one attribute of the consuming entity includes a location information of the consuming entity and the process can then move to step 1360. If, on the other hand, the categories of information associated with a location information of the consuming entity are not populated, then the determination can return a negative indication to signify that the interaction does not include a location information of the consuming entity and the process can then move to step 1340.

In some embodiments, where the categories of information associated with a location information of the consuming entity are populated, the determination can further include verifying that the populated data is valid data that signifies a location information before the process can move to step 1360. For example, for the category of information representing zip code (e.g., zip code sub-category 456), if the populated data is 94085, it can be verified as a valid data and the process can then move step 1360. On the other hand, if the populated data is 940850, it can be verified as an invalid data for zip code as zip codes, at least in the United States, are supposed to be only five decimal numerical digits, and the process can then move to step 1340 described below. It will be understood that other methods to determine whether the interaction includes a location information of the consuming entity can be implemented within the scope and spirit of this disclosure.

Next, if the interaction of the data structure does not include an identified location information of the consuming entity, at step 1340, an estimation can be performed to determine location information of the consuming entity based on its interactions with one or more provisioning entities (e.g., second provisioning entity, for purposes of simplicity) of a particular type (e.g., type of provisioning entity category 460). For example, the second provisioning entity can be of the type including a gas station, a pharmacy, restaurant, or a grocery store. In some embodiments, location information of the consuming entity can be estimated by analyzing interactions between the consuming entity and the second provisioning entity. For example, interactions between the consumer entity and a type of provisioning entity that represents gas stations can be analyzed such that the gas station at which the consuming entity most frequently fills up gas can be identified as a location of the consuming entity. This is because it can be reasonable to assume that the consuming entity can frequently fill up gas at a gas station that is in a proximity to the residential location of the consuming entity. In some embodiments, interactions between the consumer entity and a type of provisioning entities that represent gas stations can result in similar number of interactions between two different gas stations in two different locations (e.g., zip codes). In such embodiments, one method of estimating a location of the consuming entity is to then analyze interactions between the consuming entity and a third provisioning entity that can represent grocery stores because it can be reasonable to assume that the consuming entity would more often than not shop for groceries at a location closer to residential location of the consuming entity. Moreover, in some embodiments, the estimating of a location can take into consideration the date (e.g., weekend) and or time (e.g., typical times before or after work) of an interaction with a type of provisioning entity. Based on analyzing interactions with the third provisioning entity (such as grocery stores) and combining such analysis with that of the interactions with the second provisioning entity (such as gas stations), an estimation can be made regarding a location of the consuming entity.

In some embodiments, step 1340 can estimate a location information of the consuming entity after the determination returns that the at least one attribute of the consuming entity includes an invalid location information of the consuming entity by using similar techniques as described above. It will be understood that the above-recited estimation techniques are merely exemplary and not intended to be limiting.

Next, in step 1350, the data structure can be updated with an estimated location information of the consuming entity. In some embodiments, data associated with only the evaluated interaction can be updated. Alternatively, data associated with all interactions associated with the consuming entity can be updated irrespective of whether those interactions were previously evaluated or not. Next, in step 1360, a determination can be made whether the data structure comprises additional interactions that are to be evaluated. If the determination returns an answer in the positive, signifying that there are additional interactions that are to be evaluated, the process can go back to step 1320 to evaluate another interaction and further to repeat the process comprising steps 1320 through 1360, as described above. On the other hand, if the determination returns an answer in the negative, signifying that there are no additional interactions that are to be evaluated, the process can end.

In some embodiments, a provisioning entity analysis system can resolve the name of a provisioning entity. A data structure storing information associated with billions of interactions can include millions of provisioning entities and it is possible that some of the names of the provisioning entities are not consistent. For example, the name of provisioning entity "McDonalds's" can be indicated by a number of combinations such as, "McDonald's," "Mc Donalds," "mcdonalds," "Mcdonald's," etc. While each of the above-recited names can be intended to indicate the same entity, some processing can be necessary before the system can analyze all such names as the same entity. Exemplary methods for resolving a name of provisioning entities are described in U.S. Non-Provisional patent application Ser. No. 13/827,491, titled Resolving Similar Entities From A Transaction Database filed on Mar. 14, 2013, the entirety of which is expressly incorporated herein by reference.

An exemplary method of resolving a provisioning entity name can include a number of factors including, but not limited to, categories of information associated with interactions, analyzing interactions associated with competitive and/or complementary provisioning entities. Such exemplary method can result in a significant uplift in accuracy in resolving the name of provisioning entities. In some embodiments, a percentage accuracy in resolving the name of provisioning entities can be increased to high nineties (e.g., 97%).

Figure 14:
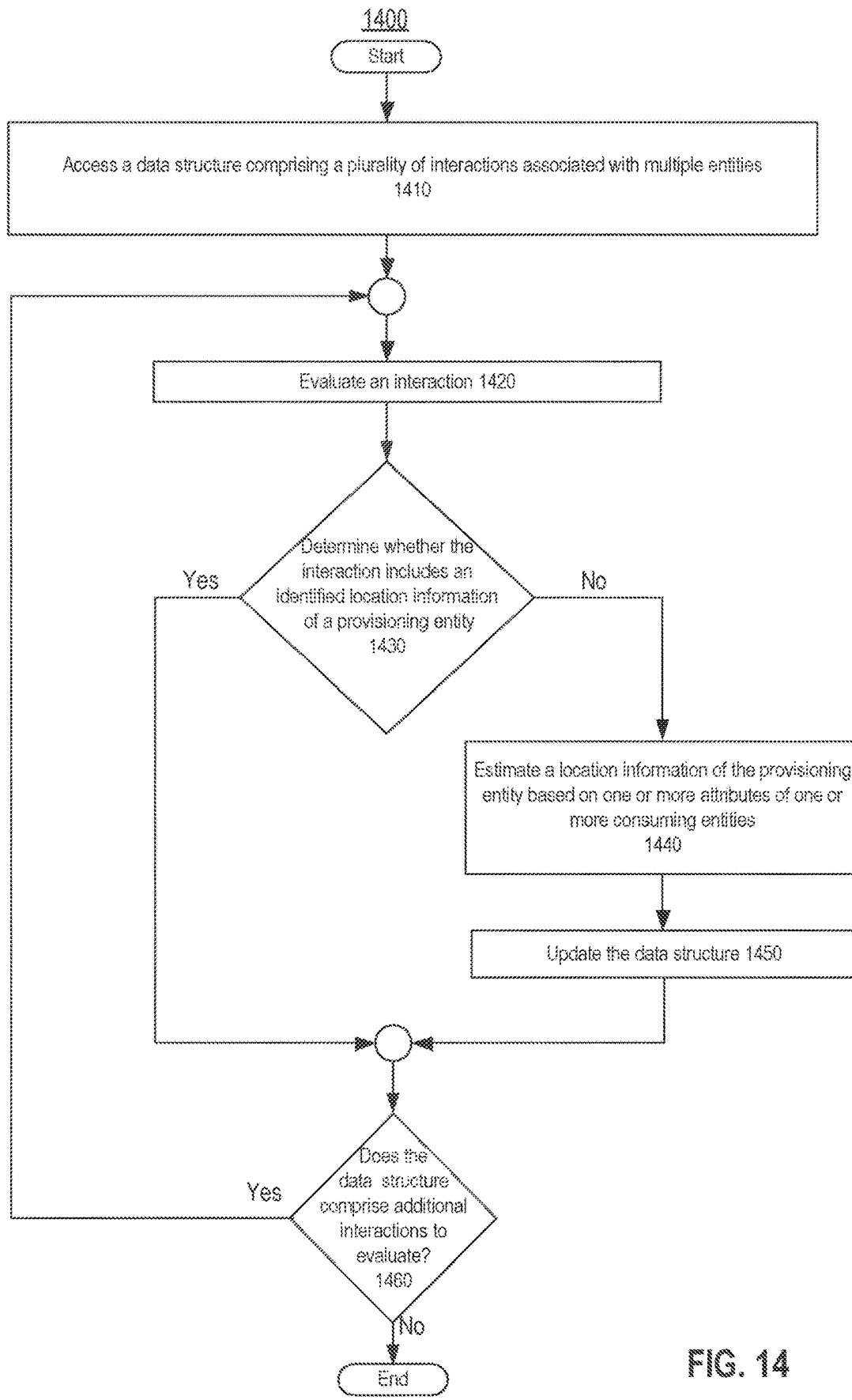
FIG. 14 is a flowchart representing an exemplary process for estimating a provisioning entity's location, consistent with the embodiments of the present disclosure.

FIG. 14 depicts a flowchart representing an exemplary process for estimating a location of a provisioning entity, consistent with embodiments of the present disclosure. While the flowchart discloses the following steps in a particular order, it will be appreciated that at least some of the steps can be moved, modified, or deleted where appropriate, consistent with the teachings of the present disclosure. Process 1400 can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1410, a data structure (e.g., data structure 400) comprising a plurality of interactions associated with multiple entities can be accessed. In some embodiments, the accessed data structure can comprise a plurality of categories of information showing interactions associated with multiple entities. The data structure can be similar to the exemplary data structure 400 described with reference to FIG. 4 above. The plurality of interactions of the data structure can include a consuming entity and a provisioning entity. Each such interaction of the data structure can include at least one attribute of the consuming entity and at least one attribute of the provisioning entity. In some embodiments, the at least one attribute of the consuming entity can include a location information of the consuming entity. For some consuming entities, the location information may not be known or identified.

Moreover, in some embodiments, the at least one attribute of the provisioning entity can include an identification information of the provisioning entity. In some embodiments, the at least one attribute of the provisioning entity can include an attribute other than an identification information of the provisioning entity.

Next, in step 1420, an interaction of the data structure can be evaluated. Next, in step 1430, a determination can be made for the interaction of the data structure as to whether the interaction includes an identified location information of the provisioning entity. In some embodiments, similar to the step 1330 of FIG. 13, the determination can include analyzing whether the categories of information associated with a location information of the provisioning entity are populated or not. If it turns out that the categories of information associated with a location information of the provisioning entity are populated, then the determination can return a positive indication to signify that the at least one attribute of the provisioning entity includes an identified location information of the provisioning entity and the process can then move to step 1460. If, on the other hand, the categories of information associated with a location information of the provisioning entity are not populated, then the determination can return a negative indication to signify that the interaction does not include a location information of the provisioning entity and the process can move to step 1440.

In some embodiments, where the categories of information associated with a location information of the provisioning entity are populated, the determination can further include verifying that the populated data is valid data that signifies a location information before the process moves to step 1460. For example, for the category of information representing zip code (e.g., zip code sub-category 456), if the populated data is 94085, it can be verified as a valid data and the process can then move to step 1460. On the other hand, if the populated data is 940850, it can be verified as an invalid data for zip code as zip codes, at least in the United States, are supposed to be only five decimal numerical digits and the process can then move to step 1440 as described below. It will be understood that other methods to determine whether the interaction includes a location information of the provisioning entity can be implemented within the scope and spirit of this disclosure.

Next, if the interaction of the data structure does not include an identified location information of the provisioning entity, step 1440 can estimate a location information of the provisioning entity based on one or more attributes of one or more consuming entities. In some embodiments, step 1440 can estimate a location information of the provisioning entity based on one or more attributes of one or more consuming entities and further based on one or more attributes of the provisioning entity. For example, the one or more attributes of the one or more consuming entities can be a location information of the one or more consuming entities and the one or more attributes of the provisioning entity can be an identification information of the provisioning entity (e.g., provisioning entity identification category 440). In some embodiments, a determination can be made based on identification information of the provisioning entity to find out whether the provisioning entity has more than one location. If the determination returns an answer in the negative, signifying that the provisioning entity only has one location, information representing such location can be identified by performing a search query over the Internet using a search engine (e.g., Google Search™).

In some embodiments, when the determination returns an answer in the positive, signifying that there is more than one location for the provisioning entity, a location information of the provisioning entity can be estimated based on at least a location information of the consuming entity and an identification information of the provisioning entity. For example, knowing a location information of the consuming entity (e.g., zip code of the consuming entity), a search query can be requested to find out a location information of the provisioning entity that is closest to the location of the consuming entity. In some embodiments, the location information returned by the search query can be an estimated location information of the provisioning entity. Alternatively, when there is more than one location for the provisioning entity, a location information of the provisioning entity can be estimated by looking at a frequency of interactions between the consuming entity and each location of the provisioning entity. For example, a provisioning entity can be the grocery store, Safeway™, which can have multiple locations in a given zip code (e.g., 94086) of the consuming entity. If the location of the Safeway™ where one or more interactions with a consuming entity occurred is unknown, interactions between the same consuming entity and all Safeway™ locations within the given zip code of the consuming entity can be analyzed such that the Safeway™ location that is involved with the most number of interactions can be selected as an estimated location of the Safeway™ for the one or more interactions. It will be understood that the above-recited estimation techniques are merely exemplary and not intended to be limiting.

Next, in step 1450, the data structure can be updated with an estimated location information of the provisioning entity. In some embodiments, data associated with only the evaluated interaction can be updated. Alternatively, data associated with all interactions associated with the consuming entity and the provisioning entity can be updated irrespective of whether those interactions were previously evaluated or not. Next, in step 1460, a determination can be made whether the data structure comprises additional interactions that are to be evaluated. If the determination returns an answer in the positive, signifying that there are additional interactions that are to be evaluated, the process can go back to step 1420 to evaluate another interaction and further to repeat the process comprising steps 1420 through 1460, as described above. On the other hand, if the determination returns an answer in the negative, signifying that there are no additional interactions that are to be evaluated, the process can end.

Figure 15:
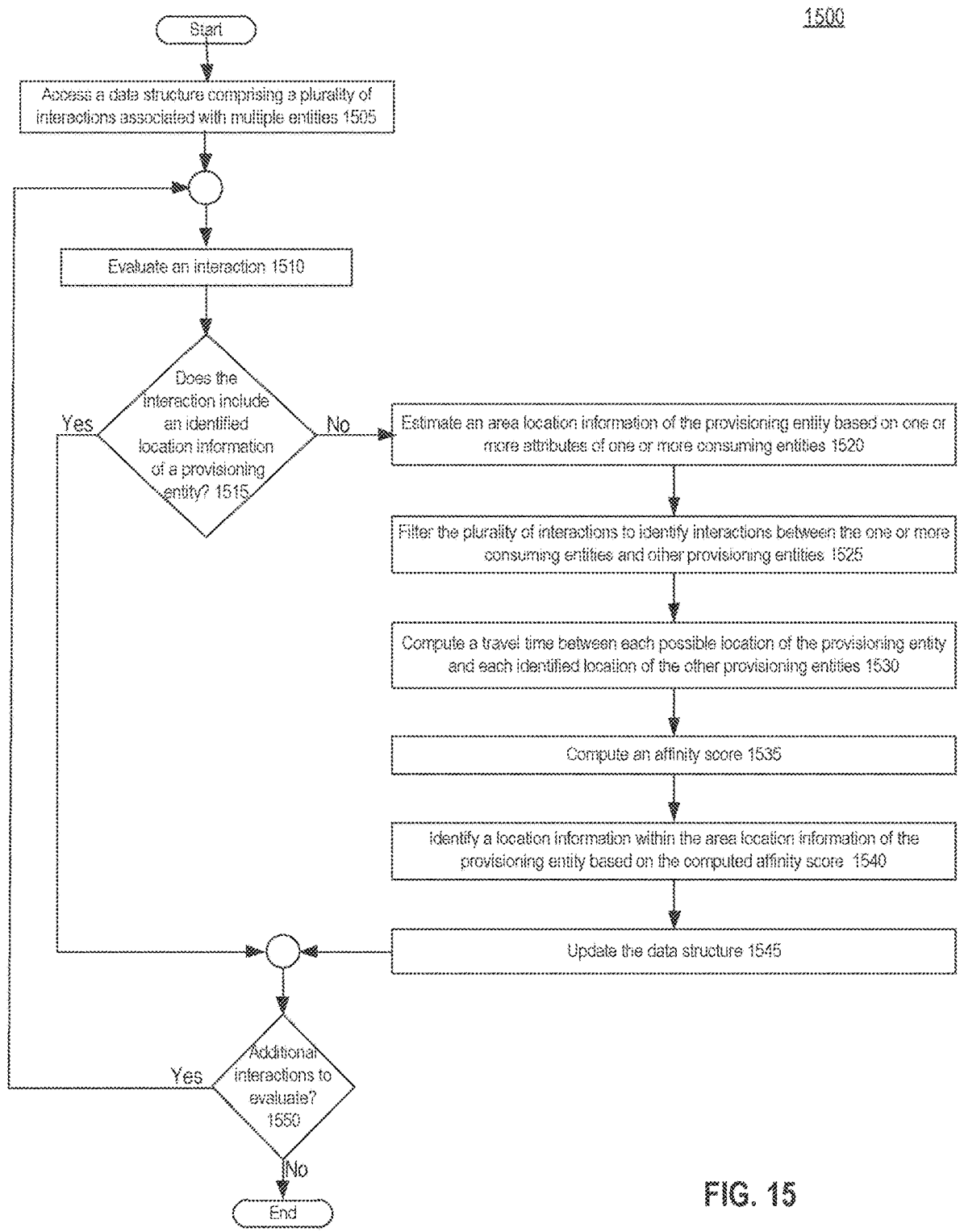
FIG. 15 is a flowchart representing an exemplary process for estimating a provisioning entity's location, consistent with the embodiments of the present disclosure.

FIG. 15 depicts a flowchart representing an exemplary process for estimating a location of a provisioning entity, consistent with embodiments of the present disclosure. While the flowchart discloses the following steps in a particular order, it will be appreciated that at least some of the steps can be moved, modified, or deleted where appropriate, consistent with the teachings of the present disclosure. Process 1500 can be performed in full or in part by a provisioning entity analysis system (e.g., provisioning entity analysis system 210). It is appreciated that some of these steps can be performed in full or in part by other systems (e.g., such as those systems identified above in FIG. 2).

The exemplary process of FIG. 15 can depict a multi-step process for estimating location information of a provisioning entity. Initially, an area location information can be estimated to represent a location information of the provisioning entity broadly. For example, an area location information for a grocery store like Safeway™ can be as broad as a state (e.g., California) or county (e.g., Santa Clara County) such that Safeway™ can comprise multiple possible locations within the area location. Later, a location information can be estimated to identify a specific location of the provisioning entity from its multiple possible locations within the area location. For example, if the area location information represents Santa Clara County comprising of ten possible Safeway™ locations, the estimated location information can represent one of the ten possible locations within Santa Clara County using either a street address or other unique identifier for the location (e.g., zip code if there is only one store location for the zip code). An exemplary multi-step process is described below.

In step 1505, a data structure (e.g., data structure 400) comprising a plurality of interactions associated with multiple entities can be accessed. In some embodiments, the accessed data structure can comprise a plurality of categories of information showing interactions associated with multiple entities. The data structure can be similar to the exemplary data structure 400 described with reference to FIG. 4 above. The plurality of interactions of the data structure can include consuming entities and provisioning entities. Each such interaction of the data structure can include at least one attribute of the consuming entity and at least one attribute of the provisioning entity. The at least one attribute of the consuming entity can include location information of the consuming entity. For some consuming entities, the location information may not be known or identified. Moreover, in some embodiments, the at least one attribute of the provisioning entity can include an identification information of the provisioning entity. Alternatively, the at least one attribute of the provisioning entity can include an attribute other than an identification information of the provisioning entity.

The provisioning entity analysis system can receive an input that can be used in a process to fill in any missing categories of information associated with an interaction. For example, the received input can be "canonical data" that can be used to estimate identification information of the provisioning entity. An exemplary canonical data can comprise data that can be received from external to the provisioning entity analysis system (e.g., Yelp™). For example, if a provisioning entity associated with an interaction is an Italian restaurant, the provisioning entity category 460 can be represented by an MCC 5812 signifying it as a restaurant but might not be able to signify that it is an Italian restaurant. In such a scenario, canonical data such as Yelp™ review information can be analyzed to further identify the provisioning entity as an Italian restaurant. Another example for applying received canonical data can be to differentiate between an entity that is no longer in business from an entity that might have changed its name. In this example, canonical data can be received from an external source (e.g., Factual™) that can comprise a "status" flag as part of its data, which can signify whether the entity is no longer in business.

Next, in step 1510, an interaction of the data structure can be evaluated. Next, in step 1515, a determination can be made for the interaction of the data structure as to whether the interaction includes an identified location information of the provisioning entity. In some embodiments, similar to the step 1430 of FIG. 14, the determination can include analyzing whether the categories of information associated with a location information of the provisioning entity are populated or not. If it turns out that the categories of information associated with a location information of the provisioning entity are populated, then the determination can return a positive indication to signify that the at least one attribute of the provisioning entity includes an identified location information of the provisioning entity and the process can then move to step 1555. If, on the other hand, the categories of information associated with a location information of the provisioning entity are not populated, then the determination can return a negative indication to signify that the interaction does not include location information of the provisioning entity and the process can move to step 1520.

In some embodiments, where the categories of information associated with location information of the provisioning entity are populated, the determination can further include verifying that the populated data is valid data that signifies a location information before the process moves to step 1555. For example, for the category of information representing zip code (e.g., zip code sub-category 456), if the populated data is 94085, it can be verified as a valid data and the process can then move to step 1555. On the other hand, if the populated data is 094085, it can be verified as an invalid data for zip code as zip codes, at least in the United States, are typically only five decimal numerical digits and the process can then move to step 1520 as described below. It will be appreciated that other methods to determine whether the interaction includes location information of the provisioning entity can be implemented within the scope and spirit of this disclosure.

Next, if the interaction of the data structure does not include identified location information of the provisioning entity, step 1520 can estimate an area location information of the provisioning entity based on one or more attributes of one or more consuming entities. In some embodiments, step 1520 can estimate the area location information of the provisioning entity based on one or more attributes of one or more consuming entities. Alternatively, step 1520 can estimate the area location information of the provisioning entity based on one or more attributes of one or more consuming entities and further based on one or more attributes of the provisioning entity. For example, the one or more attributes of the one or more consuming entities can be a location information of the one or more consuming entities and the one or more attributes of the provisioning entity can be an identification information of the provisioning entity (e.g., provisioning entity identification category 440). Alternatively, a determination can be made based on identification information of the provisioning entity to find out whether the provisioning entity has more than one location. If the determination returns an answer in the negative, signifying that the provisioning entity only has one location, information representing such location can be identified by performing a search query over the Internet using a search engine (e.g., Google Search™) and such information can be identified as an estimated first location information of the provisioning entity.

In some embodiments, when the determination returns an answer in the positive, signifying that there is more than one possible location for the provisioning entity, an area location information of the provisioning entity can be estimated based on at least a location information of the consuming entity and an identification information of the provisioning entity. For example, knowing a location information of the consuming entity (e.g., zip code of the consuming entity), a search query can be requested to find out the area location information of the provisioning entity that is within a predetermined distance (e.g., within the same zip code) to the location of the consuming entity. The location information returned by the search query can be an estimated first location information of the provisioning entity.

Next, in step 1525, the plurality of interactions can be filtered to identify other interactions (e.g., interactions other than the first interaction) between the one or more consuming entities and other provisioning entities (i.e., provisioning entities other than the provisioning entity associated with the interaction and with an unidentified location). For example, step 1525 can filter other interactions such that interactions without an indication of location information associated with the other provisioning entities need not be analyzed. In some embodiments, the filtered interactions can be analyzed to filter provisioning entities based on a received canonical input data. For example, if the received canonical input data comprises an identification information that might be missing in data structure 400, the system can filter the interactions further to only analyze those interactions associated with provisioning entities with an identification information that meet the criteria set by the received canonical data. It will be appreciated that other forms of canonical data can be received within the scope of this disclosure.

Figure 16A:
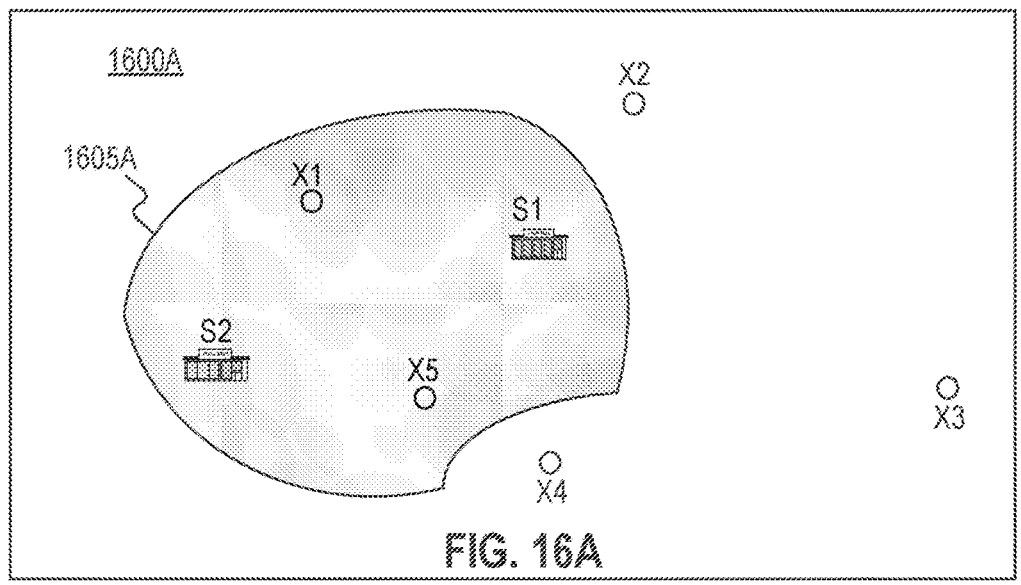
FIGS. 16A, 16B, and 16C are block diagrams representing a method of computing travel times between two provisioning entities, consistent with the embodiments of the present disclosure.

Next, in step 1530, a travel time can be computed between a location of a first provisioning entity to that of a location of a second provisioning entity. In some embodiments, the first provisioning entity can be the provisioning entity with an estimated area location and the second provisioning entity can be any provisioning entity other than the first provisioning entity. For each interaction of step 1510 and its associated consuming entity, the second provisioning entity can be any provisioning entity other than the first provisioning entity that is associated with other interactions of the consuming entity. Step 1530 can be explained with the block diagrams of FIGS. 16A, 16B, and 16C, which depicts two provisioning entities, S1 and S2, five interactions, X1-X5, and exemplary travel times (e.g., $T_{S1-X1}$). Provisioning entities S1 and S2 can be two different locations within a chain of stores associated with the same provisioning entity and situated within an area location information estimated in step 1520. For example, S1 and S2 can be two different locations of Safeway™ situated within an estimated area location (e.g., zip code 94086). The area location information can be depicted with a shaded region and labeled as element 1605A in FIGS. 16A, 16B, and 16C. As shown in FIG. 16A, the five interactions, X1-X5, can represent interactions between the consuming entity associated with the interaction of step 1510 and a provisioning entity other than S1 or S2. While FIGS. 16A, 16B, and 16C, depict locations of two provisioning entities and locations of five interactions, it will be appreciated that this disclosure is applicable to embodiments involving any number of provisioning entities and any number of interactions.

Figure 16B:
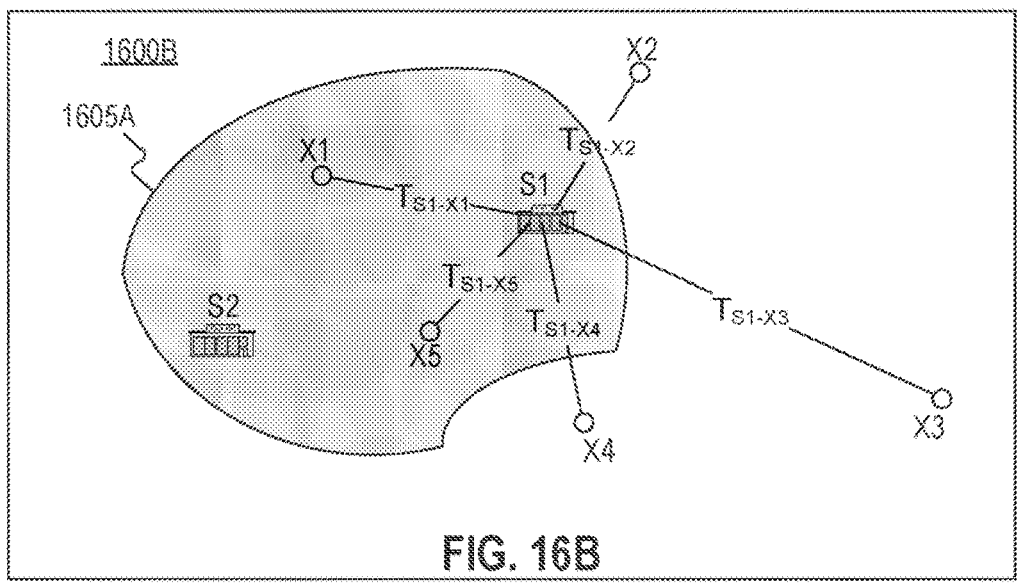

FIG. 16B depicts travel times between the Safeway™ location, S1, and a provisioning entity involved in each of the interactions, X1-X5. While the travel times are illustrated as aerial travel times, it is appreciated that the travel times can take into consideration roads, sidewalks, bike lanes, etc. For example, travel time between the location S1 and location of provisioning entity involved in interaction X1, can be represented by the line $T_{S1-X1}$. Travel time $T_{S1-X1}$ can be computed using real-time traffic conditions or based on historical traffic conditions. Similarly, travel times can be computed between S1 and each location of provisioning entities associated with interactions X2 through X5. Such travel times can be labeled as $T_{S1-X2}$ through $T_{S1-X5}$, as depicted in FIG. 16B.

Figure 16C:
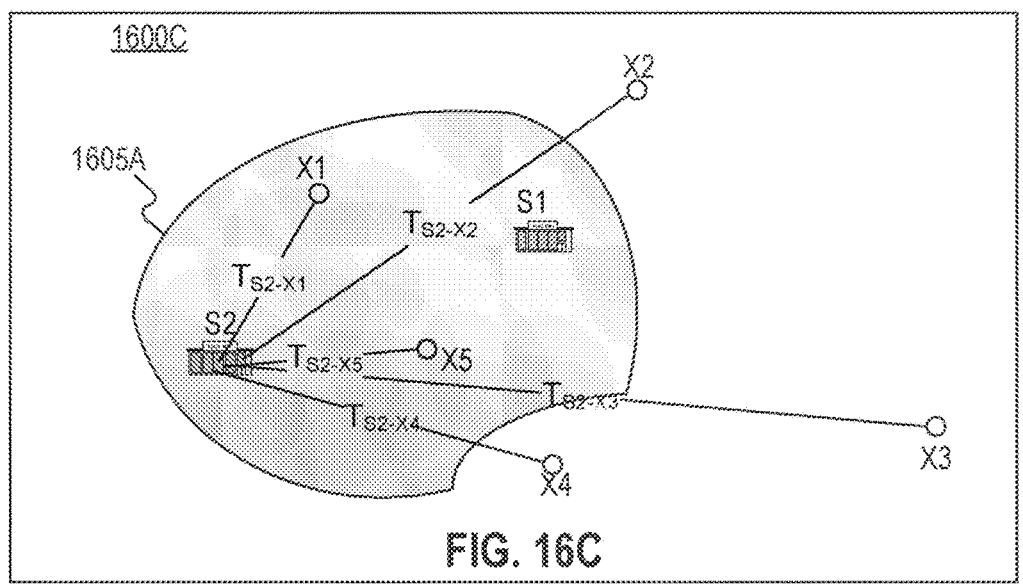

FIG. 16C depicts travel times between the other possible Safeway™ location, S2, and a provisioning entity involved in each of the interactions, X1-X5. This process can be very similar to that of FIG. 16B described above. For example, travel time between the location S2 and location of provisioning entity involved in interaction X1, can be represented by the line $T_{S2-X1}$. Travel time $T_{S2-X1}$ can be computed using real-time traffic conditions or based on historical traffic conditions. Similarly, travel times can be computed between S2 and each location of provisioning entities associated with interactions X2 through X5. Such travel times can be labeled as $T_{S2-X2}$ through $T_{S2-X5}$, as depicted in FIG. 16C.

Next, referring back to FIG. 15, in step 1535, an affinity score can be computed. In some embodiments, an affinity score can be computed for each possible location of the provisioning entity within the estimated area location. The computed affinity score can be based on the computed travel times such that the affinity score can have an inverse proportionality with computed travel times such that the lower the travel time the higher an affinity score. For example, based on the exemplary travel times depicted in FIGS. 16A, 16B, and 16C, it is possible that the affinity score associated with location S1 is likely higher than that of location S2 because travel times associated with S1 are lower than that of S2. Affinity score can be computed based on an average travel time for all interactions. Alternatively, affinity score can be computed by aggregating travel times of all interactions for each location S1 and S2. It will be appreciated that the above-described methods are merely exemplary and other methods of computing an affinity score based on travel times are possible within the scope of this disclosure. Alternatively, the computed affinity score can be normalized (e.g., can be normalized to comprise a value between 0 and 1, with 0 representing no affinity and 1 representing maximum possible affinity). Moreover, while the affinity score can have an inverse relationship with the computed travel times, it is appreciated that the affinity score can have a proportional relationship to the computed travel times.

Next, in step 1540, the computed affinity score can be used to estimate a location information within the estimated area location for the provisioning entity without an identified location information. For example, a location can be estimated by selecting the location which has the highest affinity score amongst all possible locations within the area location. That is, in the exemplary embodiment of FIG. 16, location S1 can be selected as the affinity score associated with location S1 is likely higher than that of location S2, as described above. It will be appreciated that other methods of estimating a second location information based on an affinity score are possible. Alternatively, the computed affinity score can be used in conjunction with an algorithm to estimate a second location information within the area location information.

In some embodiments, when there is more than one possible location for the provisioning entity without an identified location information, a location information within the area location of the provisioning entity can be estimated by analyzing interactions between the consuming entity and other provisioning entities within the location of the consuming entity (e.g., zip code of the consuming entity) that are closely spaced in time relative to the interaction that does not include an identified location information of the provisioning entity. For example, a first interaction that does not include an identified location information of the provisioning entity can include a timestamp (e.g., time of interaction category 480) associated with the first interaction. To estimate a location information for the provisioning entity associated with the first interaction, the system can analyze other interactions (e.g., interactions other than the first interaction) associated with the consuming entity that occurred within the same location of the consuming entity (e.g., zip code of the consuming entity), occurred within a short time interval of the timestamp of the first interaction (e.g., within 10 minutes of the timestamp), and which further include an identified location information for the provisioning entities associated with the other interactions.

Alternatively, when there is more than one possible location for the provisioning entity, a location information within the area location of the provisioning entity can be estimated by looking at a frequency of interactions between the consuming entity and each possible location of the provisioning entity. For example, a provisioning entity can be the grocery store, Safeway™, which can have multiple locations in a given city (e.g., Sunnyvale Calif.) of the consuming entity. Interactions between the consuming entity and all Safeway™ locations within the given city of the consuming entity can be analyzed such that the Safeway™ location that is involved with the most number of interactions can be selected as an estimated location within the area location of the Safeway™ for the one or more interactions. It will be understood that the above-recited estimation techniques are merely exemplary and not intended to be limiting.

Next, an accuracy check of the estimated location information within the area location can be performed. In some embodiments, the accuracy check can comprise verification that the estimated location information is one of the possible locations within the estimated area location of the provisioning entity. Alternatively, the accuracy check can comprise verification that the estimated location information is a valid location information. For example, if the estimated location information is a street address, then the accuracy check can involve verifying that the estimated street address is a valid street address based on an Internet-based search using a search engine (e.g., Google Search™).

Next, in step 1545, the data structure can be updated with an estimated location information of the provisioning entity. In some embodiments, the data structure can be updated with either an estimated area location information or an estimated location within the area location information. Alternatively, the data structure can be updated with both the estimated area location information and the estimated location information within the area location. In some embodiments, data associated with only the evaluated interaction can be updated. Alternatively, data associated with all interactions associated with the consuming entity and the provisioning entity can be updated irrespective of whether those interactions were previously evaluated or not. Next, in step 1550, a determination can be made whether the data structure comprises additional interactions that are to be evaluated. If the determination returns an answer in the positive, signifying that there are additional interactions that are to be evaluated, the process can go back to step 1510 to evaluate another interaction and further to repeat the process comprising steps 1510 through 1550, as described above. On the other hand, if the determination returns an answer in the negative, signifying that there are no additional interactions that are to be evaluated, the process can end.

In some embodiments, a provisioning entity analysis system can predict a purchasing pattern of consuming entities. For example, a provisioning entity (e.g., a large national retailer in the grocery business like Safeway™) can be interested in predicting purchasing patterns of consuming entities in order to make decision such as opening new stores or closing existing stores. One method of predicting purchasing patterns can be to analyze interactions of consuming entities with the provisioning entity. For example, if Safeway™ is interested in opening new store by predicting purchasing patterns of their customers of an existing location, the customer interactions at the existing location can be analyzed to understand where the customers are located by processing location information of the customers. Based on the processed location information of the customers of the existing location, Safeway™ might be able to make a decision on a location for their new location.

Another method of predicting purchasing patterns can be to analyze interactions between the consuming entities and other provisioning entities, where the other provisioning entities can be either a competitor of or complementary to the provisioning entity. For example, if Safeway™ is interested in opening new store by predicting purchasing patterns of their customers of an existing location, interactions of the customers of the existing locations that are associated with a competitive entity or a complementary entity can be analyzed. An exemplary complementary entity can be a gas station or a pharmacy because it can be reasonable to assume that consumers frequently shop at a pharmacy or a gas station that is close to their residential location. Accordingly, by analyzing interactions that are associated with a complementary entity to estimate a residential location information of consumers, Safeway™ can make a decision on a location for their new location.

Figure 17:
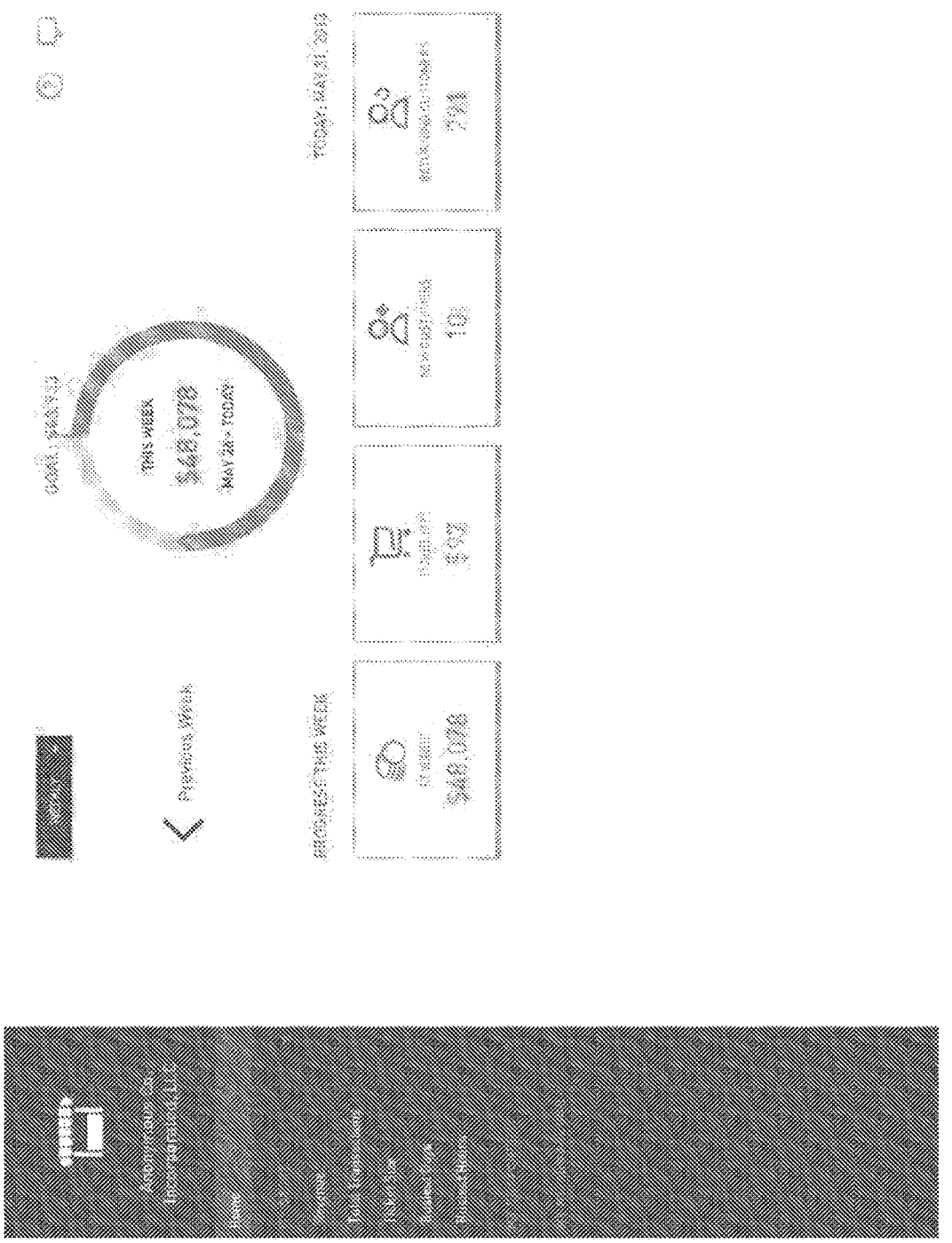
FIGS. 17-26 are screenshots of exemplary user interfaces, consistent with the embodiments of the present disclosure.

FIGS. 17-26 are screenshots of exemplary user interfaces, consistent with the embodiments of the present disclosure. These user interfaces can be provided based on an analysis of a data structure (e.g., data structure 400 of FIG. 4) performed by a provisioning entity analysis system (e.g., provisioning entity analysis system 210). FIG. 17 illustrates an exemplary user interface 1700 that a provisioning entity analysis system (e.g., provisioning entity analysis system 210) can generate, according to some embodiments. In some embodiments, the exemplary user interface includes a dashboard, e.g a small business portal dashboard (SBP) dashboard, that can depict a performance of an entity over a metric. For example, the SBP dashboard represents revenue information of the entity (e.g., a provisioning entity) for the current week (May 26, 2013-Jun. 2, 2013). In some embodiments, the SBP dashboard represents revenue information comparing the entity's actual revenue to the entity's goal revenue for the week. For example, the provisioning entity can enter a goal revenue for a period of time (e.g., weekly, quarterly, or yearly). After receiving information regarding the expected revenue, the provisioning entity analysis system can analyze interaction data to analyze the entity's performance relative to the goal revenue. An outcome of such comparative analysis can be represented with an exemplary bar graph or pie chart. For example, the middle portion of FIG. 17 depicts that the entity has received $48,078 in revenues for the current week, and the entity's goal revenue for that week is $63,933.

In some embodiments, user interface 1700 can include a plurality of user interface elements representing information associated with entity performance metrics such as revenue, ticket size, new customers, and returning customers. For example, as shown in FIG. 17, each of the above-described user interface elements can be depicted as a rectangular box with an icon and some information representing the performance metric of the entity. The entity can customize what metrics are displayed and how those metrics are displayed. The user interface elements, when clicked on, can provide access to other user interfaces, depicting additional information for the selected performance metric.

User interface 1700 can include a sidebar with expandable labels depicting, for example, "My Store," "My Customers," and "My Neighborhood." Each of these labels can provide access to additional user interfaces that depict additional information for these metrics. For example, clicking on the "My Store" label can expand the label to show submenus corresponding to "Revenue," "Total Transactions," "Ticket Size," "Busiest Days," and "Busiest Hours." Each of these submenus can provide access to another user interface, providing additional information for each category.

Figure 18:
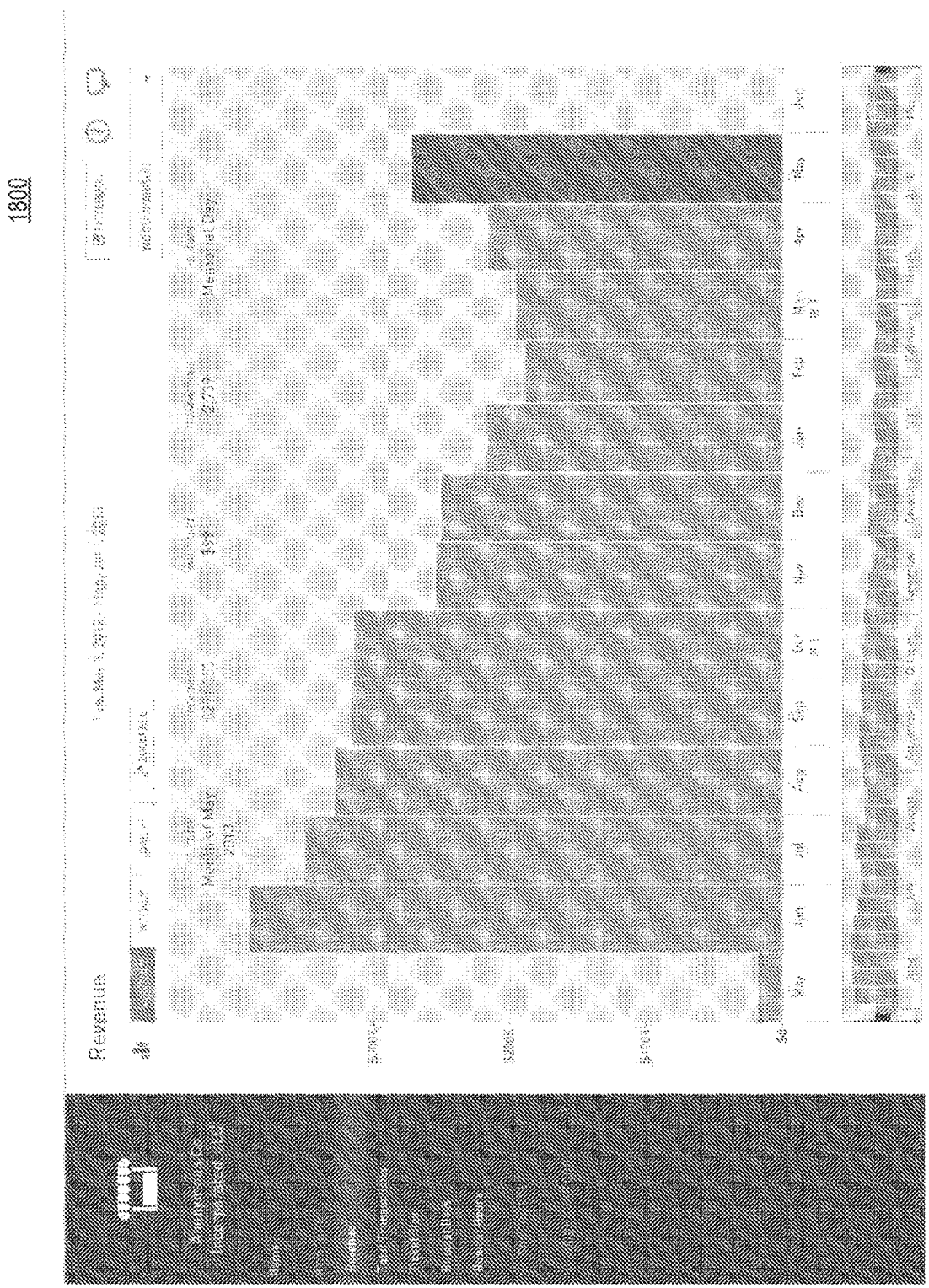

FIG. 18 shows a screenshot of an exemplary user interface 1800 that represents revenue depicted temporally, consistent with some embodiments. A provisioning entity analysis system (e.g., provisioning entity analysis system 210) can generate exemplary user interface 1800. User interface 1800, for example, can be accessed by an entity selecting "Revenue" in the sidebar (e.g., "Revenue" submenu of user interface 1700 of FIG. 17). User interface 1800 can represent revenue information in a chart, such as the bar chart shown in the top panel of FIG. 18. In some embodiments, each bar in the bar chart can represent revenues for a period of time (e.g., a day, week, month, quarter, or year). The granularity or time period for each bar based on the selection of the "Monthly," "Weekly," and "Daily" boxes in the top left portion of the bar chart.

In some embodiments, user interface 1800 allows an entity to select a particular bar or time period of interest. For example, the entity can select the "May" bar. To indicate that "May" has been selected, user interface 1800 can display that month in a different color. In some embodiments, user interface 1800 can also display additional information for the selected bar. For example, as shown in FIG. 18, user interface 1800 can display the month selected, the revenue for that month, the average ticket size, the number of transactions, and the names of holidays in that month, if any. In some embodiments, user interface 1800 can depict comparisons of revenue information. For example, user interface 1800 can display additional lines or bars (not shown), which represent revenue competitor revenue, industry revenue, or entity revenue from another time period. In some embodiments, user interface 1800 can include a bottom panel depicting a bar chart of revenue for a longer period of time, such as the past twelve months. User interface 1800 can highlight the region currently depicted in the top panel by changing the color of the corresponding bars in the bottom panel. In some embodiments, user interface 1800 can allow an entity to drag the highlighted region on the bottom panel to depict a different time period in the top panel.

User interface 1800 can also allow an entity to access additional user interfaces by selecting, for example, the "Total Transactions," "Ticket Size," "Busiest Days," or "Busiest Hours" submenus in the sidebar. In some embodiments, these user interfaces (not shown) can display information in the same manner as user interface 1800. For example, a user interface for "Total Transaction" can represent transaction information in a chart, such as a bar chart shown in the top panel of FIG. 18. In this user interface, the bars in the bar chart can represent the total number of transactions for a period time (e.g., one month). User interfaces accessed through the "Ticket Size," "Busiest Days," and "Busiest Hours" can display information similarly. In some embodiments, the bars in these user interfaces can represent a percentage for a period time (e.g., 15% of sales occur on Tuesday).

Figure 19:
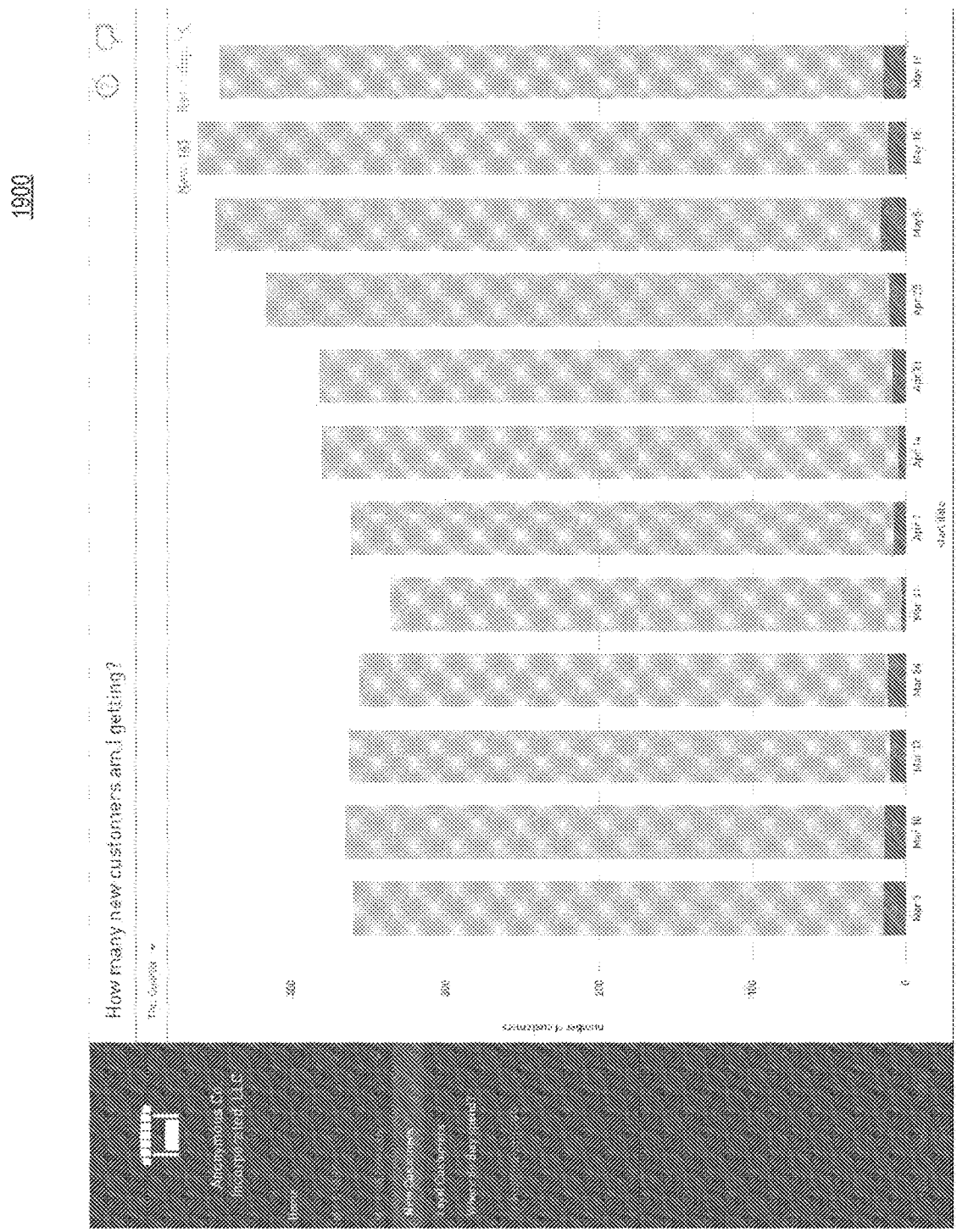

FIG. 19 depicts a screenshot of an exemplary user interface representing new customer acquisition numbers over a selected period, consistent with some embodiments. A provisioning entity analysis system (e.g., provisioning entity analysis system 210) can generate exemplary user interface 1900. In some embodiments, user interface 1900 is accessible by expanding "My Customers" in the sidebar and selecting the "New Customers" submenu. User interface 1900 can depict customer metrics for a selected period of time. For example, user interface 1900 can display customer metrics for a selected quarter. User interface 1900 can use, for example, a bar graph to represent the customer metrics wherein each bar represents the number of customers for a subset period of time, (e.g., a week) within the longer period of time (e.g., a quarter).

User interface 1900 can also depict new customers in one color and returning customers in a different color to distinguish between the different types of customers. As an example, in FIG. 19, returning customers are represented by the upper, lighter portions of the bar, whereas new customers are represented by the lower, darker portions. In some embodiments, user interface 1900 can depict the total number of new customers and returning customers for a selected time period, as shown in the top right portion of user interface 1900. User interface 1900 can also allow an entity to access additional user interfaces (such as user interface 2000 and user interface 2100 described below) by selecting, for example, the "Loyal Customers" or "Where do they spend?" submenus.

Figure 20:
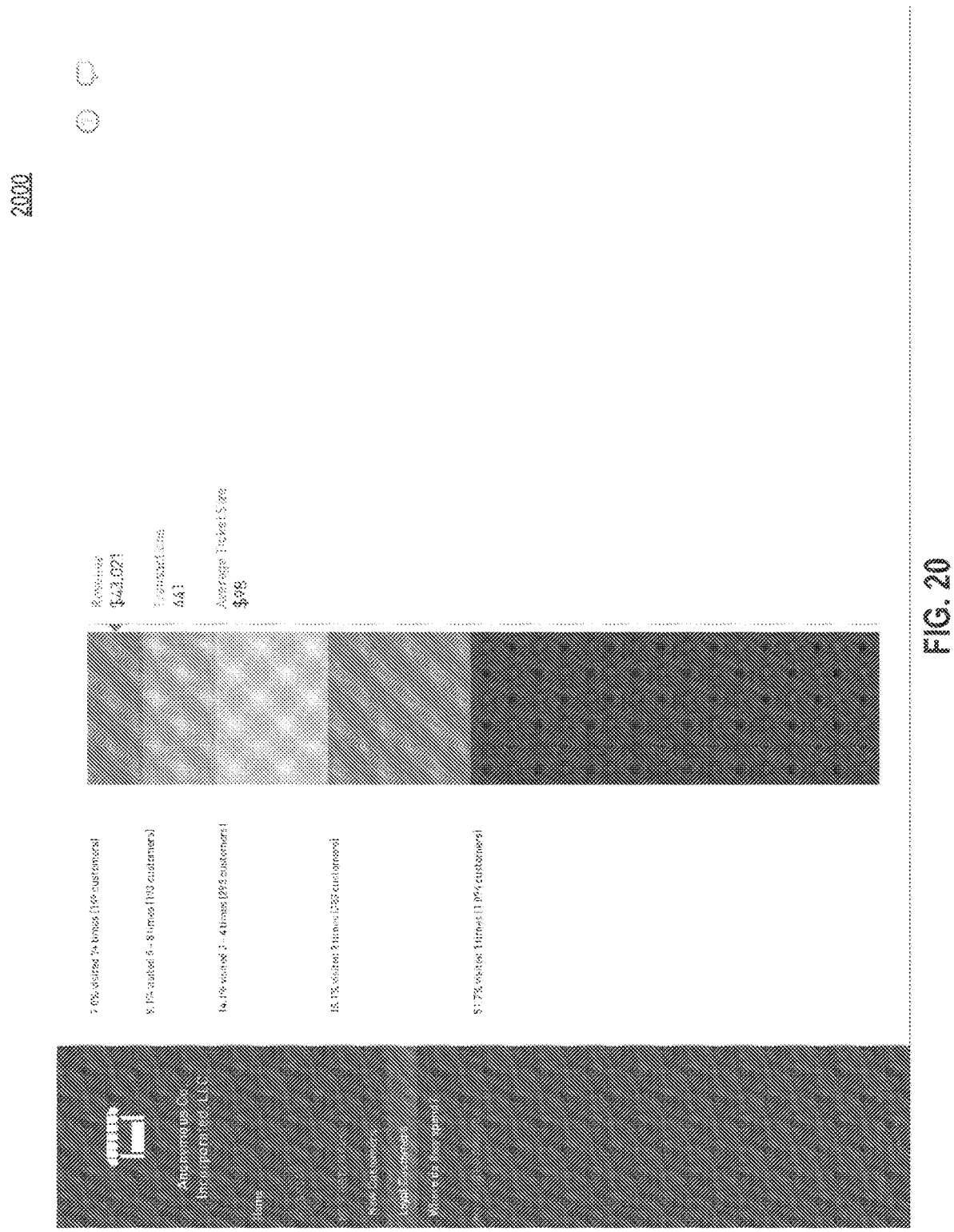

FIG. 20 depicts a screenshot of an exemplary user interface 2000 representing loyal customer information, consistent with some embodiments. A provisioning entity analysis system (e.g., provisioning entity analysis system 210) can generate exemplary user interface 2000 In some embodiments, user interface 2000 can be accessed based on the selection of the "Loyal Customers" submenu in the sidebar. User interface 2000 can depict performance metrics relating to revenue from returning customers. In some embodiments, user interface 2000 represents this information as a stacked bar graph. A section of the stacked graph can represent the number of customers who visited an entity a certain number of times. For example, the bottom section of the stacked bar chart depicted in FIG. 20 can represent the number of customers who visited once. In some embodiments, a section of the stacked graph can represent the number of customers whose visits fall within a range of times, (e.g., "3-4 times" or "9+ times"). User interface 2000 can depict each section as a percentage (e.g. 7.0% of customers), as a number (e.g. 149 customers), or as a combination thereof (e.g., 149 customers, 7.0%).

In some embodiments, user interface 2000 can depict additional information for a section selected by the entity. For example, the entity can select the "9+ times" section at the top of the stacked bar graph in FIG. 20 to display additional information about those customers. This information can include the total revenue from those customers, the total number of transactions with those customers, and the average ticket size of those customers.

Figure 21:
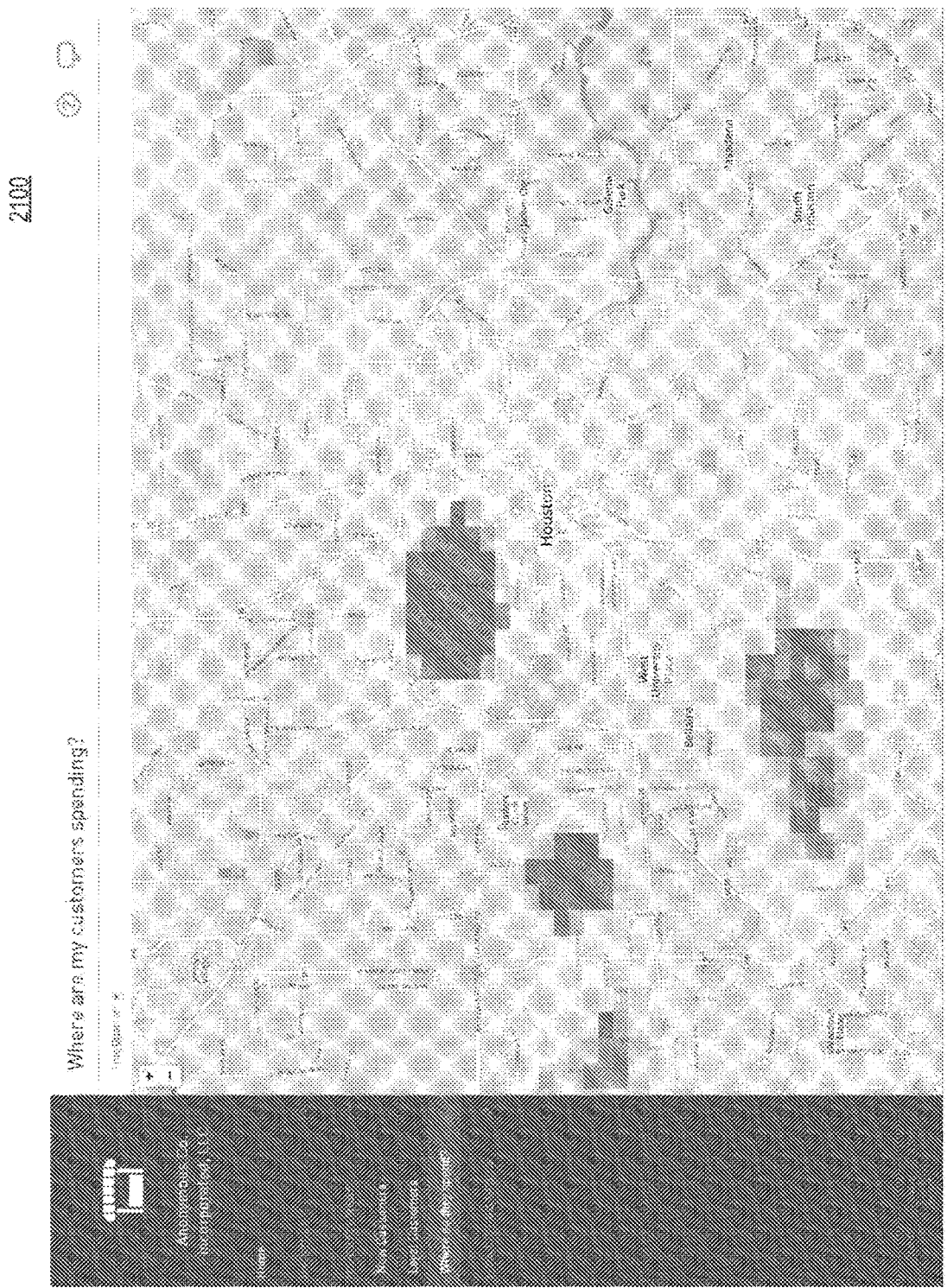

FIG. 21 depicts a screenshot of an exemplary user interface 2100 representing customer spending habits for specific geographic regions. A provisioning entity analysis system (e.g., provisioning entity analysis system 210) can generate exemplary user interface 2100. In some embodiments, user interface 2100 can be accessed based on the selection of the "Where do they spend" submenu in the sidebar. User interface 2100 can depict a geographic region. User interface 2100 can also depict locations where customers spend overlaid on the geographic region, e.g. a heat map. For example, the shaded regions overlaid on the geographic region in FIG. 21 can depict the regions where customers spend.

Different shades of gray-scale can be used to show different amounts of spending (e.g., darker shaded regions can depict regions where customers spend more). Alternatively, a color coded heat-map can be used where different colors can be used to show different amounts of spending. In some embodiments, the geographic granularity (e.g., district, city, county, metropolitan area, state) of user interface 2100 is selectable. User interface 2100 can also depict spending habits for the geographic region for different temporal periods. For example, user interface 2100 can depict customer spending for the current month, quarter, previous quarter, or any other time period.

Figure 22:
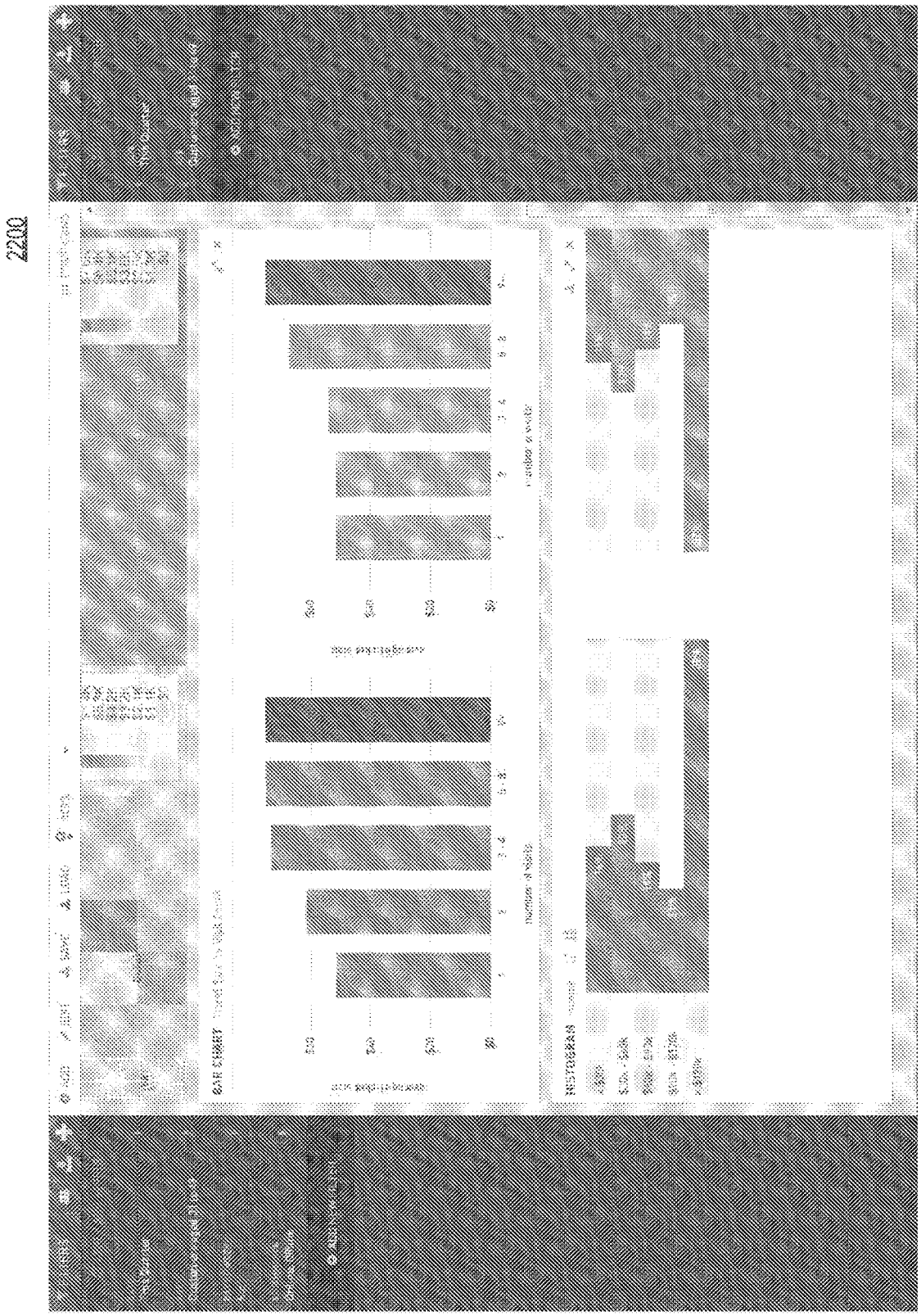

FIG. 22 depicts a screenshot of an exemplary user interface 2200 representing entity performance using one or more filter selections including demographics, geographic location, time period, and transactions. A provisioning entity analysis system (e.g., provisioning entity analysis system 210) can generate exemplary user interface 2200. In some embodiments, an entity can utilize user interface 2200 to compare how different variables (e.g., time, demographics, location, etc.) affect entity performance metrics (e.g., revenues, ticket size, etc.). In some embodiments, user interface 2200 can depict entity performance using a bar chart or histograms. For example, the bar charts in the middle of FIG. 22 depict the average ticket size based on the number of times a customer visits. The bar chart on the left side of FIG. 22 depicts this information for the current quarter, for customers aged 31 to 49, for sales on Saturday, whereas the bar chart on the right depicts the same information for the current quarter, for customers, aged 31 to 49, for every day of the week. User interface 220 allows an entity to use these bar charts to determine the effect the day of the week has on the number of tickets and the average ticket size.

In some embodiments, user interface 2200 can depict additional customer information, such as income, as a histogram. As shown in FIG. 22, the histogram can represent customer demographics for the selected filters. In some embodiments, user interface 220 can depict a delta (not shown in FIG. 22) representing a difference between similar categories in each histogram. The depiction of the delta can be in the area between the left and right histograms such as shown in U.S. application Ser. No. 14/289,596 at FIG. 17, the depiction of which is incorporated by reference. For example, if 16% of the entity's customers had an income less than $30,000 for the first filter selections, and only 11% had an income less than $30,000 for the second filter selections, user interface 2200 can display a 5% delta to the left, representing the difference between the filter selections.

Figure 23:
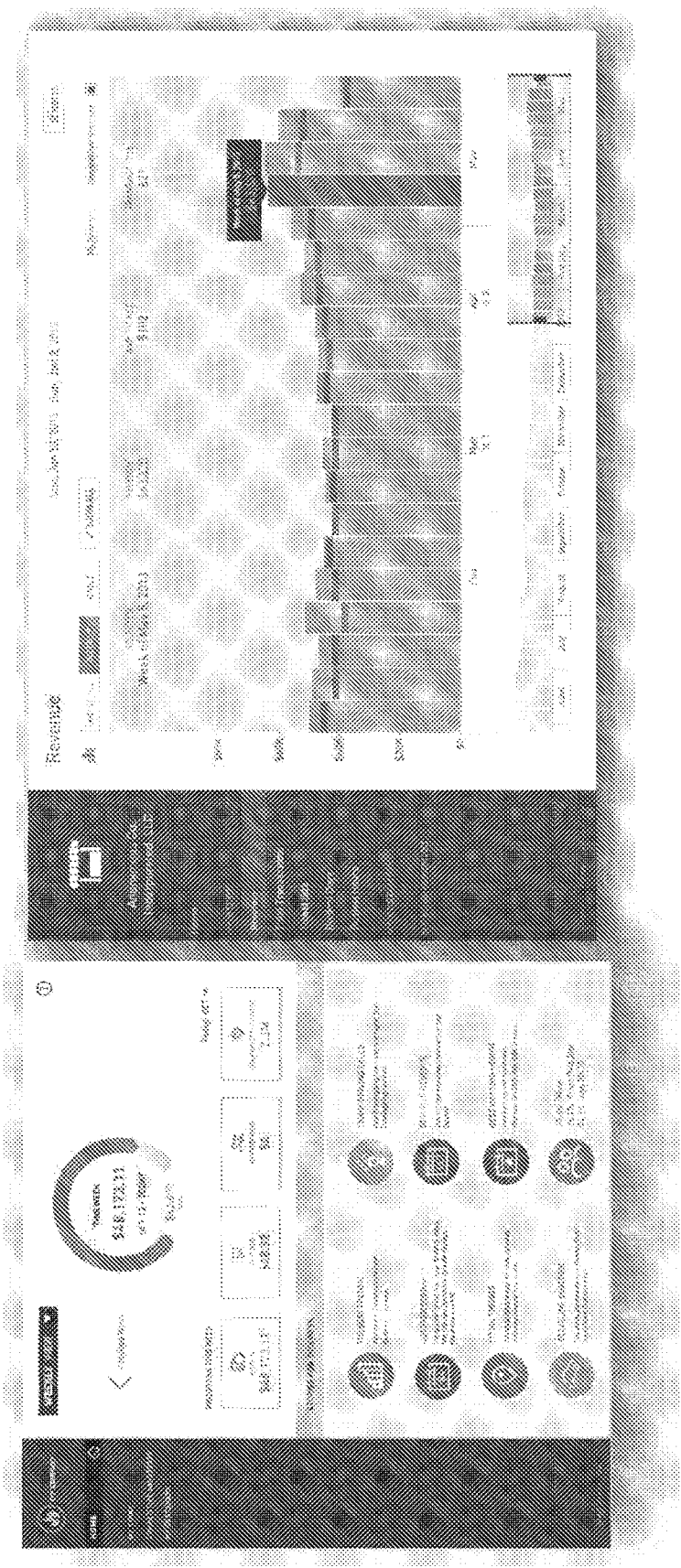

FIG. 23 depicts a screenshot of an two exemplary user interfaces. A provisioning entity analysis system (e.g., provisioning entity analysis system 210) can generate these exemplary user interfaces. The left panel of FIG. 23 shows a user interface that can depict business insights for the entity (e.g., what customers buy, where they buy, when they buy, how often they buy, where they live, how much they make, etc.). For example, user interface 2300 can depict insights such as temporal trends, temporal summaries, geographical trends, whether customers are on vacation, and customer demographics. An entity can use these insights to predict future spending, to target specific customers, to determine when to have sales, to determine when to order additional inventory, etc. The right panel of FIG. 23 shows a user interface that can depict an exemplary temporal graph of revenues. This bar chart is similar to the bar chart described above with respect to FIG. 18. In some embodiments, the user interface in the right panel can allow an entity to compare its revenues to other entities. For example, the lines on each bar in the right panel of FIG. 23 represent competitor revenue for the selected time period. In some embodiments, these lines can represent industry revenue or entity revenue from another time period. In some embodiments, the user interface shown in the right panel of FIG. 23 can include a bottom panel depicting a bar chart of revenue for a longer period of time, such as the past twelve months. The user interface can highlight the region currently depicted in the top panel by changing the color of the corresponding bars in the bottom panel. In some embodiments, the user interface allows an entity to drag the highlighted region on the bottom panel to depict a different time period in the top panel.

Figure 24:
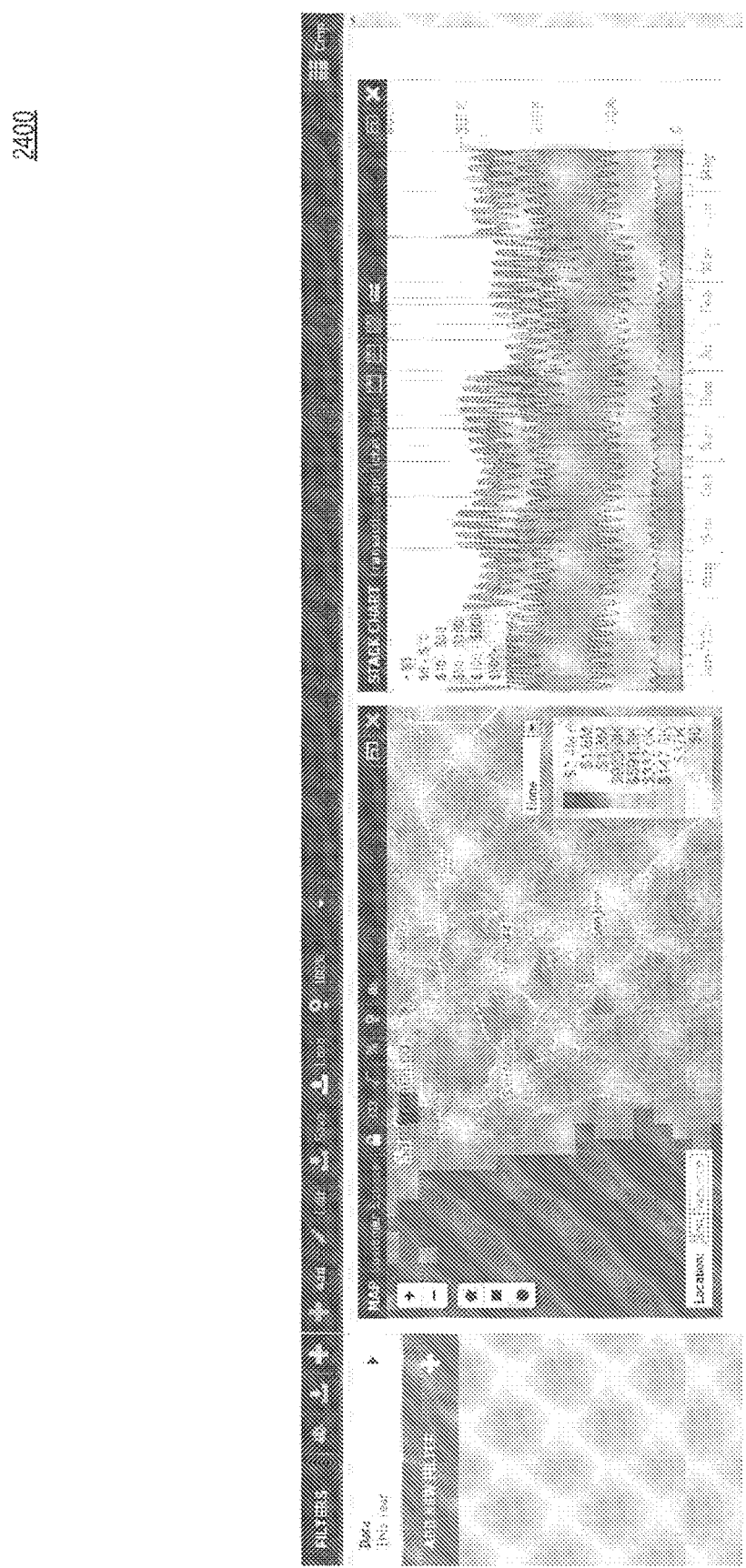

FIG. 24 depicts a screenshot of an exemplary user interface 2400 including a heat-map representation (e.g., the left panel) and graph-based representation (e.g., the right panel) of entity performance. A provisioning entity analysis system (e.g., provisioning entity analysis system 210) can generate exemplary user interface 2400. In some embodiments, the entity can select one or more filters (e.g. "Add New Filter" shown in the sidebar) to display a timeline of customer. For example, user interface 2400 can represent customer spending on a daily basis. In some embodiments, user interface 2400 can represent customer spending with a heat map, such as the heat map shown in the left panel of FIG. 24. The heat map can be used to accurately predict the geographic locations of future customer spending. In some embodiments, customer spending can be represented as a graph-based representation where the independent axis (e.g., x-axis) can represent a period of time and the dependent axis can represent customer spending, as depicted in the right panel of FIG. 24. In some embodiments, the graph-based representation can be used as a predictive chart to predict future customer spending.

Figure 25:
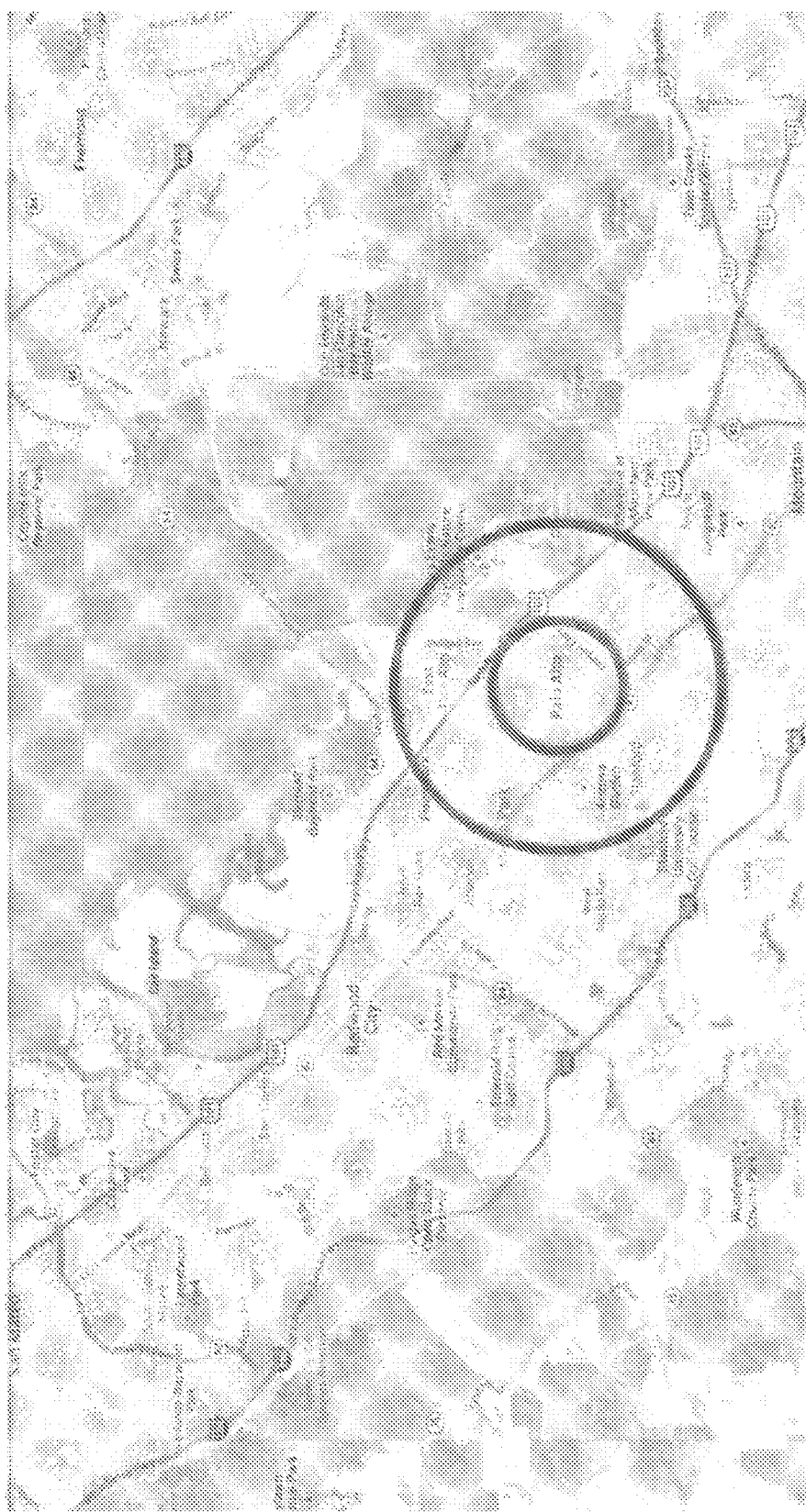

FIG. 25 depicts a screenshot of an exemplary user interface 2500 representing inferred customer location. A provisioning entity analysis system (e.g., provisioning entity analysis system 210) can generate exemplary user interface 2500. In some embodiments, user interface 2500 can represent customer location inferred from persistent information (e.g., the centroid of the customer's medical transactions or the median of the customer's retail food and pharmacy stores transactions). In some embodiments, user interface 2500 can represent customer location inferred from contextual information (e.g. localized small-ticket spending in severe weather or spending after an inferred move). In some embodiments, user interface 2500 can represent temporal customer location (e.g., permanent, temporary, seasonal, etc.).

In some embodiments, customer location can be represented by a circle of a particular distance, wherein the provisioning entity analysis system infers that the customer is located within that circle. For example, in FIG. 25, the inner circle represents a two mile range and the outer circle represents a five mile range. In some embodiments, user interface 2500 can depict a confidence metric corresponding to the accuracy of inferred customer location (e.g., 75-80% confident that the customer is within the inner circle and 90-95% confident that the customer is located in the outer circle).

Figure 26:
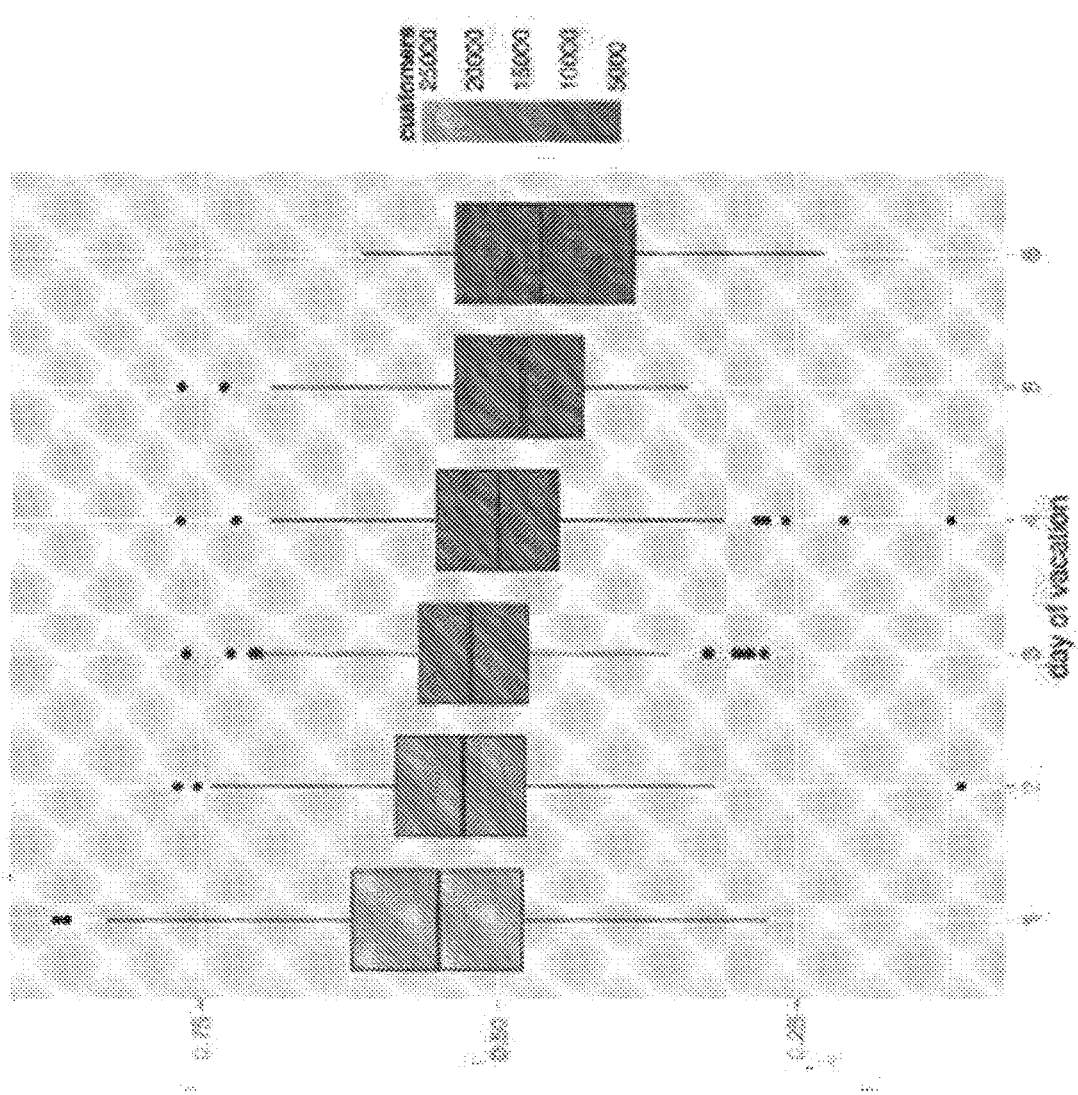

FIG. 26 depicts a screenshot of an exemplary user interface 2600 representing predictive travel and vacation spending. Entities, such as resorts and travel destinations, can use this information to predict vacation patterns, enabling them to develop targeted marketing and to inform future restaurant and service selection. A provisioning entity analysis system (e.g., provisioning entity analysis system 210) can generate exemplary user interface 2600. The provisioning entity analysis system can use the inferred customer locations described above to determine whether certain transactions qualify as travel or vacation spending. In some embodiments, user interface 2600 can depict travel or vacation spending as a chart. For example, as shown in FIG. 26, user interface 2600 can represent this information as a scatter chart with confidence intervals. The independent axis (e.g., x-axis) of the chart can represent the day of vacation. The dependent axis can represent the average range of percentage of travel spending that is spent on restaurants.

Figure 27:
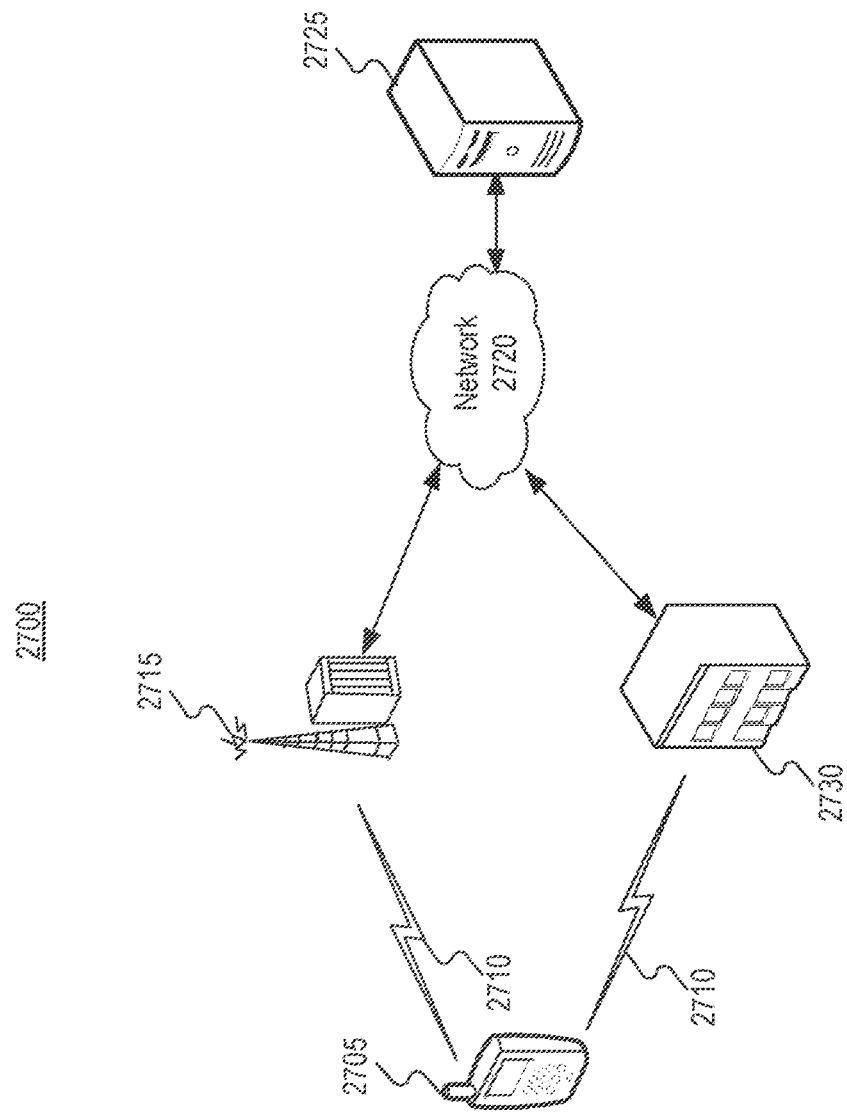
FIG. 27 is a block diagram of an exemplary system for analyzing entity performance, consistent with embodiments of the present disclosure

FIG. 27 depicts a block diagram of an exemplary system 2700 for analyzing entity performance including a mobile device 2705, consistent with the embodiments of the present disclosure. FIG. 27 depicts an example scenario where mobile device 2705 communicates with the components of system 2700 to request or analyze entity performance. In addition to mobile device 2705, system 2700 can include a cellular base station 2715, a provisioning entity 2730, a server 2725, and a network 2720. The devices of system 2700 may be communicatively coupled to transmit information. Various types of hardware can be included in devices in system 2700. For example, each device can include one or more processors, memory, and transceivers (e.g., devices that can send and/or receive data via a wired or wireless connection).

Sometimes, a business owner will want to know details about how its retail entities are performing. In particular, business owners may want to be able to compare how their stores are performing in comparison to similar stores located near their store. For example, a business owner may not know that people are spending less in a particular neighborhood as opposed to only their business. In addition, a business owner may want to view information associated with various customers that enter or make transactions at their store. At certain points in time, the business owner or an employee of the business may not be able to access information associated with the customers visiting their store if they are not in front of a computer. Thus, having the ability to determine information associated with customers in real-time with a mobile device can be useful.

System 2700 can implement some or all of the methods described herein (e.g., processes for determining locations and analyzing or comparing entity performance as depicted in FIGS. 6, 10A, 11, and 13-15) and can include some or all of the devices and/or systems described above (e.g., provisioning entity analysis system 210, provisioning entity management systems 240, consuming entity data systems 250, data structure 400, system 500). For example, a user of mobile device 2705 may access provisioning entity analysis system 210 in order to view the performance of their provisioning entity (e.g., a retail store).

Mobile device 2705 may be configured to electronically communicate with other devices in system 2700, and to transmit or request information regarding an entity's performance. Mobile device 2705, for example, may be a smart phone, tablet, wearable (e.g., smartwatch) or other portable electronic device capable of communicating data (e.g., information), as discussed above.

Mobile device 2705 may include one or more data acquisition interfaces that can acquire information. In some embodiments, the data acquisition interface(s) allow mobile device 2705 to gather information about its surroundings, which may be transmitted to a provisioning entity (e.g., a merchant) and/or server 2725 that analyzes entity performance. Data acquisition interfaces can include, but are not limited to: an input/output device, a location determination module (e.g., a global positioning system (GPS)), a network interface card, a barometer, an accelerometer, a gyroscope, a thermometer, etc. A data acquisition interface can be used to provide a system with information unique to a mobile device (e.g., its location), so performance analyses can be customized based on information acquired at the data acquisition interface. In some embodiments, a data acquisition interface can acquire a device identifier (ID) (which may include the ID of the mobile device that the data acquisition interface is included within). In various examples, a mobile device can determine the device IDs of mobile devices in particular area surrounding the mobile device and use the determined device IDs when performing various entity performance analyses.

Mobile device 2705 may also include a display that can display information using a mobile widget. Mobile widgets may be graphical user interfaces (GUIs) that can be manipulated by a user of mobile device 2705. They can be generated using software, a script, by opening dynamic content in an email, etc. In various embodiments, mobile widgets can be accessed by opening an application on a mobile device, or they may be accessed automatically. For example, a mobile widget may automatically open when a user unlocks their smart phone.

Mobile device 2705 may be associated with one or more users. Users can be a consuming entity or be associated with a consuming entity. In some cases, users can be associated with a provisioning entity, and accordingly mobile device 2705 may be associated with the provisioning entity. For example, a mobile device may belong to a store, an owner of a store, or an employee of a store such as a manager. In such cases, mobile device 2705 may be considered to be associated with the provisioning entity (e.g., the store).

Referring back to system 2700, in some embodiments, mobile device 2705 communicates with a cellular base station 2715 or provisioning entity 2730 using links 2710. As some examples, mobile device 2705 can use links 2710 to transmit information about its location to a provisioning entity, or request information about entity performance from server 2725. Links 2710 transmit information and may include a wired connection, a wireless connection, or both. Example wireless technologies that may be used by mobile device 2705 in the example systems and methods described in the present disclosure include, but are not limited to: communication via satellite, CDMA, LTE, WiFi (IEEE 802.11), radio frequency identification (RFID), Near Field Communication (NFC), ZigBee™ (IEEE 802.15.4), Z-Wave™, Bluetooth™, Thread™, WeMo™, WiMax™, etc.

System 2700 may include a provisioning entity 2730, which, for example, may be a merchant location. Provisioning entity 2730 may include one or more transceivers (e.g., wireless transceivers, beacons, etc.). The one or more transceivers may be configured to detect the presence of mobile device 2705 when mobile device 2705 comes within a certain range of provisioning entity 2730. For example, if a consuming entity (e.g., a customer) associated with mobile device 2705 is carrying mobile device 2705 when the consuming entity physically enters the premises of provisioning entity 2730, the one or more transceivers may be configured to detect the presence of mobile device 2705. Furthermore, and in some embodiments, the transceivers also may be configured to determine a particular location of mobile device 2705 within provisioning entity 2730, along with a route that mobile device 2705 traveled while near and/or inside provisioning entity 2730. For example, provisioning entity 2730 may be able to detect that the consuming entity carried mobile device 2705 in through the front door, walked past the produce display, stopped in the pet food aisle for 4 minutes, then walked down aisle 10 to get to the deli counter (where the consuming entity waited for 8 minutes), then passed the candy section on the way to register 10 and out the back door.

In another example, mobile device 2705 may share information with provisioning entity 2730 via the one or more transceivers. For example, provisioning entity 2730, via the one or more transceivers, may receive information related to the consuming entity associated with mobile device 2705. Such information may be shared before, after, or during the detection by provisioning entity 2730 of mobile device 2705. In one example, provisioning entity 2730 may detect personal data, credit card data, shopping history, or other information about the consuming entity associated with mobile device 2705. The provisioning entity 2730 may, in some examples, use the information received from mobile device 2705 to, in return, share information with mobile device 2705. For example, if provisioning entity 2730 receives information that the consuming entity associated with mobile device 2705 is a 15 year-old female, provisioning entity 2730 may be configured to share coupons for items that may interest a person of that description, directly with mobile device 2705 for display to the consuming entity. In some embodiments, a user using mobile device 2705 may perform a particular action to cause provisioning entity 2730 to determine that mobile device 2705 or its associated user is within provisioning entity 2730. For example, a user may "check in" or "like" provisioning entity 2730 using a web-based application such as Facebook™ or Foursquare™. In such a case, provisioning entity 2730 and/or a mobile device 2705 associated with provisioning entity 2730 may receive a notification about the user's action. In some embodiments, in response to the user's action, provisioning entity 2730 may cause an action to occur such as providing a mobile device 2705 associated with the user with one or more coupons, or providing a mobile device 2705 associated with the user with information about discounted products.

Server 2725 is an example computing system that can perform the methods described herein, and can include multiple hardware devices. In some examples, server 2725 may include the devices included in provisioning entity analysis system 210 as described above, and include one or more networked computers processing in parallel or use a distributed computing architecture. Server 2725 may include one or more machines physically located in provisioning entities, which may help save time and resources when they are close to users attempting to access server 2725.

Server 2725 can perform entity analysis in the same manner as provisioning entity analysis system 210 discussed above. For example, server 2725 can receive data and information requests from provisioning entity 2730 or mobile device 2705, perform various operations such as populating or accessing a database, and send data such as information associated with consuming or provisioning entities. In one example, a user that wants to see how certain provisioning entities are performing can use mobile device 2705 to access server 2725. The user may send information requests that include filter selections, as discussed above, to retrieve information associated with the certain provisioning entities. For example, a user may send filter selections to parse data in server 2725 such that only information indicating the revenue generated by grocery stores in a three-mile radius of the mobile device during the previous week. This information may be sent from server 2725 to mobile device 2705 and displayed using a widget (e.g., an application).

In some embodiments, network 2720 included in system 2700 is similar to network 260 as discussed above. Network 2720 can be used by mobile device 2705 to send and receive data associated with entity performance from server 2725. Network 2720 can be any type of network or combination of networks configured to provide electronic communications between components of system 2700. Network 2720 can be any type of network (including infrastructure) that provides communications, exchanges information, and/or facilitates the exchange of information such as the Internet, a Local Area Network, or other suitable connection(s) that enable the sending and receiving of information between the components of system 2700.

In combination with or in addition to the methods and systems described above, mobile device(s) 2705 can perform a variety of actions and be associated with consuming entities, provisioning entities, or in some cases a mobile device can be associated with a consuming entity and a provisioning entity. For example, mobile device 2705 may be belong to an employee of a provisioning entity, such that it is considered associated with the provisioning entity. At the same time, the the employee may be a customer of another provisioning entity, such that the employee is also considered a consuming entity, and their mobile device is therefore associated with a consuming entity as well.

As discussed above, a user may access data associated with the performance of provisioning entities. For example, a user may access data from server 2725 about provisioning entities in an area near a particular provisioning entity, such as a store near or next to the provisioning entity. By using a display on mobile device 2705, a user can quickly view information about one or more provisioning entities or areas from anywhere.

Data acquired by mobile device 2705 can be inserted into or acquired from a data structure (e.g., a database), such as the data structure 400 of FIG. 4. In various embodiments, a user sends an information request to a data structure to access entity performance information. Data structures can be stored in various places. For example, a data structure may be included in mobile device 2705, remote from mobile device 2705, or partially located in mobile device 2705 and remote from mobile device 2705. In some embodiments, this data structure may be stored in a real-time distributed computation environment that supports stream-oriented processing. For example, the data can be stored in a data structure using Hadoop's Distributed File System, Vertica™, or Amazon™ S3. The data structure storing the interactions data may be incrementally updated at particular intervals by a data computation system, such as Apache's Spark™, providing a user with real-time or near real-time information about the interactions.

As described above, data structures can include information corresponding with entities and interactions, such as locations of interactions, amounts of money included in interactions, amounts of money included in interactions at one or more provisioning entities during one or more time periods, information representing a market share of one or more provisioning entities, information about a cohort of provisioning or consuming entities (which may be related via an interaction), etc. For example, a user may send an information request to a device storing a data structure that includes filter selections and retrieves an average amount of money spent at a cohort of provisioning entities while the provisioning entities were holding a sale (e.g., discounting products or services).

In various embodiments, information about the surroundings of mobile device 2705 can be retrieved and sent in a request from mobile device 2705 to server 2725. For example, a data acquisition interface of mobile device 2705 can be used to determine an associated provisioning entity. The associated provisioning entity may be the provisioning entity mobile device 2705 is located in, provisioning entities within a particular distance from mobile device 2705, etc. A user can then view performance information corresponding to the at least one associated provisioning entity. For example, a mobile device 2705 being carried by the owner of a shopping center can determine when it is in the shopping center, and display information associated with the provisioning entities in the shopping center such as how much is spent at particular stores.

In additional embodiments, information provided to mobile device 2705 may include information associated with an area or a micro-economy. For example, information may be provided by server 2725 associated with foot traffic in a particular area (e.g., a number of consuming entities in one or more locations during one or more periods of time). Information provided to mobile device 2705 may indicate an amount of retail space in a particular area, whether an amount of foot traffic in an area is high or low compared to another area, etc. Further, information can be provided indicating whether a location would be a good place to open or invest in a provisioning entity. In some embodiments, location information associated with mobile devices being carried by users may be used to determine foot traffic. For example, a transceiver may determine an amount of unique mobile devices in a particular area, and the amounts of time spent by the unique mobile devices in the particular area. Information about foot traffic and micro-economies can be provided to mobile devices associated with a provisioning entity or a consuming entity. For example, in some embodiments, members of the public can view aggregated foot-traffic data.

Herein, requests for information may be referred to as information requests. As examples, information requests generated at mobile device 2705 may include requests to determine its location (which may be determined with a data acquisition interface such as GPS), and/or requests for information associated with a cohort of provisioning entities (which may include requests to be sent to server 2725). An information request may include information that can be used to identify a particular device or type of device. For example, this information can be used to determine a user associated with the device, and information associated with the user such as where they live, information indicative of products or services the user has previously purchased, information indicative of products or services the user is likely to purchase, etc.

Information requests can come from a mobile device 2705 associated with a provisioning entity or a consuming entity. For example, system 2700 may determine that a mobile device 2705 associated with a loyal customer entered a particular provisioning entity. As discussed above, this determination may be based on communications between mobile device 2705 and one or more cellular base stations that can be inside or outside of the provisioning entity, a WiFi hotspot, or another type of communication device within a provisioning entity (e.g., a communication device that utilizes NFC, Bluetooth™, ZigBee™, Z-Wave™, Thread™, WeMo™, etc.). A mobile device 2705 associated with a provisioning entity may send an information request to using system 2700 (e.g., to server 2725) to determine whether a loyal customer entered the provisioning entity. In some examples, an amount of interactions conducted at a provisioning entity over a period of time may likewise be used as a gauge for how many customers, loyal or otherwise, are likely to be within a provisioning entity. In any case, an action may occur in response to a particular amount of people estimated to be in a provisioning entity (e.g., whether estimated by determining the presence of a mobile device or an amount of interactions).

In some embodiments, system 2700 can automatically trigger (e.g., cause to perform) an action, which may be based on an information request. For example, an alert may be sent to mobile device 2705 when a particular consuming entity enters or conducts an interaction at a particular provisioning entity. For example, a manager of a casino might want to be alerted when a big spender enters their casino, engages in a transaction, places a bet, or makes a purchase. In some embodiments, an alert can include an email or other type of message including text. Such an alert system can be configurable. For example, an alert may be sent to a mobile device when the mobile device is in or near a particular location, such as the provisioning entity where a loyal customer entered. In some embodiments, an alert may not be sent to mobile device 2705 when a loyal customer enters a provisioning entity and mobile device 2705 is not in the provisioning entity.

Various actions can occur based on other attributes. For example, an alert may be sent to mobile device 2705 only during particular times or when a particular amount of loyal customers are located in a provisioning entity, or when a particular amount of loyal customers engage in interactions with the provisioning entity. For example, an alert may be sent to the manager of a provisioning entity when 50 people are in the provisioning entity (or when 10 consuming entities engage in a transaction at the provisioning entity) during business hours, but not after 5:00 p.m. However, an alert may be configured to send a message to the manager when over 100 people are in the provisioning entity (or at least 20 consuming entities engage in a transaction at the provisioning entity) after 5:00 p.m.

In some embodiments, a summary or aggregated amount of information (e.g., a batch) can be sent to mobile device 2705 and include information such as loyal customers that visited one or more provisioning entities during a particular time, interactions entered into by customers and/or loyal customers, products and/or services purchased by customers, etc. In addition to identifying loyal customers via an associated mobile device, in some embodiments, loyal customers can be identified using RFID or biometrics such as facial recognition. Alerts can then be generated based on the identification of a particular loyal customer. It should be appreciated that devices that implement identification technology using biometrics can be included in system 2700.

In some embodiments, an action is triggered based on attributes associated with an interaction, such as when an interaction involving more than a threshold amount of money occurs. For example, an email may be delivered to mobile device 2705 in response to a large transaction occurring at a provisioning entity. In some embodiments, the alert may not be delivered to mobile device 2705 based on one or more attributes associated with mobile device 2705, such as its location. For example, an alert may not be delivered to mobile device 2705 if mobile device 2705 is located in the provisioning entity where a transaction occurred, since the user of mobile device 2705 may already know about a transaction that is occurring at a store they are also at. As another example, an alert may be delivered to mobile device 2705 when the mobile device is located in the provisioning entity, so an employee may thank a customer involved in an interaction. In another example, a store manager may want to view real-time metrics on their way to the store. In some cases, an alert may be provided to mobile device 2705 at a particular time (e.g., an hour before the manager starts their shift) or in response to mobile device 2705 being near or entering a provisioning entity. This allows a user to view information associated with the provisioning entity before or when the user arrives at the provisioning entity.

In some embodiments, an alert may be delivered when mobile device 2705 is not located at a provisioning entity and an interaction with particular attributes occurs. For example, an alert may be sent to a store owner's mobile device that indicates that fraudulent interactions occurred at their store. As another example, an alert may be sent to a store manager indicating whether one or more products should be ordered (e.g., refilled). A determination as to whether more products should be ordered may be based on information associated with interactions, such as the amount of products that have been purchased, and information associated with inventory such as the amount of a product located at one or more provisioning entities. In some embodiments, an alert may be sent to mobile device 2705 and additional products may be ordered automatically (e.g., system 2700 send information to a supplier to order additional products).

In some embodiments, an alert can be an email that includes dynamic content, also known as rich media, associated with the performance of an entity. For example, metrics associated with a provisioning entity may be updated and displayed when a device accesses email and/or when a user opens an email including the metrics (e.g., using a mobile device). Such rich media can be displayed using a hyper-text markup language, using a widget, or in a manner based on the type of device in which the rich media is being displayed.

Figure 28:
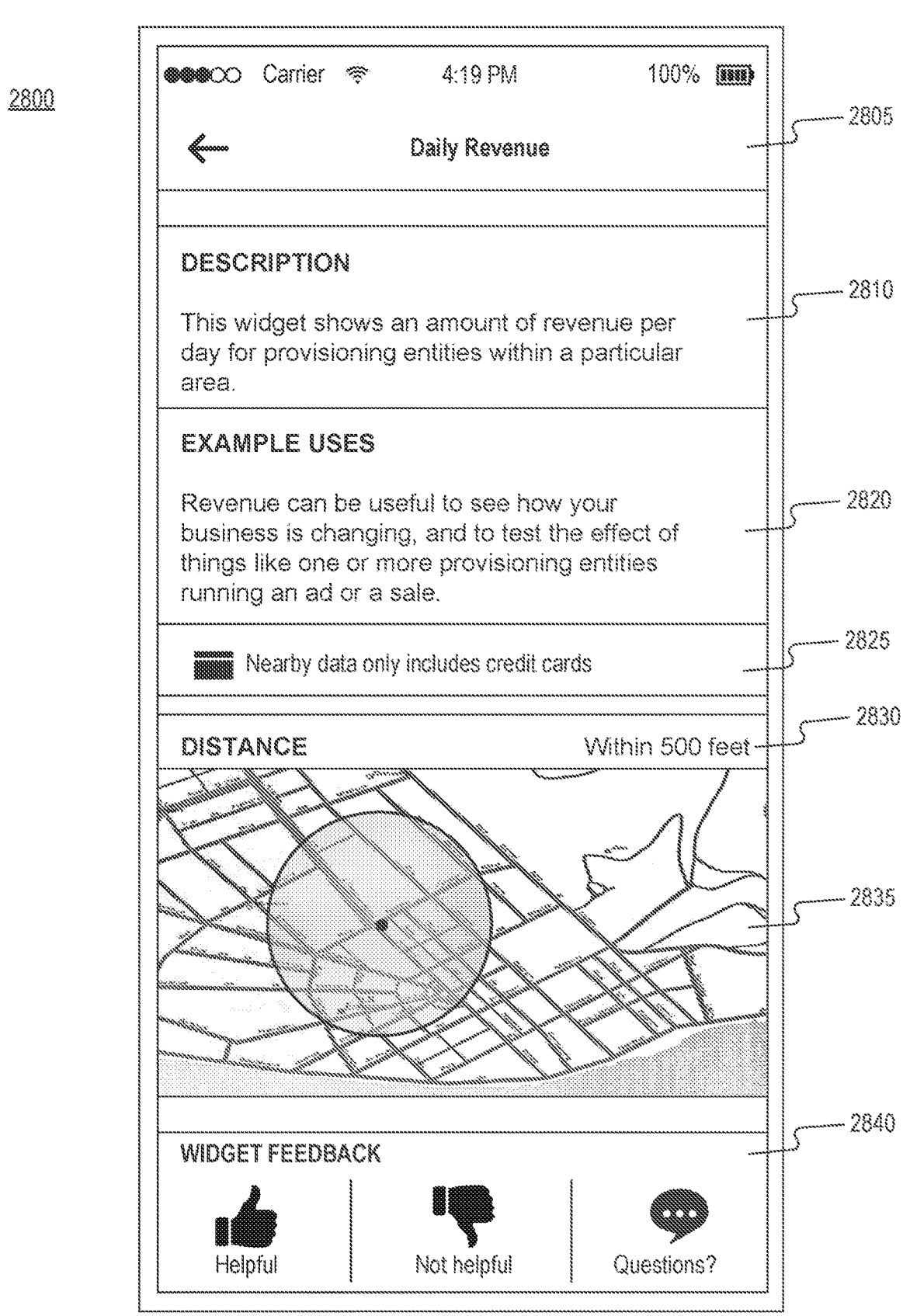
FIGS. 28-34 are screenshots of exemplary user interfaces, consistent with the embodiments of the present disclosure.

FIG. 28 shows a screenshot of an exemplary user interface 2800 that can be shown on mobile device 2705. Exemplary user interface 2800 depicts a mobile widget. The mobile widget shown in user interface 2800 includes a title 2805 of the mobile widget, a description 2810 of the mobile widget, example uses 2820 of the mobile widget, other pertinent information such as they type of data shown 2825 in the mobile widget or a map 2835 with map data 2850, and an area for a user to provide feedback about the mobile widget 2840.

The example mobile widget shown in user interface 2800 includes information associated with revenue for a particular area. In various embodiments, a map 2835 can be shown on the mobile device and may indicate provisioning entities to be analyzed within a particular radius (e.g., 500 feet as shown by map data 2830). In various embodiments, a user can interact with a mobile widget to change a type of interaction data accessed (e.g., by manipulating the type of data shown 2825), or change the size of an area being analyzed. In some embodiments, the example mobile widget can determine the location of the mobile device using the data acquisition interface. For example, a global positioning system included in the mobile device may cause the mobile widget to show a map 2835 indicating the location of the mobile device. A user may input a radius, which can be used to indicate provisioning entities within an area shaped as a circle surrounding the mobile device, wherein the radius of the circle is based on the user input. Once an area is determined, a mobile device can send an information request to a performance analysis system (e.g., located at server 2725). In response to the information request, a performance analysis system can return attributes associated with provisioning entities within the radius such as types of provisioning entities, locations of provisioning entities, revenue of provisioning entities over a period of time, interactions occurring at provisioning entities during a period of time, etc. In various embodiments, other shapes such as polygons may be used in conjunction with a map to determine a cohort of entities which can then be analyzed. For example, a user may enter boundaries of a shape by tracing streets or drawing a circle on a map. As another example, a user may enter latitudinal and longitudinal coordinates associated using a mobile widget to help create a cohort of entities to be analyzed.

As an example, a user can visit downtown Boston, Mass., and use the mobile widget in example user interface 2800 to view the performance entity of a cohort of entities surrounding the user. The user may open the widget and enter a radius (e.g., 2 miles), and filter selections specifying a type of provisioning entity such as coffee shops. The widget may use a data acquisition interface to determine the mobile device's location, and then display all of the coffee shops within a 2 mile radius of the mobile device, helping the user find coffee shops that are performing well in downtown Boston. A user may use this information and visit high performing coffee shops to see why they are doing well. As another example, the information may assist the user with determining where to open a new coffee shop.

Figure 29:
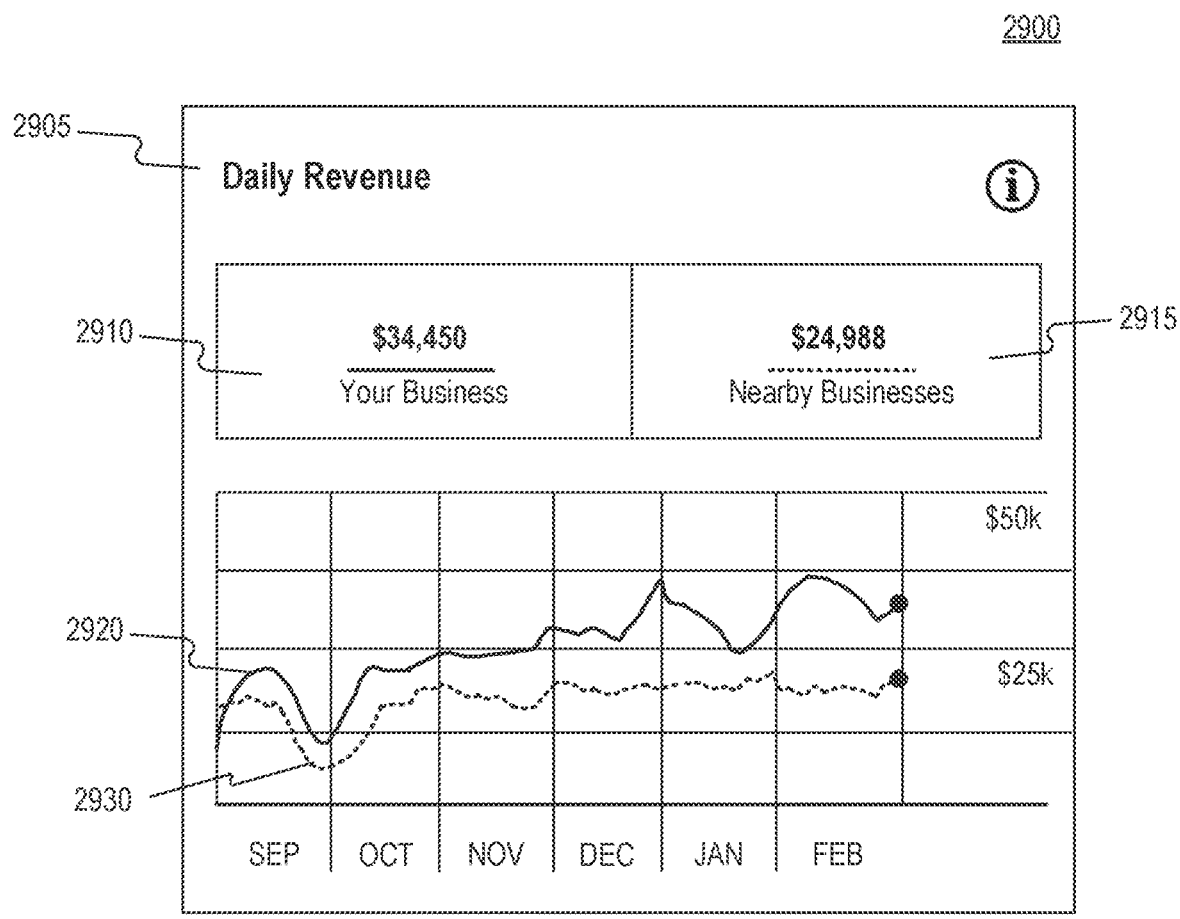

FIG. 29 shows a screenshot of an exemplary user interface 2900 that can be shown on mobile device 2705. Exemplary user interface 2900 includes a mobile widget that indicates the daily revenue of a business over time. Exemplary user interface 2900 includes a descriptive title 2905, a current revenue for a business associated with the user of a mobile device 2910 (e.g., the revenue of a provisioning entity), a current revenue for nearby businesses 2915, and a line graph that shows revenue over time for the business associated with the user of a mobile device 2920 and nearby businesses 2930. As described above, business owners and investors may want to know how their business is doing compared to businesses nearby. The mobile widget shown in exemplary user interface 2900 shows the revenue of nearby businesses 2915 (which may be an average of revenues of nearby businesses). This mobile widget shows line graphs indicating the performance of the business associated with the user of the mobile device 2920 and the revenue over time of nearby businesses 2930. In this example, the performance information shown includes daily revenue. It should be understood that performance information, as discussed above, can include a variety of attributes including a number of customers over time, average amount spent by customers, average amount paid to full-time employees, a number of full time employees, and other information to assist the manager or owner of a provisioning entity to make decisions. In some embodiments, instead of daily revenue a user may provide input that causes a mobile device to display monthly revenue, yearly revenue, or select a cohort of entities for comparison other than nearby businesses (e.g., provisioning entities that sell the same products, or provisioning entities that are part of the same chain of stores as the business associated with the user of the mobile device).

Figure 30:
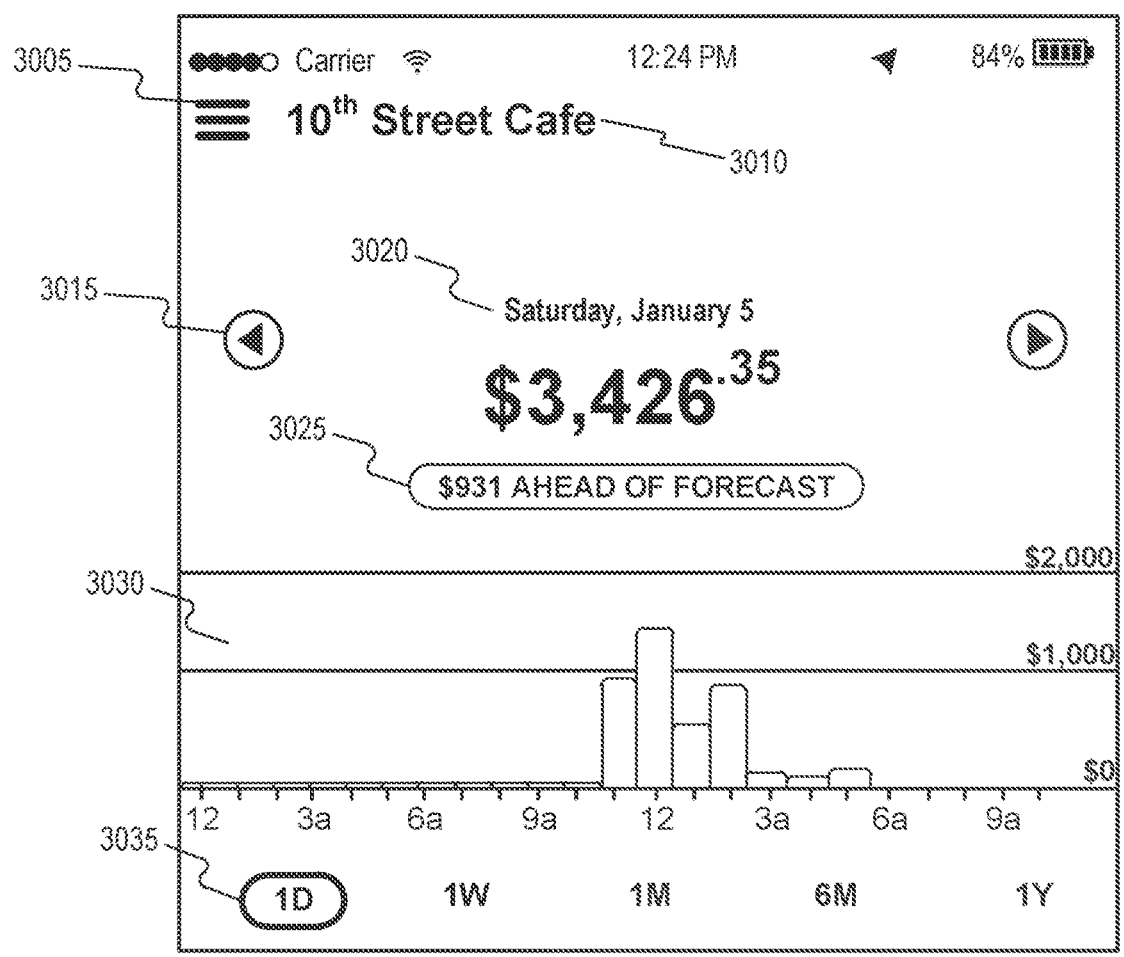

FIG. 30 shows a screenshot of an exemplary user interface 3000 that can be shown on mobile device 2705. Exemplary user interface 3000 includes a mobile widget that displays a current amount of revenue for a given day 3020 and a forecasted amount of revenue for a day 3025. Exemplary user interface 3000 can include a difference between the amount of revenue for a particular time period and a forecasted amount of revenue for a particular time period. Exemplary user interface also includes a button to access a menu 3005, a name of a provisioning entity being analyzed 3010, a graph indicating revenue over time 3030, and display options 3035. Exemplary user interface 3000 also includes arrows 3015 which can cause a mobile device to show performance information of another business or show performance information using a different mobile widget.

Figure 31:
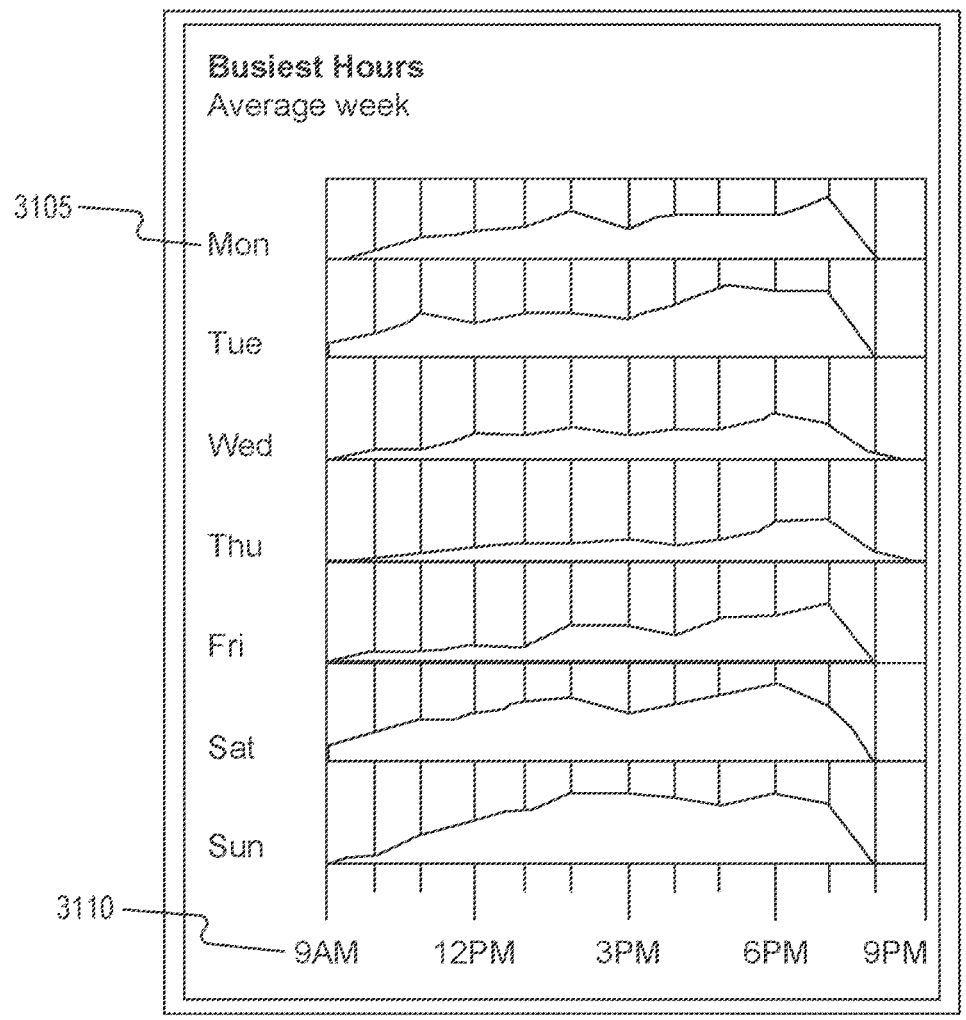

FIG. 31 shows a screenshot of an exemplary user interface 3100 that can be shown on mobile device 2705. Exemplary user interface 3100 indicates the busiest hours of a provisioning entity during an average week. The exemplary user interface indicates days of the week 3105 and times of the day 3110. A provisioning entity may be determined to be busy based on an amount of interactions, or an amount of people entering the provisioning entity. For example, an amount of congestion of a provisioning entity can be determined by an amount of electronic devices that are in, entering, or exiting a provisioning entity. As discussed above, in some embodiments, the location of a mobile device in relation to a provisioning entity can be determined based on communications between a mobile device and a cellular base station that is either within or outside of the provisioning entity, and/or a communication device located within a provisioning entity such as an RFID, NFC, ZigBee™, Z-Wave™, Bluetooth™, Thread™, WeMo™, or WiFi enabled terminal.

In some embodiments, one or more mobile devices can be used to control various attributes of a provisioning entity. For example, someone using a mobile device can control the temperature or lighting within a provisioning entity, or music playing in the background. In various embodiments, when a threshold amount of users are in a store (e.g., a particular number of mobile devices are determined to be within a store) at a particular time, a system such as system 2700 may be configured to automatically adjust temperature or lighting within a portion of, or all of a provisioning entity.

In some embodiments, previously acquired data can be used to predict times that a provisioning entity will be busy, and the provisioning entity can preemptively adjust an attribute of a store such as lighting, temperature, or background music. In some embodiments, a request to change attributes of a provisioning entity may be sent to a mobile device (e.g., a mobile device that is in the provisioning entity and associated with the provisioning entity, such as a mobile device belonging to an owner or manager), such that a user of the mobile device can use the mobile device to instruct a system to adjust attributes associated with a provisioning entity. As with other alerts, a request to change attributes may be delivered to a mobile device anytime, when the mobile device that receives the request is in the provisioning entity, or when the mobile device that receives the request is not in the provisioning entity.

Figure 32:
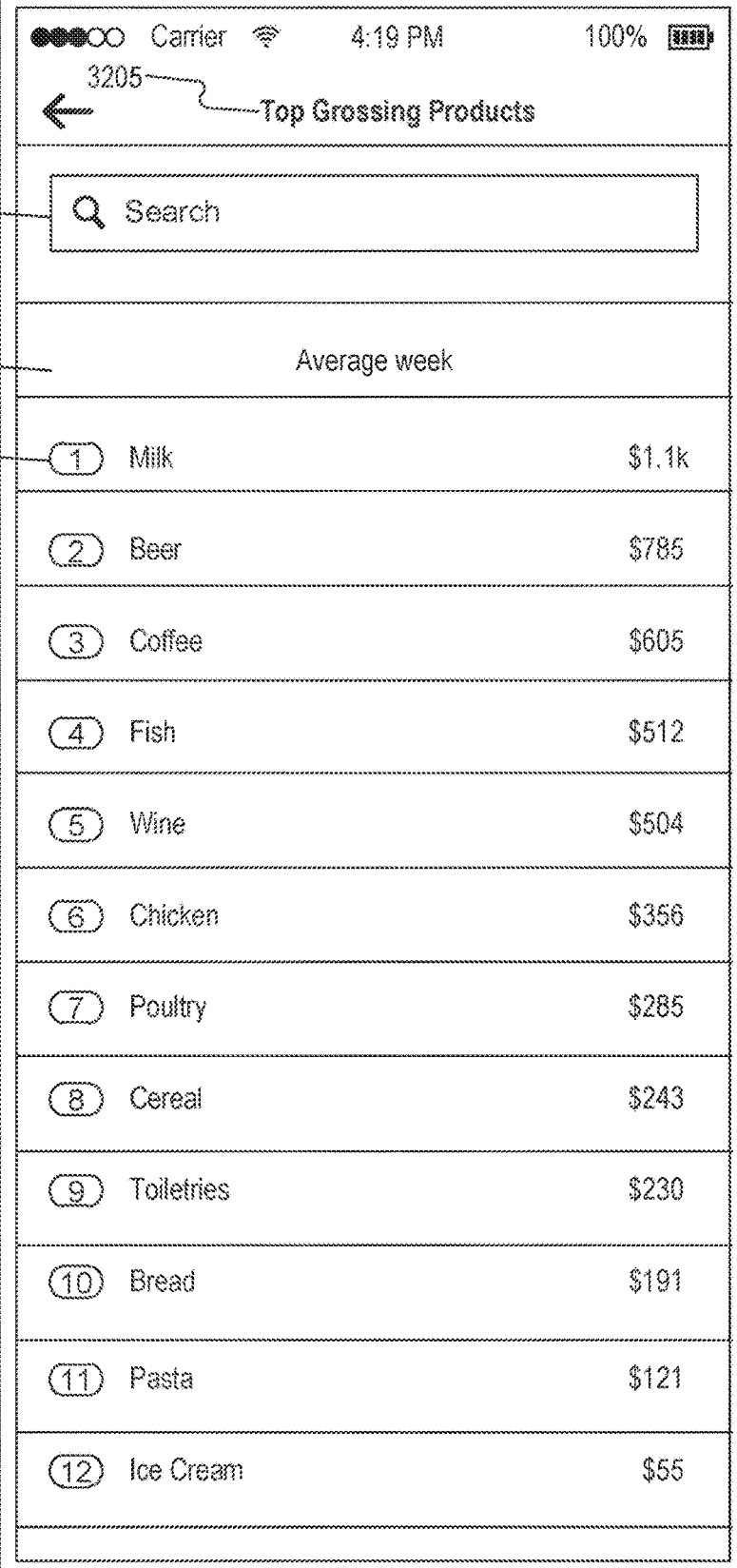

FIG. 32 shows a screenshot of an exemplary user interface 3200 that can be shown on mobile device 2705. Exemplary user interface 3200 displays a provisioning entity's top grossing products (e.g., the products creating the highest revenues). The example shown in interface 3200 can show a store manager that milk is the top selling product during a particular week, followed by beer, coffee, and fish. Interface 3200 includes a title of the mobile widget 3205, a text-entry field 3210 for searching for a product sold and an amount of revenue associated with the product, a time module 3215 that indicates the period of time and/or allows a user to change a period of time (e.g., average week, average month, last week, average Saturday, etc.). Exemplary user interface 3200 allows a user to quickly view the top selling products 3220 in a provisioning entity, so the user may know what to order. Information associated with a provisioning entity's inventory can be stored in a database that may be included in server 2725, or in a data structure separate from the data structure that includes information about a provisioning entity's location and/or interactions. In some embodiments, when a particular amount of revenue is generated or a threshold amount of items are sold a mobile device may automatically order additional products such that they do not run out. As with other alerts, a request may be sent to a mobile device associated with a provisioning entity that requests approval before ordering additional products. This request, as with other alerts, can be sent to a mobile device based on the time or location of the mobile device so that the request does not bother the user of the mobile device, and/or alerts the user of the mobile device when the mobile device is not located at the provisioning entity.

Figure 33:
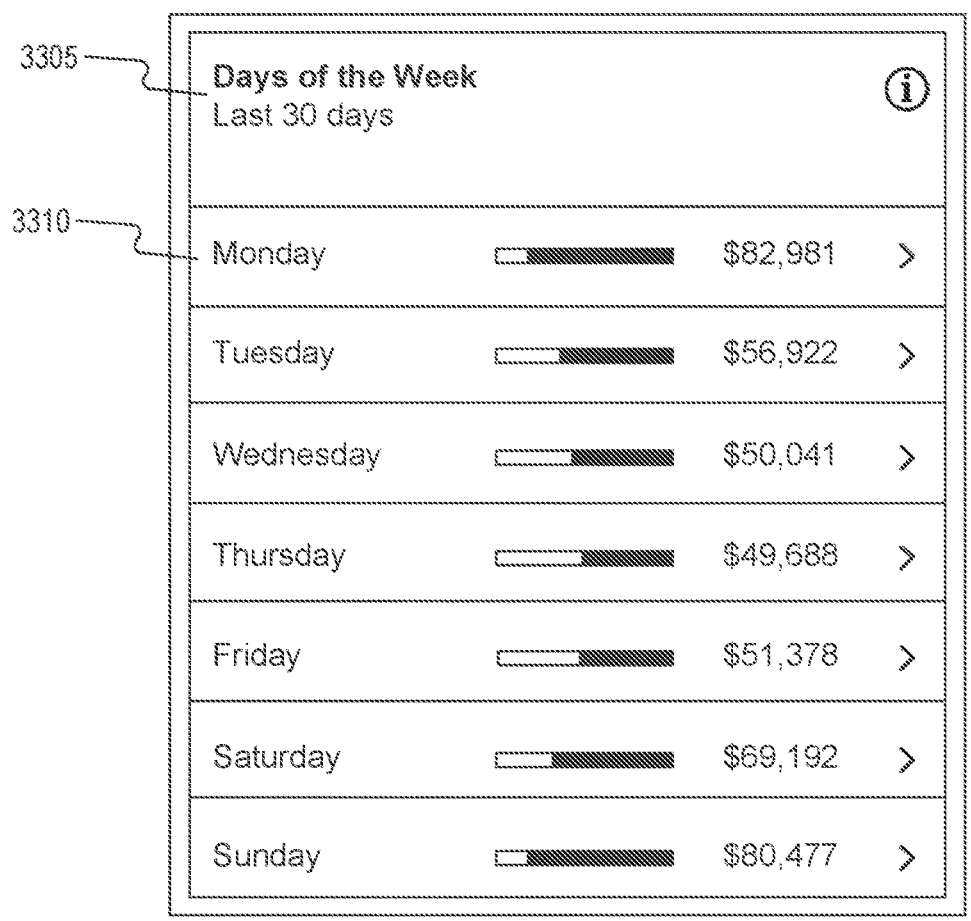

FIG. 33 shows a screenshot of an exemplary user interface 3300 that can be shown on mobile device 2705. Exemplary user interface 3300 includes a title 3305 that indicates that revenue over the previous 30 days is being displayed. Information associated with average revenue on particular days of the week 3310 are also shown. In some embodiments, a user can press the title 3305 or another portion of the user interface to display performance information associated with more than the previous 30 days, less than the previous 30 days, a particular period of time (e.g., the past 4 Fridays), etc. In some embodiments, each day of the week 3310 can be pressed or otherwise selected and more granular metrics can be shown such as what products were bought, what employees were working, the location of the mobile device on that day (which may be stored in the mobile device until a request for that information is made), etc. In some embodiments, metrics such as average revenue by time of day can be displayed in response to selecting a day of the week 3310.

Figure 34:
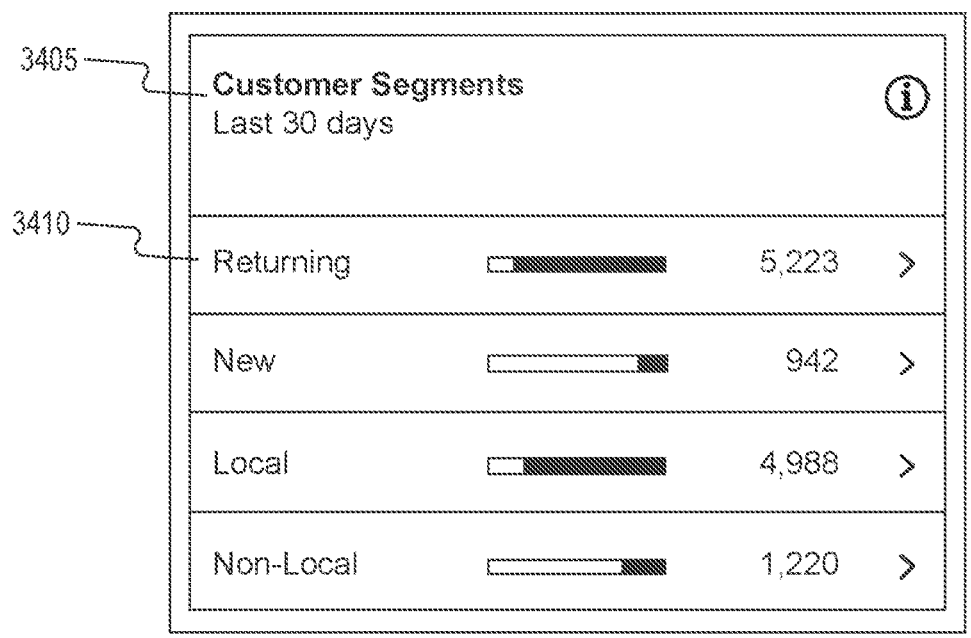

FIG. 34 shows a screenshot of an exemplary user interface 3400 that can be shown on mobile device 2705. Exemplary user interface 3400 includes a title 3405 that indicates customer segments over the previous 30 days. Information associated with customer segments 3410 is also displayed. In some embodiments, the mobile widget shown in exemplary user interface 3400 can display an amount of consuming entities that had previously entered into interactions with the provisioning entity associated with the mobile device (e.g., returning customers), consuming entities that have not entered into an interaction with a provisioning entity associated with the mobile device (e.g., new customers), and consuming entities that are local or non-local (e.g., consuming entities that are estimated to live within a particular distance from the provisioning entity associated with the mobile device). Local and non-local entities can be estimated based on various transactions entered into by the entity. Such information can be stored and processed at a system's one or more servers such as server 2725.

Figure 35:
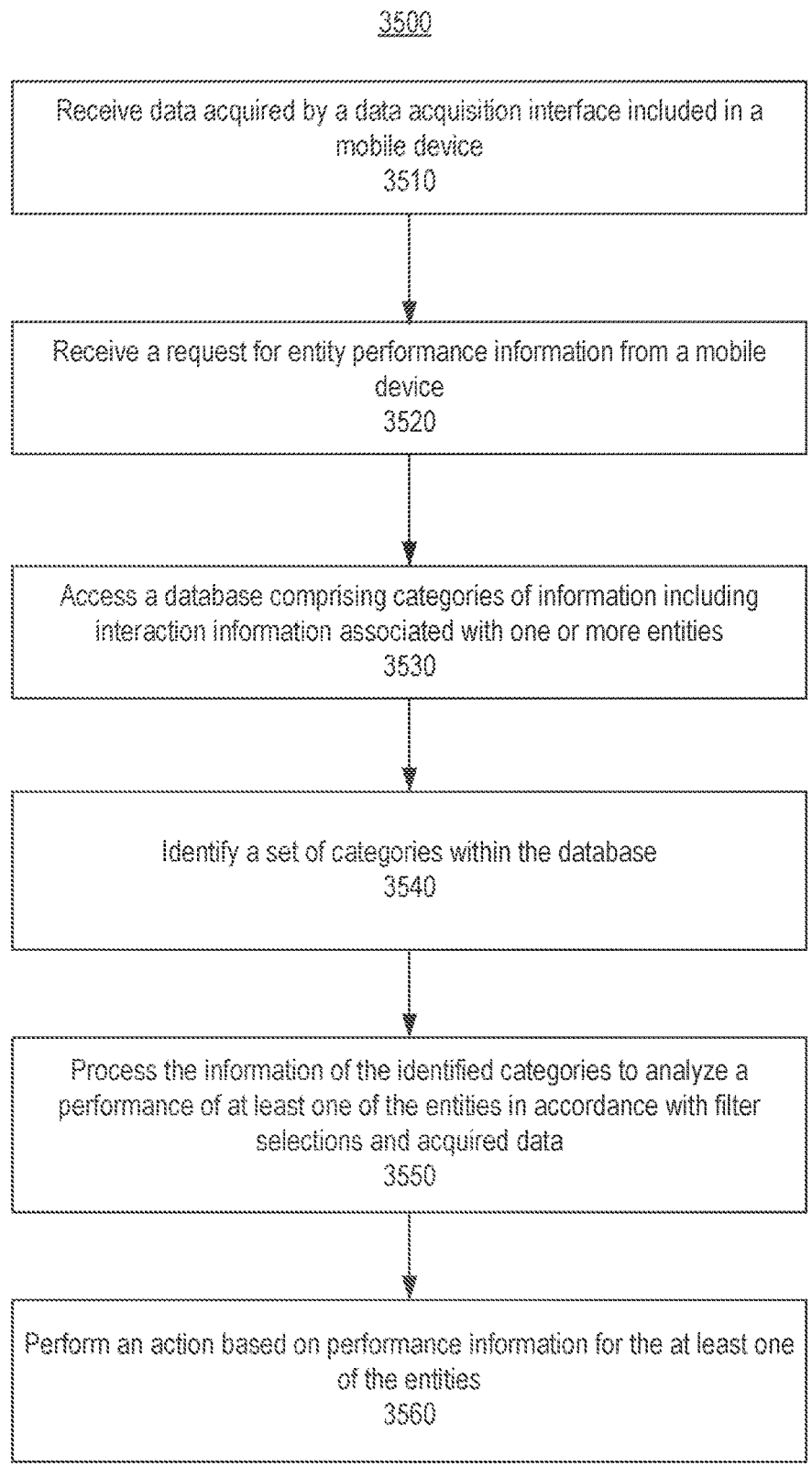
FIG. 35 is a block diagram representing a method of analyzing entity performance, consistent with the embodiments of the present disclosure.

FIG. 35 is a block diagram representing a method of analyzing entity performance, consistent with the embodiments of the present disclosure. While the flowchart discloses the following steps in a particular order, it will be appreciated that at least some of the steps can be moved, modified, or deleted where appropriate, consistent with the teachings of the present disclosure. The analyzing of the entity performance can be performed in full or in part by an entity analysis system (e.g., provisioning entity analysis system 210, system 2700, etc.). It is appreciated that some of these steps can be performed in full or in part by other systems (e.g., such as those systems identified above in FIGS. 2 and 27).

In step 3510, data is acquired by a data acquisition interface included in a mobile device. As discussed above, this data can include location data, information regarding other mobile devices near the mobile device, temperature, etc. The data acquisition interface can acquire many types of data, and then provide the data to a remote server that can then process the data acquired at the mobile device's data acquisition interface and provide performance analysis data based at least in part on the data acquired by the data acquisition interface included in the mobile device.

In step 3520, a request for entity performance information is received from a mobile device. In some embodiments, the request for entity performance information is received from a mobile device associated with a consuming entity, a provisioning entity, or both. It should be appreciated that the provisioning entity for which performance information is requested can be associated with the mobile device. For example, the mobile device may have logged onto a web portal using credentials associated with the provisioning entity, or the mobile device may be owned and/or operated by the provisioning entity, an owner of the provisioning entity, or an employee of the provisioning entity. In some embodiments, attributes associated with the mobile device, such as location or temperature, may be determined and information provided to the device can be based on the attributes of the mobile device.

In step 3530, a database comprising categories of information including interaction information associated with one or more entities is accessed. Such a database can be located in a server such as server 2725, or another device such as those illustrated in FIGS. 2 and 27. It should be appreciated that in some embodiments a data structure other than a database can be used to store data associated with provisioning and consuming entities. As discussed above with reference to data structure 400, in some embodiments, a database can be a Relational Database Management System or a column-oriented database. Further, in some embodiments both types of databases can be used to store information.

In step 3540, a set of categories within the database is identified. These categories may be identified based on filter selections and acquired data. For example, categories can include locations of provisioning or consuming entities and amounts associated with particular transactions. Acquired data can include data acquired by a data acquisition interface included in a mobile device. The categories can be identified based on one or more filter selections as described above with reference to FIG. 6. For example, a filter selection associated with provisioning entities in Texas may cause categories associated with provisioning or consuming entities in Texas to be accessed.

In step 3550, information of the identified categories is processed to analyze a performance of at least one of the entities in accordance with filter selections and acquired data. For example, in response to receiving a filter selection specifying entities that have a monthly revenue of over $10,000, database entries including amounts of money included in interactions may be analyzed. These interactions may be associated with an entity (e.g., an entity stored in a row of a database corresponding with an interaction), and the amounts of money included in the interactions may be averaged based at least in part on dates associated with the interactions. Based on the average amounts included in the interactions and the dates associated with the interactions, an amount of monthly revenue of an entity may be determined. In this example, entities with monthly revenues over $10,000 may be provided based on the filter selection.

In some embodiments, filter selections can be used to determine one or more cells (e.g., entries) within a database based on identified categories, which are identified based on the filter selections. These filter selection can be used to create what are commonly referred to as queries. One or more interactions corresponding to a row of a database comprising the one or more determined cells may be determined. Based on these interactions, one or more entities can be determined as corresponding to these cells (e.g., a store may be determined based on an interaction that occurred at the store, wherein a store identifier (ID) and interaction information is included in a row or column of a database). Performance information indicating the performance of one or more entities based on the transactions can be determined after the transactions are identified. Using these techniques, filter selections can be used to extract performance information from a database.

In various embodiments, databases may receive queries (e.g., requests that can be based on filter sections). One or more modules sometimes referred to as a Query Processor may determine whether the query has permission to be ran against the database. If so, a query, which can be an SQL query, can be compiled into an internal query plan. After a query is compiled, a resulting query plan can be used by a plan operator to execute a query. A plan operator may implement relational query processing tasks including joins, selection, projection, aggregation, sorting, etc. Plan operators can make fetch calls to fetch data from a Transactional Storage Manager, which can manage all data access (e.g., read) and manipulation (e.g., create, update, and delete) calls. A database may include algorithms for organizing and accessing data in memory, including basic structures such as tables and indexes. In addition, a buffer management module may determine when and what data to transfer between storage devices. In some examples, before accessing data, locks are acquired from a lock manager to ensure correct execution when concurrent queries are made. A log manager can be accessed to determine whether a transaction can be completed successfully. After data is accessed, it can be used to compute results to provide to a requesting module or device. In some embodiments, this is performed by unwinding a stack (e.g., moving back through various activities performed prior to this point). Tuples can be generated from database data and placed in a buffer for a communications manager to send to a requesting module or device. In some embodiments, to retrieve large result sets a requesting module or device may make additional calls to fetch additional data incrementally from results returned from a query, such that multiple iterations are performed using a communications manager, query executor, and/or storage manager.

As discussed above with reference to FIG. 6, one or more filter selections of the received request can comprise a selection to represent data associated with at least one of: cohorts; demographics; locations; time; and transactions. Alternatively, the one or more filter selections can comprise a selection to represent data associated with at least one of: charts; histograms; maps; numbers; and time. In some embodiments, the one or more filter selections can comprise a selection to represent data associated with at least one of: a location information associated with the occurrence of an interaction; a location information associated with the consuming entity; a location information associated with the provisioning entity; demographic information representing at least one of: age, gender, income, and location associated with the consuming entity; an amount associated with an interaction; and a time associated with an interaction. Such filter selections can eliminate data that does not correspond with the filter selections, such that only interactions, entities, or the like are displayed to a user. For example, if a user selects filter selections corresponding with provisioning entities in California and transactions that include amounts over $500, then interactions that did not occur in California or involved an amount over $500 may not be displayed.

In some embodiments, filter selections may be combined with acquired data (e.g., by a mobile device). For example, a filter selection could correspond to information about which stores that sell pizza within a radius of 500 meters, and acquired data may be the location of a mobile phone. In such an example, stores that sell pizza within 500 meters of a mobile phone may be shown. In additional embodiments, filter selections may include information associated with entity performance, such as an amount of revenue over a period of time, items sold by a particular merchant at a particular time, any known sales of discounts available at various provisioning entities, etc. In some embodiments, a consuming entity may enter a filter selection, and use acquired data, such that a mobile device identifies sales or discounts on products located at provisioning entities within a particular distance of the mobile device. In some embodiments, acquired data such as temperature combined with an amount of people in a store, or predicted to be in a store, can be used to adjust attributes associated with a provisioning entity. For example, a mobile phone may receive information associated with a temperature of a provisioning entity and access a data structure indicating an average amount of people in a provisioning entity at a particular time. Based on the particular time, amount of transactions in a provisioning entity, or number of devices in a provisioning entity, a temperature reading may be taken (e.g., by the mobile device or a thermometer communicatively coupled to the mobile device), and if the temperature is above a predefined threshold the temperature in the provisioning entity may be lowered.

In step 3560, an action is performed based on performance information for at least one entity. As described above, a variety of actions are available to a system such as those depicted in FIGS. 2 and 27. Many of these examples can be performed by a system at a server (e.g., a distributed computing system), one or more mobile devices, or at another device within a provisioning entity. For example, some actions may be associated with sending information, such as: sending an alert (which can include or be an email), sending a summary of performance information to a mobile device, sending information indicating that a loyal customer is in a provisioning entity, sending information indicating that a particular amount of customers are in a provisioning entity, sending information indicating that an interaction including an amount of money or products above a predetermined threshold has taken place, sending information to a financial institution indicating that fraud may have occurred, sending information about an amount of revenue generated during a particular period of time, sending information to a server such as information associated with interactions, sending dynamic content within an email to be sent, etc. As additional examples, some actions may be associated with causing a mobile device to perform an action, such as: adjusting a temperature, lighting, or music within a space or a building, opening an application on a mobile device, causing an audible noise, causing a mobile device to determine its location, causing a mobile device to determine a temperature, causing a mobile device to communicate with a wireless device such as an Bluetooth or WiFi device, etc. Many of these examples can include sending information to a mobile device to trigger the mobile device to perform an action.

Figure 36:
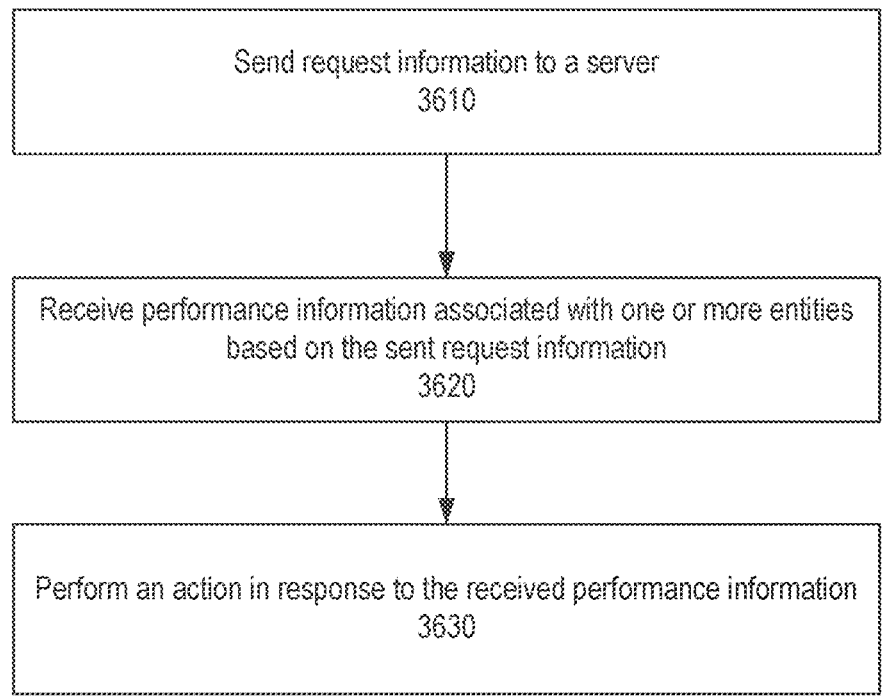
FIG. 36 is a block diagram representing a method of analyzing entity performance, consistent with the embodiments of the present disclosure.

FIG. 36 is a block diagram representing a method of analyzing entity performance, consistent with the embodiments of the present disclosure. While the flowchart discloses the following steps in a particular order, it will be appreciated that at least some of the steps can be moved, modified, or deleted where appropriate, consistent with the teachings of the present disclosure. The analyzing of the entity performance can be performed in full or in part by an entity analysis system (e.g., provisioning entity analysis system 210, system 2700, etc.). It is appreciated that some of these steps can be performed in full or in part by other systems (e.g., such as those systems identified above in FIGS. 2 and 27).

In step 3610, request information is sent to a server. In various embodiments, data acquired by a mobile device or a data acquisition interface included in a mobile device can be sent as part of, or included with the request information. Request information can include filter selections, location information of a mobile device, location information used to determine a cohort, geographic information, demographic information, a request for a type of alert to be sent back upon a condition being met, etc. It should also be appreciated that the term server can be used interchangeably with distributed computing devices, as described above. In various embodiments, request information is processed at a server such that pertinent information is sent back to the device that requested the information (e.g., particular information associated with a provisioning entity associated with the device).

In step 3620, performance information associated with one or more entities based on the request information is received. This information can be received by a mobile device, which may have sent the request information to the server. Such a mobile device can be associated with a consuming entity, a provisioning entity, or both. Received performance information can include information indicating an amount of revenue of a cohort of provisioning entities over a period of time, and other types of performance information discussed above.

In step 3630, an action is performed in response to the received performance information. For example, any of the actions discussed above with reference to step 3550 of FIG. 5 may be performed. For example, in response to a mobile device receiving performance information indicating the coffee shops with the highest revenue in a particular area, the mobile device may automatically provide directions from the location of the mobile device to the location of the coffee shop with the highest revenue in the particular area.

In the foregoing specification, embodiments have been described with reference to numerous specific details that can vary from implementation to implementation. Certain adaptations and modifications of the embodiments described herein can be made. Therefore, the above embodiments are considered to be illustrative and not restrictive.

What is claimed is:

1. A system for presenting a visual representation of entity performance, the system comprising:
 a memory including a set of instructions;
 a transceiver configured to send and receive data;
 one or more processors configured to execute the set of instructions to cause the one or more processors to perform operations that include:
  generating a presentation of an interface at a mobile device, the presentation of the interface including a display of one or more filters, wherein each filter of the one or more filters are associated with one or more data categories;
  receiving a request for entity performance information of an entity, wherein the request includes a temporal criteria and a selection of a filter from among the display of the one or more filters, the temporal criteria defining a time period, and the filter comprising a geographic filter criteria that identifies a geographical location;
  altering the presentation of the interface displayed at the mobile device to include an element, the element based on the data category associated with the selection of the filter, the element comprising a map image that depicts at least the geographical location identified by the geographic filter criteria;
  accessing a database that comprises interaction information associated with the entity in response to the receiving the request for entity performance information of the entity, the interaction information including temporal data that indicates a time associated with an interaction, location data that identifies one or more locations of one or more entities within geographical region identified by the geographical filter criteria during the time associated with the interaction, the one or more locations including at least a location of the entity within the geographical location identified by the geographic filter criteria, and performance data associated with the entity;
  filtering the interaction information based on the time period defined by the temporal criteria, the interaction information is related to a quantity of mobile devices in the geographic location during the time period;
  transmitting a message that includes an email, the email comprising at least a rich media item configured to cause display of the interaction information; and
  causing display of a representation a portion of the interaction information within the interface at the mobile device based on the rich media item, the portion of the interaction information based on the filtering of the interaction information based on the time period defined by the temporal criteria, and the representation comprising a shaded region within the map image presented within the interface, a shape of the shaded region within the map image based on the location data that identifies the location of the entity, and the shaded region comprising a shading pattern, the shading pattern based on the performance data of the entity.

2. The system for analyzing entity performance of claim 1, wherein at least a portion of the database is included in the mobile device.

3. The system for analyzing entity performance of claim 1, wherein the database is remote relative to the mobile device.

4. The system for analyzing entity performance of claim 1, wherein the interaction information includes sales data of the geographic filter criteria.

5. The system for analyzing entity performance of claim 1, wherein the presenting the interaction information includes causing an alert at the mobile device based on the interaction information.

6. The system for analyzing entity performance of claim 1, wherein the operations further comprise:
 transmitting an email that includes at least one rich media object configured to display the interaction information at a predefined time.

7. The system for analyzing entity performance of claim 1, wherein the database includes one or more locations of one or more mobile devices, and wherein at least one action includes providing information associated with a quantity of mobile devices in a particular location during a particular time period.

8. A method for analyzing entity performance, the method comprising:

generating, by one or more processors, a presentation of an interface at a mobile device, the presentation of the interface including a display of one or more filters, wherein each filter of the one or more filters are associated with one or more data categories;

receiving, by the one or more processors, a request for entity performance information of an entity, wherein the request includes a temporal criteria and a selection of a filter from among the display of the one or more filters, the temporal criteria defining a time period, and the filter comprising a geographic filter criteria that identifies a geographical location;

altering, by the one or more processors, the presentation of the interface displayed at the mobile device to include an element, the element based on the data category associated with the selection of the filter, the element comprising a map image that depicts at least the geographical location identified by the geographic filter criteria;

accessing, by the one or more processors, a database that comprises interaction information associated with the entity in response to the receiving the request for entity performance information of the entity, the interaction information including temporal data that indicates a time associated with an interaction, location data that identifies one or more locations of one or more entities within the geographical region identified by the geographical filter criteria during the time associated with the interaction, the one or more locations including at least a location of the entity within the geographical location identified by the geographic filter criteria, and performance data associated with the entity;

filtering, by the one or more processors, the interaction information based on the time period defined by the temporal criteria, the interaction information is related to a quantity of mobile devices in the geographic location during the time period;

transmitting, by the one or more processors, a message that includes an email, the email comprising at least a rich media item configured to cause display of the interaction information; and causing, by the one or more processors, display of a representation a portion of the interaction information within the interface at the mobile device based on the rich media item, the portion of the interaction information based on the filtering of the interaction information based on the time period defined by the temporal criteria, and the representation comprising a shaded region within the map image presented within the interface, a shape of the shaded region within the map image based on the location data that identifies the location of the entity, and the shaded region comprising a shading pattern, the shading pattern based on the performance data of the entity.

9. The method of claim 8, wherein the interaction information includes sales data of the geographic filter criteria.

10. The method of claim 8, wherein the presenting the interaction information includes causing an alert at the mobile device based on the interaction information.

11. The method of claim 8, wherein at least one action includes transmitting an email that includes at least one rich media object configured to display the interaction information at a predefined time.

12. The method of claim 8, wherein the database includes one or more locations of one or more mobile devices, and wherein at least one action includes providing information associated with a quantity of mobile devices in a particular location during a particular time period.

13. A non-transitory computer-readable medium storing a set of instructions that are executed by one or more processors of one or more servers to cause the one or more servers to perform a method for analyzing entity performance, the method comprising:

generating a presentation of an interface at a mobile device, the presentation of the interface including a display of one or more filters, wherein each filter of the one or more filters are associated with one or more data categories;

receiving a request for entity performance information of an entity, wherein the request includes a temporal criteria and a selection of a filter from among the display of the one or more filters, the temporal criteria defining a time period, and the filter comprising a geographic filter criteria that identifies a geographical location;

altering the presentation of the interface displayed at the mobile device to include an element, the element based on the data category associated with the selection of the filter, the element comprising a map image that depicts at least the geographical location identified by the geographic filter criteria;

accessing a database that comprises interaction information associated with the entity in response to the receiving the request for entity performance information of the entity, the interaction information including temporal data that indicates a time associated with an interaction, location data that identifies one or more locations of one or more entities within the geographical region identified by the geographical filter criteria during the time associated with the interaction, the one or more locations including at least a location of the entity within the geographical location identified by the geographic filter criteria, and performance data associated with the entity;

filtering the interaction information based on the time period defined by the temporal criteria, the interaction information is related to a quantity of mobile devices in the geographic location during the time period;

transmitting a message that includes an email, the email comprising at least a rich media item configured to cause display of the interaction information; and causing display of a representation a portion of the interaction information within the interface at the mobile device based on the rich media item, the portion of the interaction information based on the filtering of the interaction information based on the time period defined by the temporal criteria, and the representation comprising a shaded region within the map image presented within the interface, a shape of the shaded region within the map image based on the location data that identifies the location of the entity, and the shaded region comprising a shading pattern, the shading pattern based on the performance data of the entity.

14. The non-transitory computer-readable medium 13, wherein the operations further comprise transmitting an email that includes at least one rich media object configured to display the interaction information at a predefined time.

\* \* \* \* \*